(12) United States Patent
Satoh et al.

(10) Patent No.: US 7,106,909 B2
(45) Date of Patent: Sep. 12, 2006

(54) METHOD AND APPARATUS FOR ENCODING IMAGE DATA IN ACCORDANCE WITH A TARGET DATA SIZE

(75) Inventors: Makoto Satoh, Tokyo (JP); Yukio Chiba, Kanagawa (JP); Satoshi Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 10/298,657

(22) Filed: Nov. 19, 2002

(65) Prior Publication Data

US 2003/0118240 A1    Jun. 26, 2003

(30) Foreign Application Priority Data

Dec. 25, 2001 (JP) ............................. 2001-392642
Jan. 18, 2002 (JP) ............................. 2002-010390
Jun. 27, 2002 (JP) ............................. 2002-188356

(51) Int. Cl.
*G06K 9/36* (2006.01)

(52) U.S. Cl. ........................................... 382/239

(58) Field of Classification Search ............... 392/239
See application file for complete search history.

(56) References Cited

U.S. PATENT DOCUMENTS

| | | | | |
|---|---|---|---|---|
| 5,267,333 A | 11/1993 | Aono et al. | .................... | 382/56 |
| 5,291,282 A | 3/1994 | Nakagawa et al. | ......... | 348/384 |
| 5,402,248 A | 3/1995 | Sato et al. | ................... | 358/426 |
| 5,486,826 A | 1/1996 | Remillard | .................... | 341/51 |
| 5,543,844 A | 8/1996 | Mita et al. | ................... | 348/405 |
| 5,581,373 A | 12/1996 | Yoshida | ....................... | 358/476 |
| 5,604,846 A * | 2/1997 | Kadota | ....................... | 358/1.16 |
| 5,732,157 A | 3/1998 | Osawa | ........................ | 382/244 |
| 5,757,965 A | 5/1998 | Ohki | ............................ | 382/232 |
| 5,764,806 A | 6/1998 | Horiuchi et al. | ............ | 382/239 |
| 5,801,650 A | 9/1998 | Nakayama | .................... | 341/67 |
| 5,812,146 A | 9/1998 | Sato et al. | ................... | 345/501 |
| 5,818,970 A | 10/1998 | Ishikawa et al. | ............ | 382/248 |
| 5,832,126 A * | 11/1998 | Tanaka | ........................ | 382/239 |
| 5,841,381 A | 11/1998 | Nakayama | .................... | 341/67 |
| 5,861,892 A | 1/1999 | Sato et al. | ................... | 345/435 |
| 5,917,947 A * | 6/1999 | Ishida et al. | ................ | 382/232 |

(Continued)

FOREIGN PATENT DOCUMENTS

EP    0469835 A    2/1992

(Continued)

OTHER PUBLICATIONS

"60 to 140 Mbps Compatible HDTV coding," Video Information, Jan. 1992, pp. 51-58.

*Primary Examiner*—Joseph Mancuso
*Assistant Examiner*—Yuzhen Ge
(74) *Attorney, Agent, or Firm*—Fitzpatrick, Cella, Harper & Scinto

(57) ABSTRACT

An encoder (103) encodes image data using a first parameter Q1, and a re-encoder (107) re-encodes the encoded result of the encoder (103) using a second parameter Q2. When the encoded data size obtained by the encoder (103) exceeds a predetermined size, Q1 is replaced by Q2, and encoded data streams previously encoded by the re-encoder (107) are saved in a buffer (108) as those encoded by the encoder (103) after the parameter is changed. Upon executing a re-encoding process, the re-encoder (107) re-encodes encoded data streams previously encoded by the re-encoder (107) using a parameter that can assure a higher compression ratio than Q2.

6 Claims, 35 Drawing Sheets

U.S. PATENT DOCUMENTS

| | | | |
|---|---|---|---|
| 5,982,937 A | 11/1999 | Accad | 382/239 |
| 5,986,594 A | 11/1999 | Nakayama et al. | 341/107 |
| 5,987,183 A | 11/1999 | Saunders et al. | 382/239 |
| 5,991,445 A | 11/1999 | Kato | 382/232 |
| 5,991,449 A | 11/1999 | Kimura et al. | 382/238 |
| 5,991,515 A * | 11/1999 | Fall et al. | 358/1.15 |
| 6,020,975 A | 2/2000 | Chen et al. | 358/1.16 |
| 6,061,473 A | 5/2000 | Chen et al. | 382/235 |
| 6,167,160 A | 12/2000 | Osawa | 382/247 |
| 6,195,024 B1 | 2/2001 | Fallon | 341/51 |
| 6,233,355 B1 | 5/2001 | Kajiwara | 382/238 |
| 6,408,102 B1 | 6/2002 | Nakayama | 382/246 |
| 6,441,913 B1 * | 8/2002 | Anabuki et al. | 358/1.12 |
| 6,449,058 B1 | 9/2002 | Ueda | 358/1.16 |
| 6,473,531 B1 | 10/2002 | Kunitake | 382/239 |
| 6,549,676 B1 | 4/2003 | Nakayama et al. | 382/246 |
| 6,552,819 B1 | 4/2003 | Osawa et al. | 358/1.17 |
| 6,553,143 B1 | 4/2003 | Miyake et al. | 382/239 |
| 6,560,365 B1 | 5/2003 | Nakayama et al. | 382/233 |
| 6,567,562 B1 | 5/2003 | Nakayama et al. | 382/246 |
| 6,643,405 B1 * | 11/2003 | Sako | 382/239 |
| 6,704,281 B1 | 3/2004 | Hourunranta et al. | 370/230 |
| 6,711,295 B1 | 3/2004 | Nakayama et al. | 382/232 |
| 6,792,153 B1 | 9/2004 | Tsujii | 382/239 |
| 6,832,005 B1 | 12/2004 | Malvar | 382/238 |
| 6,865,299 B1 | 3/2005 | Nakayama | 382/246 |
| 6,898,310 B1 | 5/2005 | Ohmi et al. | 382/166 |
| 6,952,501 B1 | 10/2005 | Nakayama | 382/243 |
| 2002/0051230 A1 | 5/2002 | Ohta | 358/448 |
| 2002/0078113 A1 | 6/2002 | Nakayama | 708/300 |
| 2002/0090142 A1 | 7/2002 | Igarashi et al. | 382/246 |
| 2002/0122599 A1 | 9/2002 | Igarashi et al. | 382/239 |
| 2002/0154042 A1 | 10/2002 | Igarashi et al. | 341/67 |
| 2002/0164080 A1 | 11/2002 | Igarashi et al. | 382/233 |
| 2003/0002743 A1 * | 1/2003 | Ohta et al. | 382/239 |
| 2003/0031371 A1 | 2/2003 | Kato et al. | 382/239 |
| 2003/0043905 A1 | 3/2003 | Nakayama et al. | 375/240.04 |
| 2003/0043907 A1 | 3/2003 | Nakayama | 375/240.08 |
| 2003/0058143 A1 | 3/2003 | Chiba et al. | 341/67 |
| 2003/0086597 A1 | 5/2003 | Ohta et al. | 382/131 |
| 2003/0206659 A1 | 11/2003 | Hamanaka | 382/239 |

FOREIGN PATENT DOCUMENTS

| | | |
|---|---|---|
| JP | 8-32037 B4 | 3/1996 |
| JP | 2523953 B2 | 8/1996 |
| JP | 2897563 B2 | 5/1999 |
| JP | 3038022 B2 | 8/2000 |

* cited by examiner

RELATIVE POSITION OF ENCODED BLOCK

RELATIVE POSITION OF ENCODED BLOCK

F I G. 14
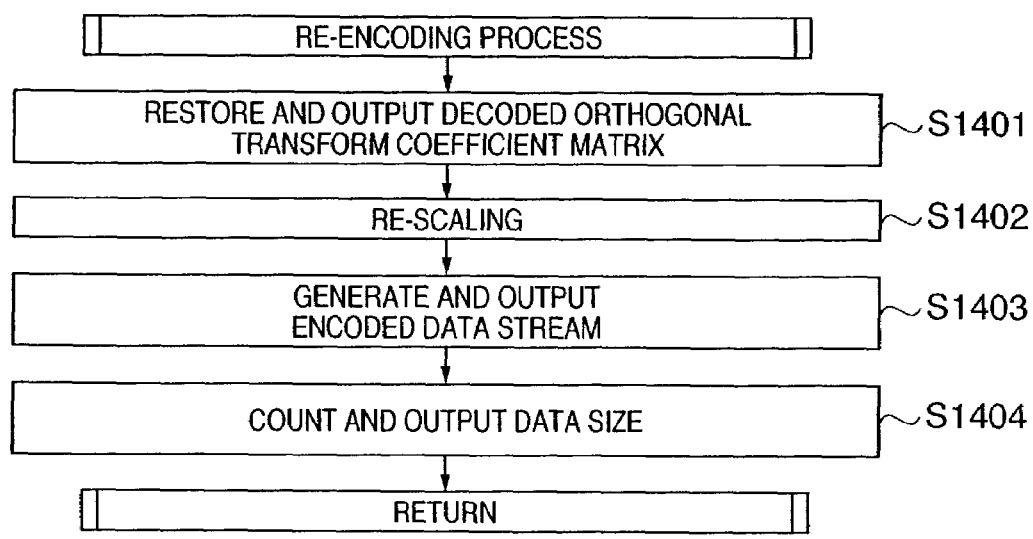

F I G. 21
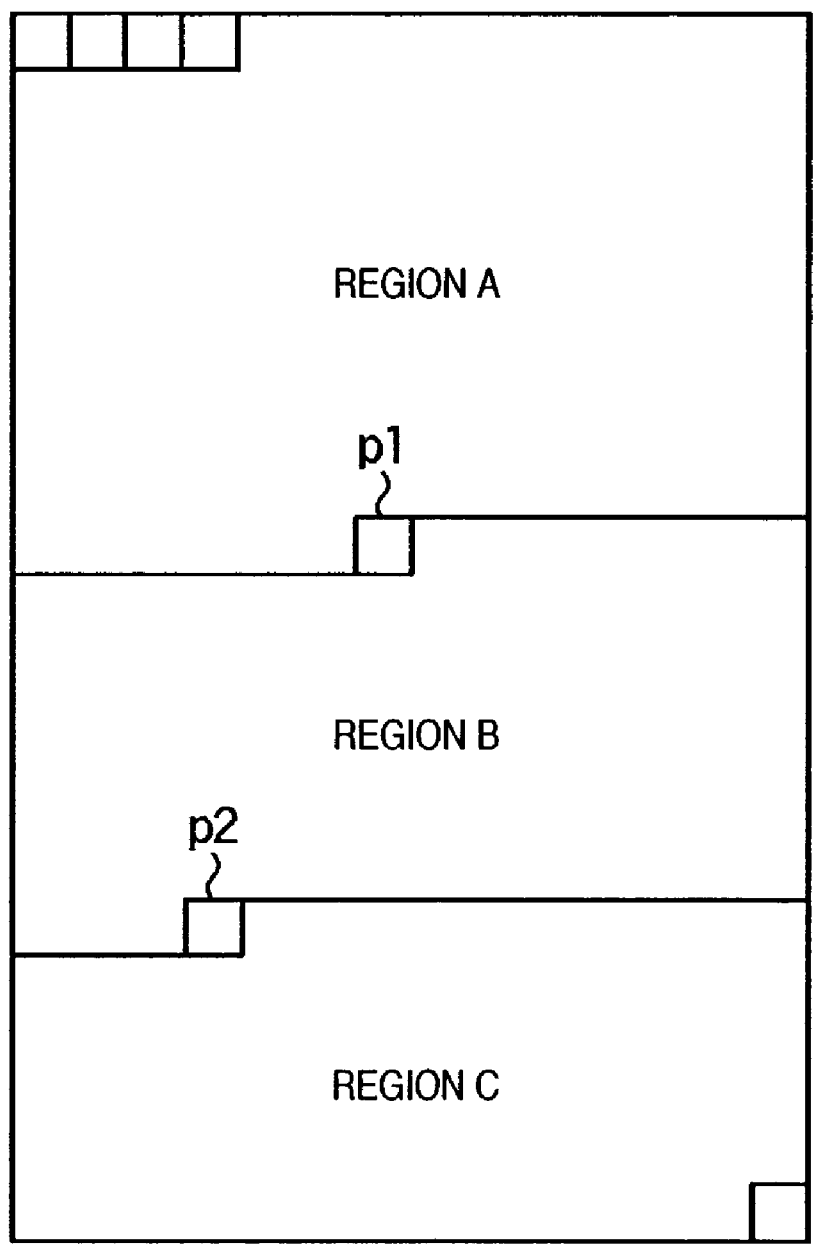

RELATIVE POSITION OF RECTANGULAR REGION

US 7,106,909 B2

METHOD AND APPARATUS FOR ENCODING IMAGE DATA IN ACCORDANCE WITH A TARGET DATA SIZE

FIELD OF THE INVENTION

The present invention relates to an image encoding apparatus and method, a program, and a storage medium.

BACKGROUND OF THE INVENTION

Many existing digital imaging apparatuses have a compression-encoding function for still images. As a typical one of such digital imaging apparatuses, a digital camera is known. In addition, a digital color copying machine is one of the digital imaging apparatuses with such function. In the digital color copying machine, upon transferring document image data scanned by a document scanner to a printing unit, the document scanner has a compression-encoding function for the scanned document image data so as to reduce the data size to be transferred, and the printing unit has a decompression-decoding function for the encoded document image data stream.

The encoded data size of the document image data stream encoded by the compression-encoding function of the document scanner can be reduced to a fraction of the document image data before the compression-encoding process, i.e., the data size of the scanned document image data. The upper limit of the degree of reduction of the data size of such encoded document image data stream to the document image data before the compression-encoding process, i.e., that of the compression ratio is set to be a value at which encoding distortion is not readily visually recognized from the decoded and reconstructed image. On the other hand, the allowable lower limit value of the compression ratio can be uniquely determined according to various restrictions in that system such as the maximum data size of document image data that the document scanner can scan per unit time, the maximum data transfer size of compressed-encoded data stream upon transferring data from the document scanner to the printing unit, and the like.

Even when the allowable upper and lower limit values of the compression ratio of document image data are set, it is not easy to perform a compression-encoding process to make the compression ratios of all input document image data regulate within the range specified by these upper and lower limit values. This is because even when a compression-encoding process is performed using identical encoding parameters (e.g., a quantization tables), the obtained compressed-encoded data stream have arbitrary data sizes for respective document image data stream, i.e., the compression ratio varies for respective scanned document image data.

That is, individual scanned document image data have different states and levels of deviation of their information entropy in terms of spatial frequency, and the compression-encoding process for such document image data adopts various schemes for removing redundancy of image data to be compressed (e.g., runlength encoding for a series of transformed coefficients with values "0", and entropy encoding using variable-length codes). Therefore, in order to perform the compression-encoding process to make the compression ratios of all document image data regulate within the range between the allowable upper and lower limit values, encoding parameters to be applied to each document image data must be changed adaptively, i.e., for each image data to be compressed.

In general, in order to execute the compression-encoding process to obtain constant compression ratios, encoding control called rate control is used. As practical methods of the rate control, two schemes, i.e., a feedforward scheme and feedback scheme, are known.

In the feedforward scheme, the dynamic range, power of entropy, and various kinds of statistical values are independently calculated from source image data which is input as image data to be compressed and encoded before the compression-encoding process, so as to predict optimal encoding parameters on the basis of these calculated values, and an actual compression-encoding process is performed using the predicted encoding parameters. By contrast, in the feedback scheme, optimal encoding parameters are predicted based on the actual size of the encoded data stream obtained by executing trial compression-encoding processes, and a final compression-encoding process is performed using the predicted encoding parameters. Of these two schemes, since the feedback scheme that predicts optimal encoding parameters from the actual size of the encoded data stream obtained by trial compression-encoding processes directly uses the actually obtained size of the encoded data stream in prediction calculations, it can obtain a predicted value of encoding parameters that can be used to generate a target encoded data size with higher accuracy than the feedforward scheme. However, an extra elapsed time is consumed by trial compression-encoding processes.

In a system that allows an increase in processing time even when a compression-encoding process is repeated until an encoded data stream with a target compression ratio is obtained, i.e., a system that requires neither severe realtimeness nor higher throughput, a repetitive algorithm described in Japanese Patent Publication No. H8-32037 "Image Data Compression Apparatus" can be applied. However, a digital imaging apparatus such as a digital camera, digital color copying machine, or the like normally requires realtimeness and high-speed performance. Therefore, it is required to minimize the elapsed time consumed by trial compression-encoding processes for predicting optimal encoding parameters, and to assure higher accurate prediction result.

In order to improve the prediction accuracy of optimal encoding parameters in the rate control using the feedback scheme, it is effective to execute trial compression-encoding processes using many encoding parameters, and to obtain many references that have correspondence between these encoding parameters and actually obtained encoded data sizes. However, conventionally, in order to minimize the elapsed time, arithmetic operation circuits or processing circuits so many as the number of encoding parameters used in trial compression-encoding processes are equipped, and are parallelly operated to execute trial compression-encoding processes.

As described in reference 1 "60 to 140 Mbps compatible HDTV coding", Video Information, January 1992, pp. 51–58, as an example of such parallel circuit scheme, N sets of quantization tables are used as a plurality of encoding parameters, a compression-encoding apparatus which comprises N quantization circuits and N generated code size measurement circuits accordingly is provided, and curve approximation is done based on N encoded data sizes obtained by this encoding apparatus to obtain an optimal set of encoding parameters, i.e., an optimal set of quantization tables.

As a devise for suppressing an increase in area of circuit although a similar arrangement is adopted, for example, Japanese Patent No. 02523953 "Encoding Apparatus" describes that three quantization circuits are equipped to parallelly execute quantization processes using five sets of quantization tables in trial compression-encoding processes, and to obtain five encoded data size values.

In video compression-encoding that adopts an encoding scheme which can sequentially execute compression-encoding processes while adaptively changing an encoding parameter (more particularly, a scaling factor for a set of quantization tables) upon compression-encoding one image data, a sequential correction algorithm described in, e.g., Japanese Patent No. 02897563 "Image Compression-encoding Apparatus", can be applied.

In this prior art, an encoded data size for each block obtained by quantizing using a specific quantization scaling factor is calculated upon trial compression-encoding processes, M encoded data sizes which are expected to be obtained using M quantization scaling factors are predicted on the basis of the calculated data size, and the compression-encoding process is performed while sequentially correcting a quantization scaling factor which is used actually on the basis of the difference between the target encoded data size calculated from these M predicted values and the sum total of the data sizes of the encoded data stream which is actually output so far, i.e., a prediction error.

Furthermore, for the purpose of avoiding the actually generated encoded data size from exceeding the allowable upper limit value unexpectedly, as described in Japanese Patent No. 03038022 "Digital Camera Apparatus", when the data size of an encoded data stream obtained by actually executing quantization and variable-length encoding processes using a quantization step value derived from the encoded data size obtained upon trial compression-encoding processes has exceeded the data size assigned to each block, variable-length encoding in that block is aborted (to discard information of significant transform coefficients).

The aforementioned prior arts of the rate control using the feedback scheme have common features in that an optimal encoding parameter and the predicted encoded data size generated using the encoding parameter are derived on the basis of one or a plurality of actual encoded data sizes obtained by trial compression-encoding processes.

In a JPEG encoding scheme which is prevalently adopted as a general still image compression-encoding scheme, since a quantization step matrix as one of most typical encoding parameters, i.e., a quantization table as only one combination for one image data to be compression-encoded, is commonly applied to all blocks which comprise that image data, the sequential correction algorithm of encoding parameters described in Japanese Patent No. 02897563 "Image Compression-encoding Apparatus" cannot be applied.

Furthermore, with the algorithm described in Japanese Patent No. 03038022 "Digital Camera Apparatus" cited as another prior art, when the data size assigned to each block has been exceeded, a variable-length encoding process for that block is aborted. As a result, even when the final encoded data size obtained upon completion of compression-encoding processes of all blocks that comprise image data does not exceed the allowable upper limit value, even significant transformed coefficients which need not be discarded are discarded, and local variations of compression-encoding distortion are generated in a reconstructed image obtained by a decompression-decoding process. Hence, it is not preferable to apply this algorithm to a digital imaging apparatus.

When a compression-encoding process is done while implementing rate control using the feedback scheme with high prediction accuracy in a system that requires realtimeness and higher throughput like in a digital imaging apparatus, the parallel circuit architecture described as a prior art is, in fact, effective implementation. However, a huge circuit area and buffer size are required to implement a plurality of encoding processing circuits and to temporarily store a plurality of encoded data streams, much cost is required. Hence, it is difficult to implement parallel processes using too huge circuits.

Hence, when a digital imaging apparatus adopts a still image compression-encoding scheme such as JPEG encoding which has a limited variation in encoding parameter, it is preferable to increase the number of parallel circuits within an allowable circuit area range so as to simultaneously perform compression-encoding processes using the largest possible number of different encoding parameters, and to output an encoded data stream, which suffers the minimum encoding distortion within the allowable compression ratio range, of a plurality of obtained encoded data streams.

However, since the number of parallel circuits is finite, all encoded data streams generated using a plurality of encoding parameters may fall outside the allowable compression ratio range. In such case, a new encoding parameter must be determined to redo a compression-encoding process from the head of data to be encoded. However, the time required to redo the encoding process directly leads to a performance drop of the system.

The present invention has been made in consideration of the aforementioned problems, and has as its object to compression-encode image data to a predetermined size, to suppress compression-encoding distortion of an image obtained by decompression-decoding an encoded data stream obtained by compression-encoding, and to obtain a high-quality reconstructed image.

SUMMARY OF THE INVENTION

In order to achieve the object of the present invention, for example, an image encoding method of the present invention has the following arrangement.

There is provided an image encoding method for compression-encoding image data, comprising:

the first compression-encoding step of compression-encoding image data using a first compression-encoding parameter, which can be changed, and generating a compression-encoded encoded data stream;

the re-compression-encoding step of re-compression-encoding the encoded data stream compression-encoded in the first compression-encoding step and an encoded data stream of a substitution candidate, which was compression-encoded by itself previously, using a second compression-encoding parameter which is generated in accordance with the first compression-encoding parameter applied to the first compression-encoding step, and of generating an encoded data stream of a substitution candidate, which is compression-encoded at a higher compression ratio;

the data size determination step of counting a data size of an encoded data stream, which is compression-encoded in the first compression-encoding step, and determining if the data size is not less than a predetermined size;

the change step of replacing, when it is determined in the data size determination step that the data size of the encoded data stream compression-encoded in the first compression-encoding step is not less than the predetermined size, the first compression-encoding parameter by the second compression-encoding parameter;

the save step of saving, when it is determined in the data size determination step that the data size of the encoded data stream compression-encoded in the first compression-encoding step is not less than the predetermined size, the encoded data stream of the substitution candidate, which was previously compression-encoded in the re-compression-encoding step, as an encoded data stream compression-encoded in the first compression-encoding step after the first encoding parameter is changed, and of saving the encoded data stream, which is compression-encoded in the first compression-encoding step after the first compression-encoding parameter is changed, as a subsequent encoded data stream;

the process execution selection step of selecting, when it is determined in the data size determination step that the data size of the encoded data stream compression-encoded in the first compression-encoding step is not less than the predetermined size, if a re-compression-encoding process in the re-compression-encoding step is to be executed; and update step of updating, when it is selected in the process execution selection step that the re-compression-encoding process in the re-compression-encoding step is to be executed, the second compression-encoding parameter to be applied to the re-compression-encoding step to a new compression-encoding parameter, which can compress data at a higher compression ratio.

In order to achieve the object of the present invention, for example, an image encoding method of the present invention has the following arrangement.

There is provided an image encoding method for compression-encoding image data, comprising:

the first compression-encoding step of compression-encoding image data using a first compression-encoding parameter, which can be changed, and generating a compression-encoded encoded data stream;

the second compression-encoding step of compression-encoding image data using a second compression-encoding parameter which is generated in accordance with the first compression-encoding parameter applied to the first compression-encoding step, and of generating an encoded data stream of a substitution candidate, which is compression-encoded at a higher compression ratio;

the re-compression-encoding step of re-compression-encoding the encoded data stream of the substitution candidate, which is compression-encoded in the second compression-encoding step, and an encoded data stream of a substitution candidate, which was compression-encoded by itself previously, using the second compression-encoding parameter applied to the second compression-encoding step, and of generating an encoded data stream of a substitution candidate, which is compression-encoded at a higher compression ratio;

the data size determination step of counting a data size of an encoded data stream, which is compression-encoded in the first compression-encoding step, and determining if the data size is not less than a predetermined size;

the change step of replacing, when it is determined in the data size determination step that the data size of the encoded data stream compression-encoded in the first compression-encoding step is not less than the predetermined size, the first compression-encoding parameter by the second compression-encoding parameter;

the save step of saving, when it is determined in the data size determination step that the data size of the encoded data stream compression-encoded in the first compression-encoding step is not less than the predetermined size, the encoded data streams of the substitution candidates, which were previously compression-encoded in the second compression-encoding step and the re-compression-encoding step, as an encoded data stream compression-encoded in the first compression-encoding step after the first encoding parameter is changed, and of saving the encoded data stream, which is compression-encoded in the first compression-encoding step after the first compression-encoding parameter is changed, as a subsequent encoded data stream;

the process execution selection step of selecting, when it is determined in the data size determination step that the data size of the encoded data stream compression-encoded in the first compression-encoding step is not less than the predetermined size, if a compression-encoding process in the second compression-encoding step and a re-compression-encoding process in the re-compression-encoding step are to be executed; and update step of updating, when it is selected in the process execution selection step selects that the compression-encoding process in the second compression-encoding step and the re-compression-encoding process in the re-compression-encoding step are to be executed, the second compression-encoding parameter to be applied to the second compression-encoding step and the re-compression-encoding step to a new compression-encoding parameter, which can compress data at a higher compression ratio.

In order to achieve the object of the present invention, for example, an image encoding apparatus of the present invention has the following arrangement.

There is provided an image encoding apparatus for compression-encoding image data, comprising:

first compression-encoding means for compression-encoding image data using a first compression-encoding parameter, which can be changed, and generating a compression-encoded encoded data stream;

re-compression-encoding means for re-compression-encoding the encoded data stream compression-encoded by the first compression-encoding means and an encoded data stream of a substitution candidate, which was compression-encoded by itself previously, using a second compression-encoding parameter which is generated in accordance with the first compression-encoding parameter applied to the first compression-encoding means, and for generating an encoded data stream of a substitution candidate, which is compression-encoded at a higher compression ratio;

data size determination means for counting a data size of an encoded data stream, which is compression-encoded by the first compression-encoding means, and determining if the data size is not less than a predetermined size;

change means for, when the data size determination means determines that the data size of the encoded data stream compression-encoded by the first compression-encoding means is not less than the predetermined size, replacing the first compression-encoding parameter by the second compression-encoding parameter;

save means for, when the data size determination means determines that the data size of the encoded data stream compression-encoded by the first compression-encoding means is not less than the predetermined size, saving the encoded data stream of the substitution candidate, which was previously compression-encoded by the re-compression-encoding means, as an encoded data stream compression-encoded by the first compression-encoding means after the first encoding parameter is changed, and for saving the encoded data stream, which is compression-encoded by the first compression-encoding means after the first compression-encoding parameter is changed, as a subsequent encoded data stream;

process execution selection means for, when the data size determination means determines that the data size of the encoded data stream compression-encoded by the first compression-encoding means is not less than the predetermined size, selecting if a re-compression-encoding process by the re-compression-encoding means is to be executed; and update means for, when the process execution selection means selects that the re-compression-encoding process by the re-compression-encoding means is to be executed, updating the second compression-encoding parameter to be applied to the re-compression-encoding means to a new compression-encoding parameter, which can compress data at a higher compression ratio.

In order to achieve the object of the present invention, for example, an image encoding apparatus of the present invention has the following arrangement.

There is provided an image encoding apparatus for compression-encoding image data, comprising:

first compression-encoding means for compression-encoding image data using a first compression-encoding parameter, which can be changed, and generating a compression-encoded encoded data stream;

second compression-encoding means for compression-encoding image data using a second compression-encoding parameter which is generated in accordance with the first compression-encoding parameter applied to the first compression-encoding means, and for generating an encoded data stream of a substitution candidate, which is compression-encoded at a higher compression ratio;

re-compression-encoding means for re-compression-encoding the encoded data stream of the substitution candidate, which is compression-encoded by the second compression-encoding means, and an encoded data stream of a substitution candidate, which was compression-encoded by itself previously, using the second compression-encoding parameter applied to the second compression-encoding means, and for generating an encoded data stream of a substitution candidate, which is compression-encoded at a higher compression ratio;

data size determination means for counting a data size of an encoded data stream, which is compression-encoded by the first compression-encoding means, and determining if the data size is not less than a predetermined size;

change means for, when the data size determination means determines that the data size of the encoded data stream compression-encoded by the first compression-encoding means is not less than the predetermined size, replacing the first compression-encoding parameter by the second compression-encoding parameter;

save means for, when the data size determination means determines that the data size of the encoded data stream compression-encoded by the first compression-encoding means is not less than the predetermined size, saving the encoded data streams of the substitution candidates, which were previously compression-encoded by the second compression-encoding means and the re-compression-encoding means, as an encoded data stream compression-encoded by the first compression-encoding means after the first encoding parameter is changed, and for saving the encoded data stream, which is compression-encoded by the first compression-encoding means after the first compression-encoding parameter is changed, as a subsequent encoded data stream;

process execution selection means for, when the data size determination means determines that the data size of the encoded data stream compression-encoded by the first compression-encoding means is not less than the predetermined size, selecting if a compression-encoding process by the second compression-encoding means and a re-compression-encoding process by the re-compression-encoding means are to be executed; and update means for, when the process execution selection means selects that the compression-encoding process by the second compression-encoding means and the re-compression-encoding process by the re-compression-encoding means are to be executed, updating the second compression-encoding parameter to be applied to the second compression-encoding means and the re-compression-encoding means to a new compression-encoding parameter, which can compress data at a higher compression ratio.

In order to achieve the object of the present invention, for example, an image encoding method of the present invention has the following arrangement.

There is provided an image encoding method of compression-encoding image data, comprising:

the first compression-encoding step of compression-encoding image data using a first compression-encoding parameter, which can be changed;

the second compression-encoding step of compression-encoding the compression-encoded results of the first compression-encoding step using a second compression-encoding parameter which can compress data at a higher compression ratio than the first compression-encoding parameter and can be changed;

the determination step of counting a data size of an encoded data stream, which is compression-encoded in the first compression-encoding step, and determining if the data size is not less than a predetermined size;

the change step of replacing, every time it is determined in the determination step that the data size of the encoded data stream obtained in the first compression-encoding step is not less than the predetermined size, the first compression-encoding parameter by the second compression-encoding parameter, and changing the second compression-encoding parameter to a parameter used to obtain a higher compression ratio;

the save step of saving, when it is determined in the determination step that the data size of the encoded data stream obtained in the first compression-encoding step is not less than the predetermined size, an encoded data stream, which was previously compression-encoded in the second compression-encoding step, as encoded data stream compression-encoded in the first compression-encoding step after the parameter is changed;

the re-compression-encoding step of re-compression-encoding, when it is determined in the determination step that the data size of the encoded data stream obtained in the first compression-encoding step is not less than the predetermined size, the encoded data stream, which was previously compression-encoded in the second compression-encoding step, using the second compression-encoding parameter, which is changed in the change step; and the control step of controlling, when it is determined or predicted in the determination step that the data size of the encoded data stream obtained in the first compression-encoding step is not less than the predetermined size before the re-compression-encoding process of the re-compression-encoding step is completed, the first compression-encoding step to abort a compression-encoding process.

In order to achieve the object of the present invention, for example, an image encoding apparatus of the present invention has the following arrangement.

There is provided an image encoding apparatus for compression-encoding image data, comprising:

first compression-encoding means for compression-encoding image data using a first compression-encoding parameter, which can be changed;

second compression-encoding means for compression-encoding the compression-encoded results of the first compression-encoding means using a second compression-encoding parameter which can compress data at a higher compression ratio than the first compression-encoding parameter and can be changed;

determination means for counting a data size of an encoded data stream, which is compression-encoded by the first compression-encoding means, and determining if the data size is not less than a predetermined size;

change means for, every time the determination means determines that the data size of the encoded data stream obtained by the first compression-encoding means is not less than the predetermined size, replacing the first compression-encoding parameter by the second compression-encoding parameter, and changing the second compression-encoding parameter to a parameter used to obtain a higher compression ratio;

save means for, when the determination means determines that the data size of the encoded data stream obtained by the first compression-encoding means is not less than the predetermined size, saving an encoded data stream, which was previously compression-encoded by the second compression-encoding means, as encoded data stream compression-encoded by the first compression-encoding means after the parameter is changed;

re-compression-encoding means for, when the determination means determines that the data size of the encoded data stream obtained by the first compression-encoding means is not less than the predetermined size, re-compression-encoding the encoded data stream, which was previously compression-encoded by the second compression-encoding means, using the second compression-encoding means parameter, which is changed by the change means; and control means for, when the determination means determines or predicts that the data size of the encoded data stream obtained by the first compression-encoding means is not less than the predetermined size before the re-compression-encoding process of the re-compression-encoding means is completed, controlling the first compression-encoding means to abort a compression-encoding process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a flow chart showing the process executed by a re-encoder 407;

FIG. 21 two-dimensionally shows four relative positions 0%, P1, P2, and 100% of rectangular regions, and three segmented regions A, B, and C shown on the graph in FIG. 18 on source image data;

DETAILED DESCRIPTION OF THE PREFERRED EMBODIMENTS

Preferred embodiments of the present invention will now be described in detail in accordance with the accompanying drawings.

[First Embodiment]

Figure 1:
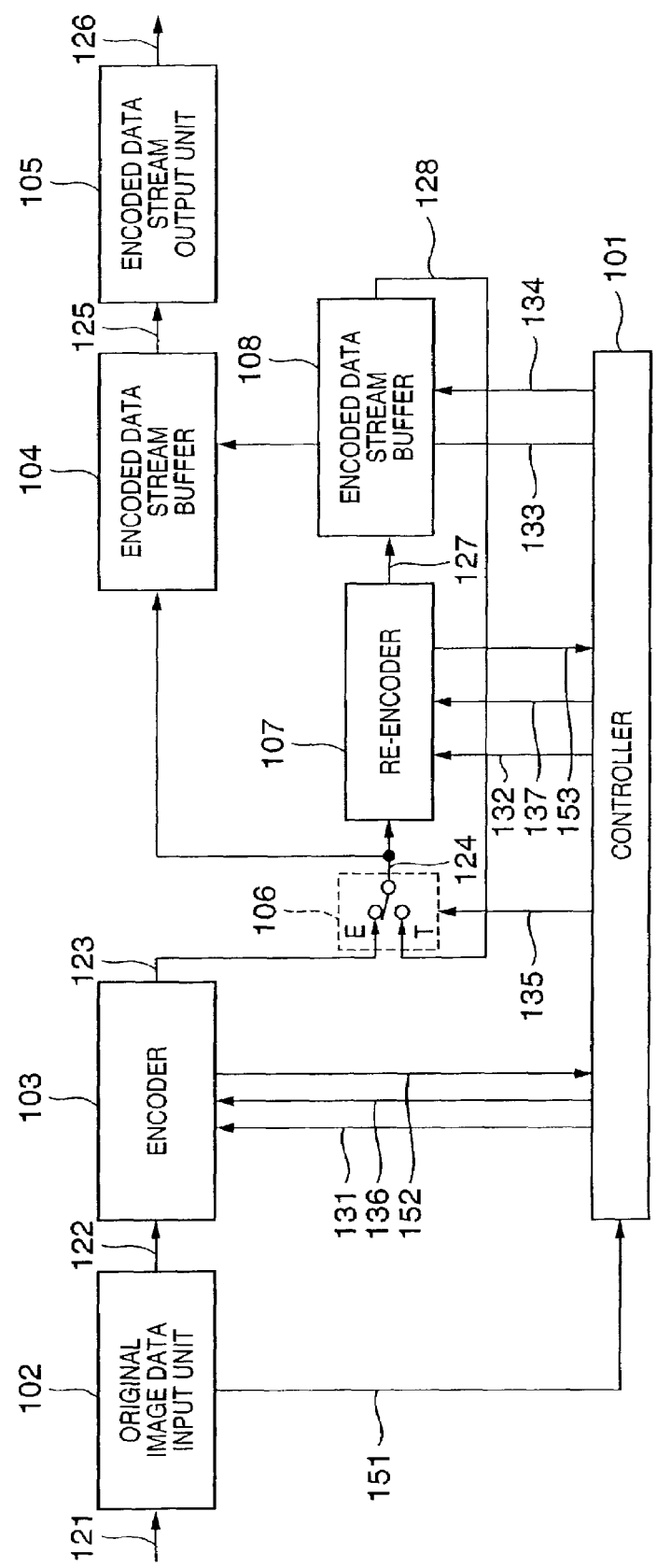
FIG. 1 is a block diagram showing the arrangement of an image encoding apparatus in the first and second embodiments of the present invention.
Figure 2:
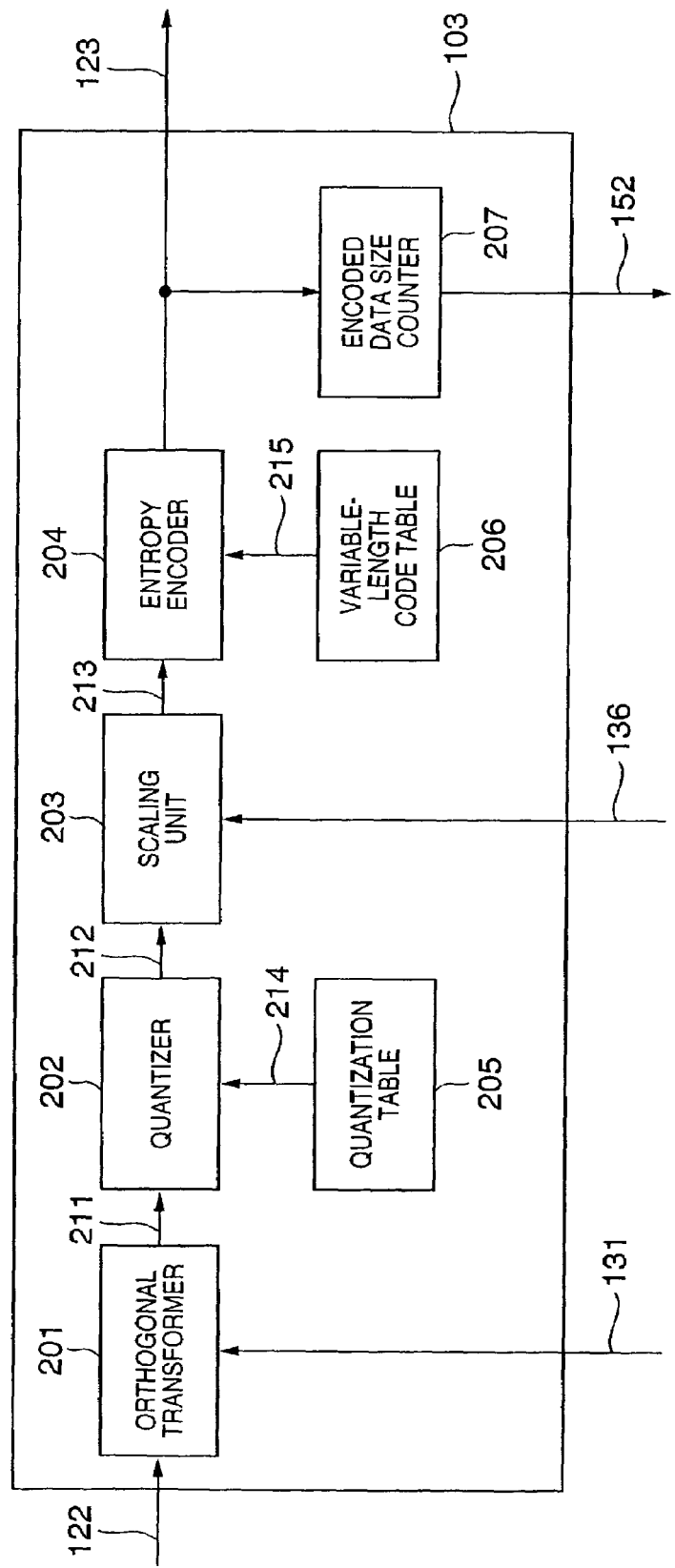
FIG. 2 is a block diagram showing the arrangement of an encoder 103 shown in FIG. 1.
Figure 3:
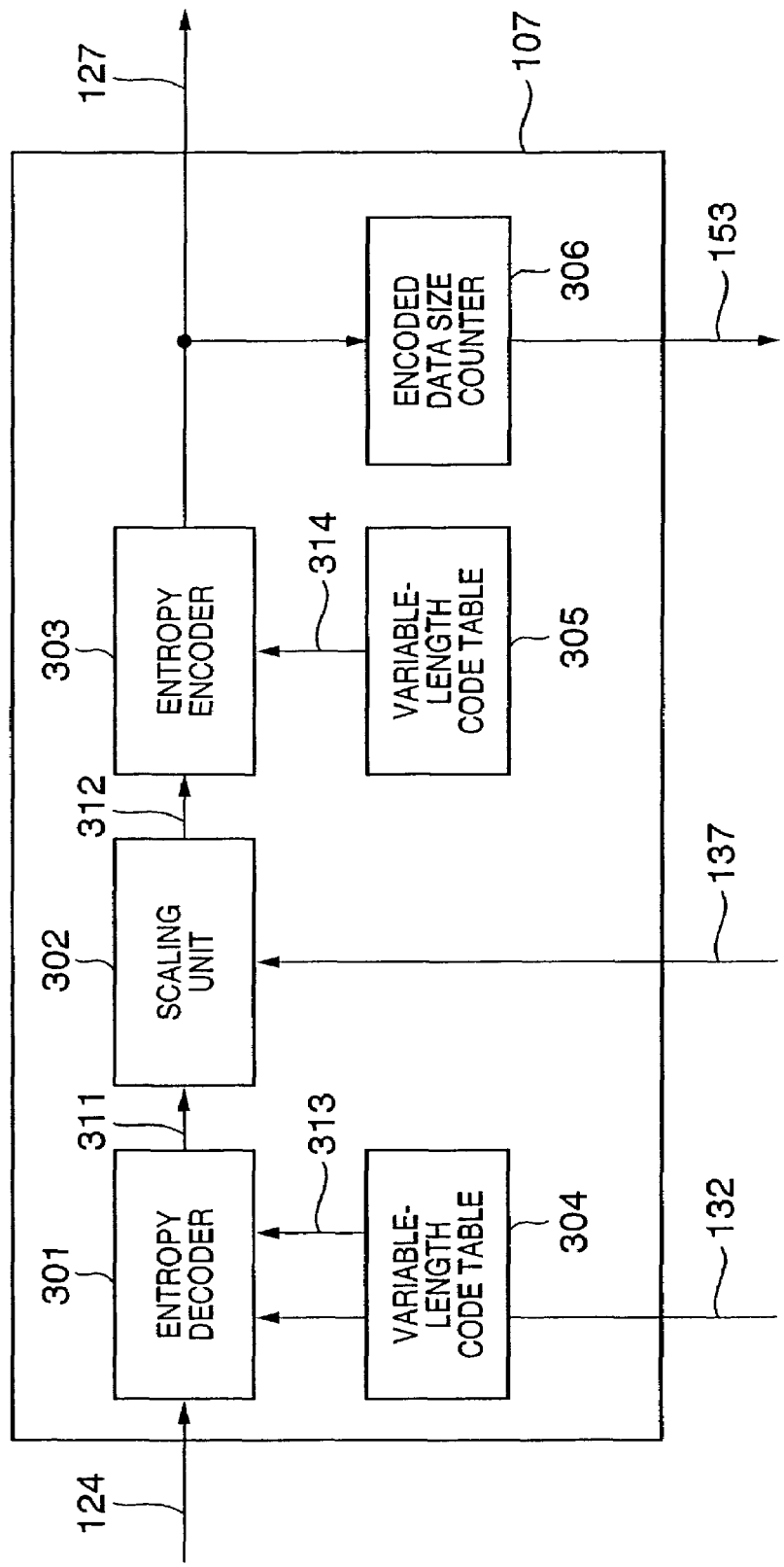
FIG. 3 is a block diagram showing the arrangement of a re-encoder 107 shown in FIG. 1.
Figure 4:
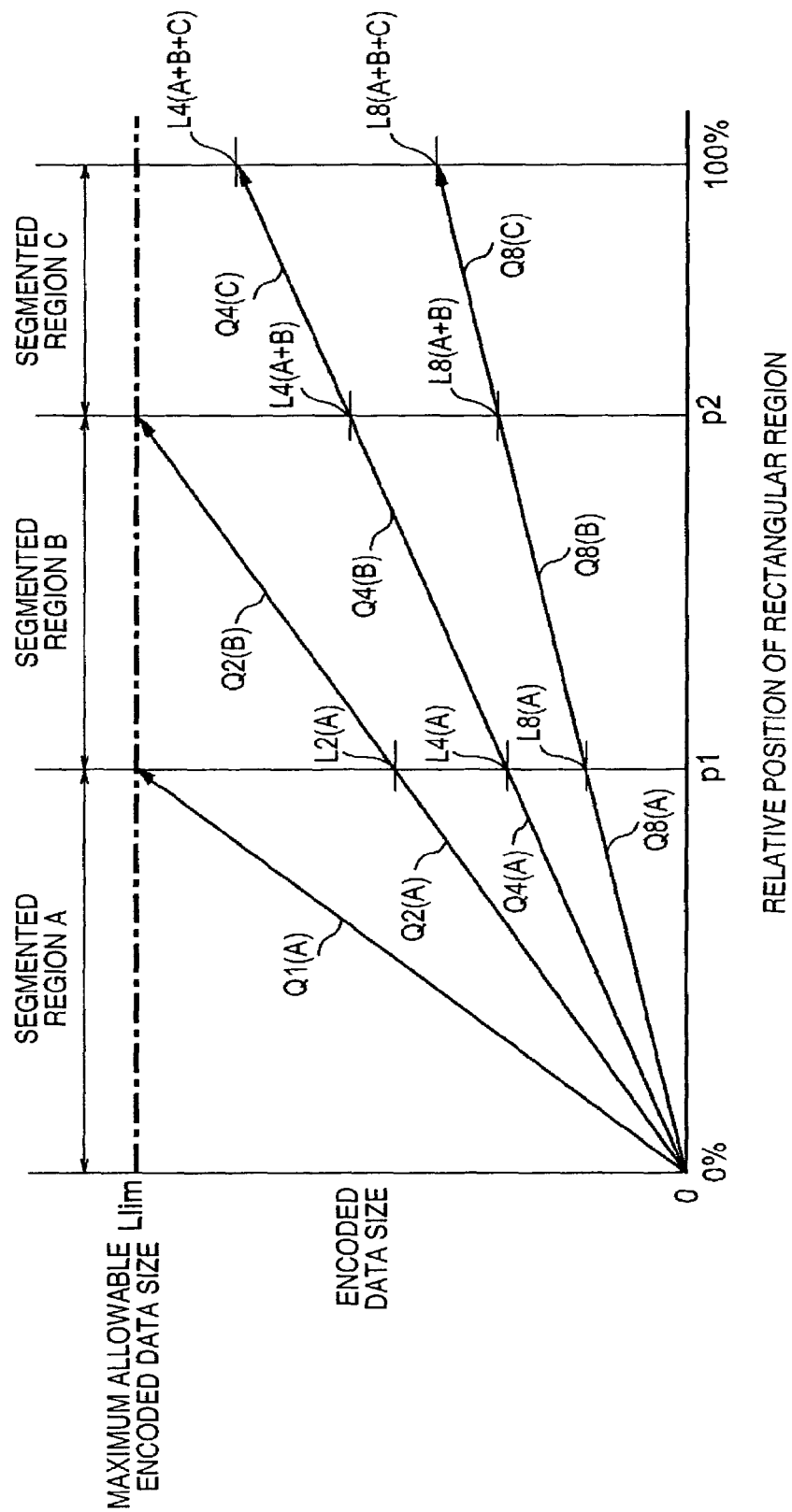
FIG. 4 is a graph showing the relationship between the accumulated value of the data sizes of encoded data streams (ordinate) obtained when compression-encoding processes of first source image data input as data to be encoded to the image encoding apparatus shown in FIG. 1 are sequentially executed for respective rectangular regions using a single quantization table and four different quantization scaling factors ×1, ×2, ×3, and ×4, and the relative position of a rectangular region that has already undergone the compression-encoding process at that time in the source image data (abscissa)
Figure 5:
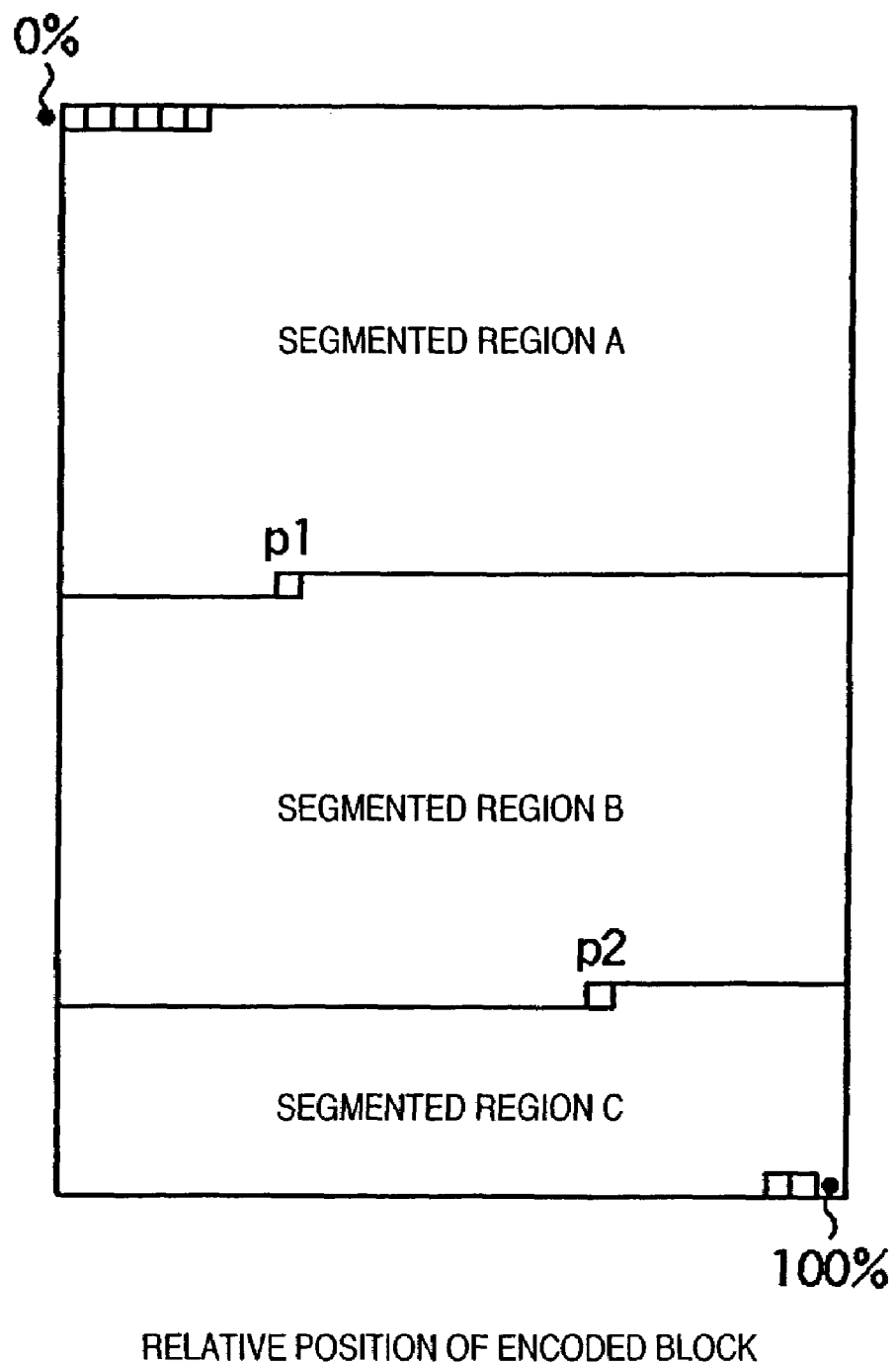
FIG. 5 shows the first source image.

FIG. 1 is a block diagram showing the arrangement of an image encoding apparatus of this embodiment. Respective units will be described later. FIG. 2 is a block diagram showing the arrangement of an encoder 103 shown in FIG. 1. Respective units will be described later. FIG. 3 is a block diagram showing the arrangement of a re-encoder 107 shown in FIG. 1. Respective units will be described later. FIG. 4 is a graph showing the relationship between the accumulated value of the data sizes of encoded data streams (ordinate) obtained when compression-encoding processes of first source image data input as data to be encoded to the image encoding apparatus shown in FIG. 1 are sequentially executed for respective rectangular regions using a single quantization table and four different quantization scaling factors ×1, ×2, ×3, and ×4, and the relative position of a rectangular region that has already undergone the compression-encoding process at that time in the source image data (abscissa). FIG. 5 shows the first source image.

Figure 6:
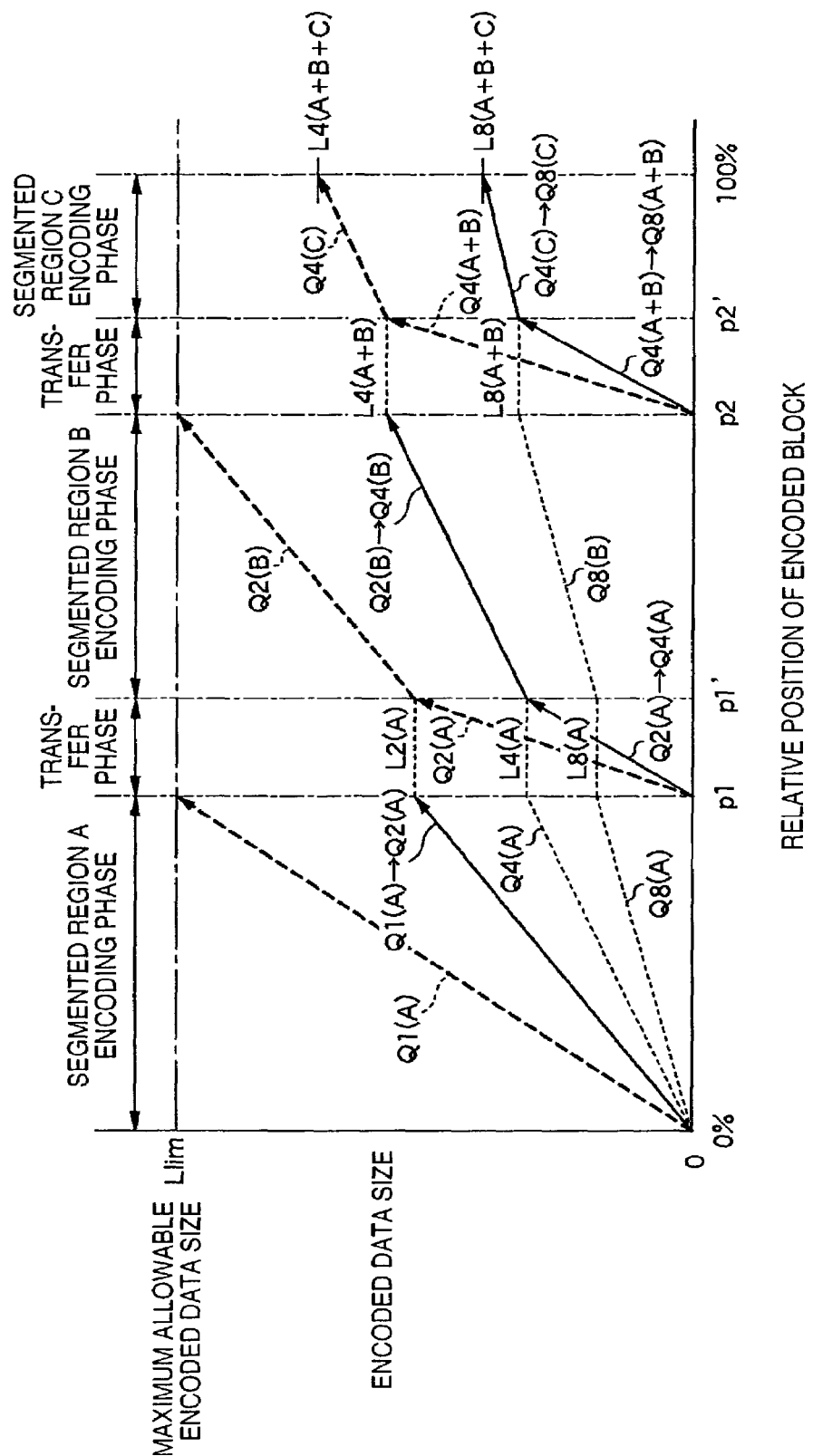
FIG. 6 is a graph showing the relationship between the accumulated value of the data sizes of encoded data streams (ordinate) stored in first and second encoded data stream buffers 104 and 108 during a series of compression-encoding processes for the first source image, and the relative position of a rectangular region that has already undergone the compression-encoding process at that time in the source image data (abscissa)
Figure 10A:
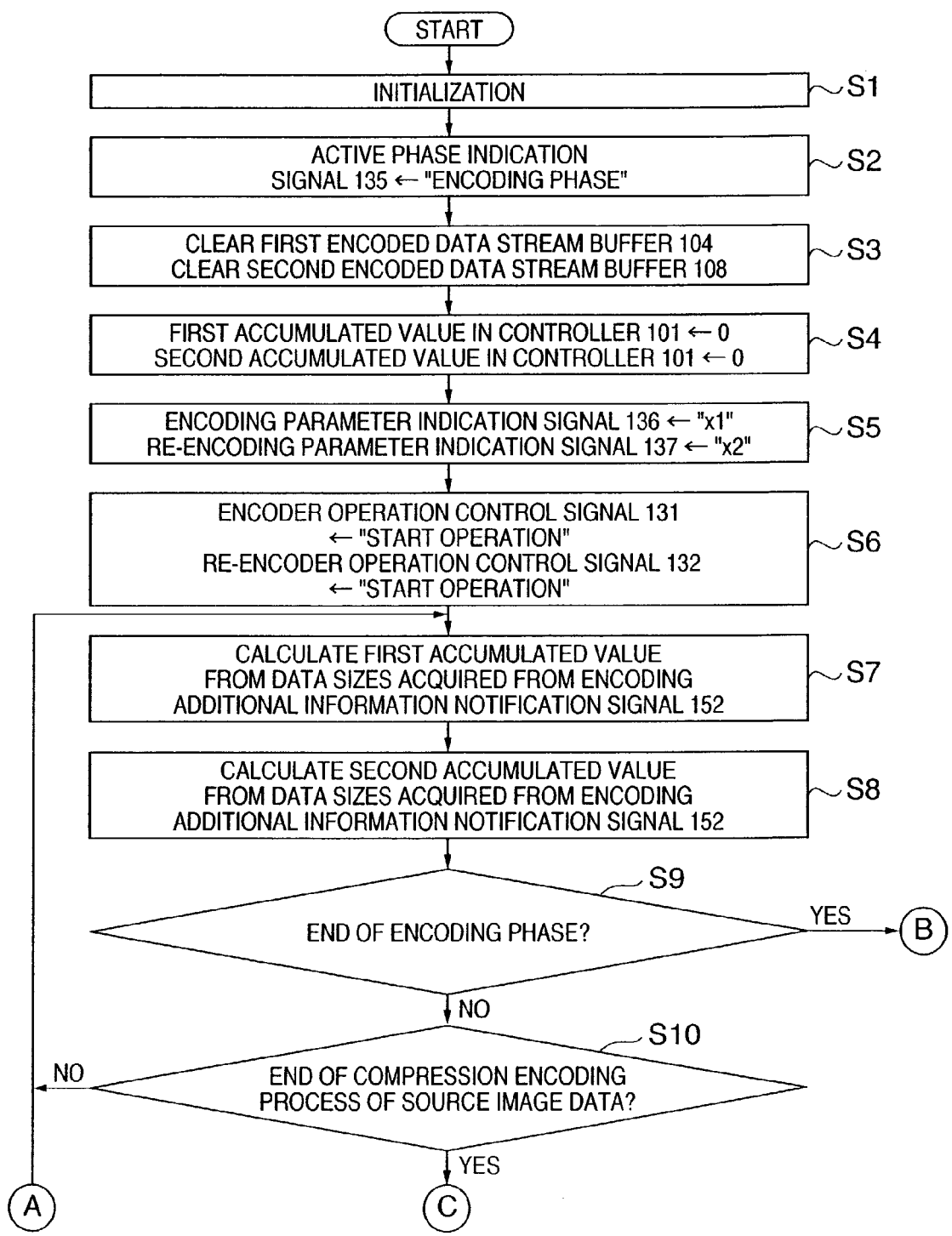
FIG. 10A is a flow chart showing the process executed by a controller 101 shown in FIG. 1.
Figure 10B:
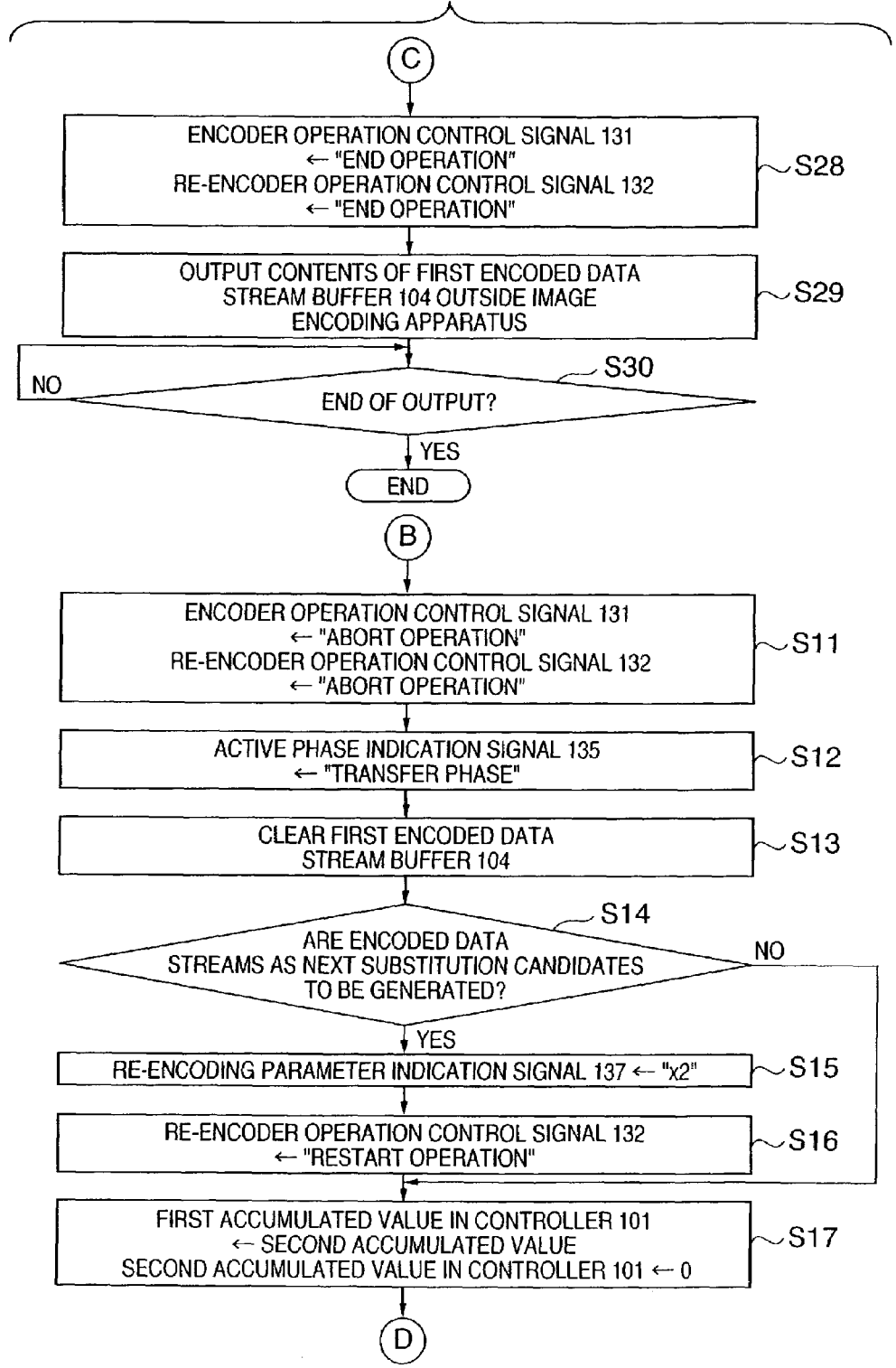
FIG. 10B is a flow chart showing the process executed by a controller 101 shown in FIG. 1.
Figure 10C:
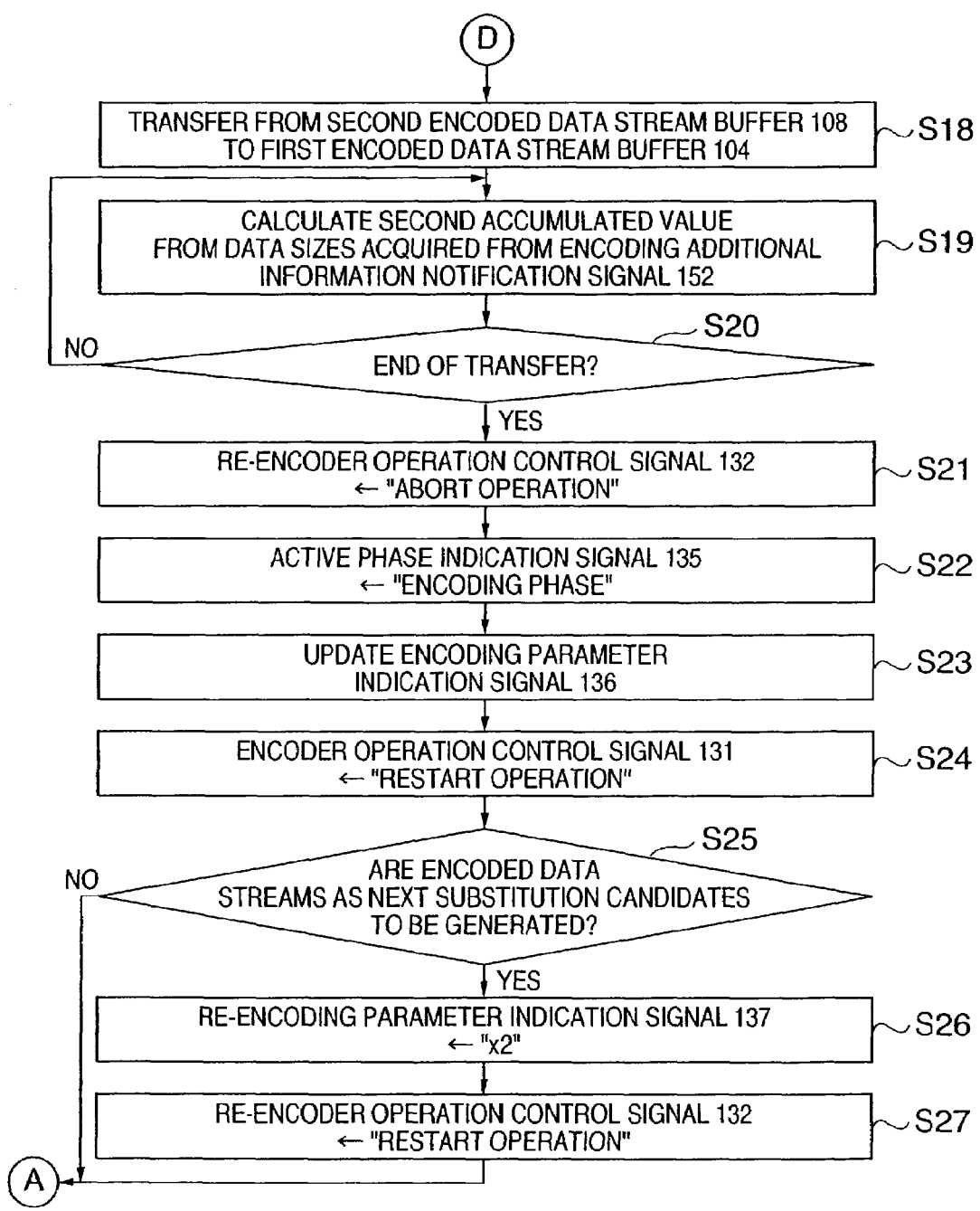
FIG. 10C is a flow chart showing the process executed by a controller 101 shown in FIG. 1.

FIG. 6 is a graph showing the relationship between the accumulated value of the data sizes of encoded data streams (ordinate) stored in first and second encoded data stream buffers 104 and 108 during a series of compression-encoding processes for the first source image, and the relative position of a rectangular region that has already undergone the compression-encoding process at that time in the source image data (abscissa). Furthermore, FIGS. 10A to 10C are flow charts showing the process executed by a controller 101 shown in FIG. 1.

A series of compression-encoding processes that the image encoding apparatus of this embodiment executes for the first source image data shown in FIG. 5 will be described below using FIGS. 1 to 6, and FIGS. 10A to 10C.

An initialization process of the image encoding apparatus is executed first (step S1). The detailed contents of the initialization process are as follows.

An external system (not shown) or the like stores information indicating the size of the first source image data (more specifically, the total number of rectangular regions which comprise that source image data) in a controller 101 prior to the series of compression-encoding processes. Note that each rectangular region has a size of 16×16 pixels, but the present invention is not limited to such specific size.

Also, the external system (not shown) or the like stores the maximum allowable value (the number of bits or bytes) of the accumulated data size of an encoded data stream finally output from the image encoding apparatus in the controller 101 prior to the series of compression-encoding processes. In the graphs shown in FIGS. 4 and 6, the maximum allowable encoded data size stored in the controller 101 is indicated by the horizontal dotted line in an upper portion of each graph.

The external system (not shown) or the like stores a matrix of 8×8 quantization step values corresponding to orthogonal transform coefficients which form an 8 (rows)×8 (columns) orthogonal transform coefficient matrix in a quantization table 205 in an encoder 103 prior to the series of compression-encoding processes. These values are referred to by a quantizer 202 via a quantization step signal 214.

The external system (not shown) or the like stores variable-length code word sets corresponding to symbols as data to be encoded in a variable-length code table 206 in the encoder 103 prior to the series of compression-encoding processes. These values are referred to by an entropy encoder 204 via a variable-length code word signal 215.

Furthermore, the external system (not shown) or the like stores the same variable-length code word sets as those stored in the variable-length code table 206 in the encoder 103 in decoding and encoding variable-length code tables 304 and 305 in the re-encoder 107 prior to the series of compression-encoding processes. These values are referred to by an entropy decoder 301 via a decoding variable-length code word signal 313 and by an entropy encoder 303 via an encoding variable-length code word signal 314.

Upon completion of the aforementioned initialization process, the image encoding apparatus executes the following image encoding process. The controller 101 outputs an active phase indication value, which indicates that the current active phase of the image encoding apparatus is an encoding phase, and sets a corresponding switch 106 to the E side, on an active phase indication signal 135 (step S2).

In response to the active phase indication signal 135, the switch 106 is connected to output first encoded data streams supplied via a first encoded data stream signal 123 onto a selected encoded data stream signal 124.

The controller 101 issues an initialization indication to a first encoded data stream buffer 104 to clear the contents of the first encoded data stream buffer 104 via a first buffer control signal 133, and also issues an initialization indication to a second encoded data stream buffer 108 to clear the contents of the second encoded data stream buffer 108 via a second buffer control signal 134 (step S3).

The controller 101 internally resets both a first accumulated value corresponding to first encoded data streams, the data sizes of which are to be accumulated, and a second accumulated value corresponding to second encoded data streams to zero (step S4).

Furthermore, the controller 101 outputs a value "×1" as an initial scaling factor onto an encoding parameter indication signal 136, and also a value "×2" as a re-scaling factor onto a re-encoding parameter indication signal 137 (step S5).

After that, the controller 101 instructs the encoder 103 to start its encoding process via an encoder operation control signal 131, and also instructs the re-encoder 107 to start its re-encoding process via a re-encoder operation control signal 132 (step S6).

Figure 13:
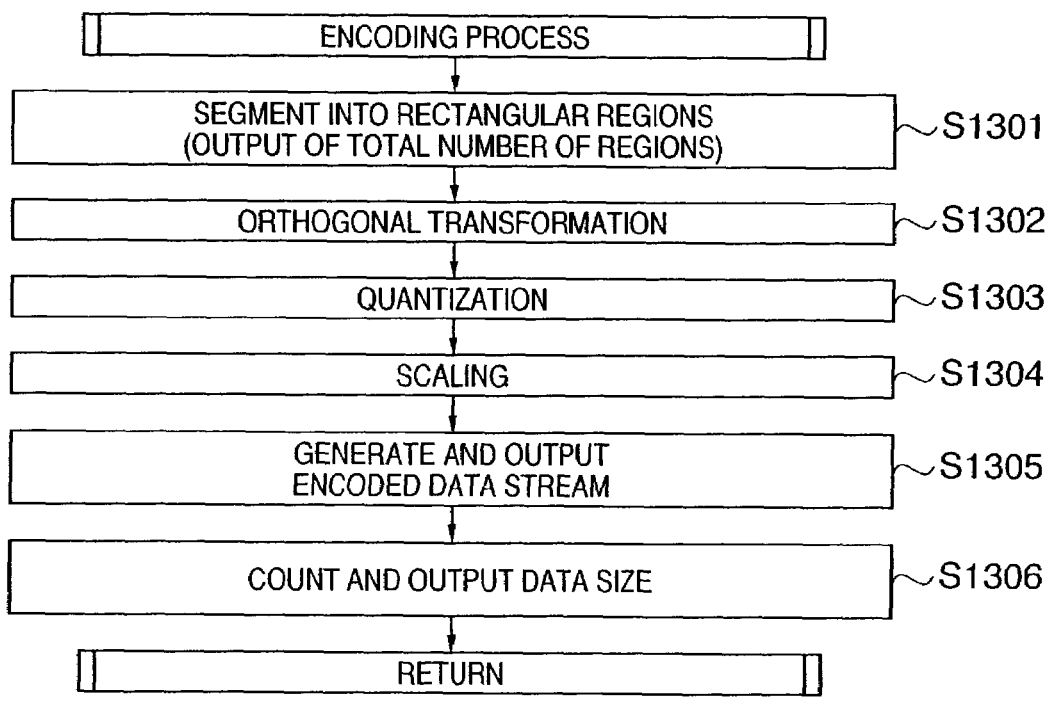
FIG. 13 is a flow chart showing a series of compression-encoding processes executed by the encoder 403.

With the above instruction, the image encoding apparatus practically enters the first encoding phase of the first source image data. FIG. 13 is a flow chart showing a series of compression-encoding processes executed by the encoder 103.

The first source image data, which is supplied from an external apparatus (not shown) such as a document scanner, image sensing unit, or the like via a source image data input signal 121, is partitioned into equal rectangular regions each having a predetermined size by a source image data input unit 102, and is sequentially output onto a to-be-encoded data input signal 122 for respective rectangular regions (step S1301). In this case, the source image data input unit 102 sequentially outputs position information of a rectangular region, which is currently output onto the to-be-encoded data input signal 122, in the source image data (more specifically, the total number of rectangular regions that have already been output) onto a rectangular region position information signal 151 (step S1301).

The source image data for each rectangular region supplied from the source image data input unit 102 to the encoder 103 via the to-be-encoded data input signal 122 is further partitioned into a plurality of equal blocks each consisting of 8 (rows)×8 (columns) samples by an orthogonal transformer 201 in the encoder 103, and undergoes orthogonal transformation operations for respective blocks, thus sequentially outputting a plurality of 8 (rows)×8 (columns) orthogonal transform coefficient matrices obtained as the operation results onto a transform coefficient matrix signal 211 (step S1302).

A quantizer 202 in the encoder 103 makes quantization operations using the plurality of 8 (rows)×8 (columns) orthogonal transform coefficient matrices supplied from the orthogonal transformer 201 via the transform coefficient matrix signal 211, and 8×8 quantization step values supplied from the quantization table 205 via the quantization step signal 214, and sequentially outputs a plurality of 8 (rows)×8 (columns) quantized orthogonal transform coefficient matrices obtained as the operation results onto a quantized transform coefficient matrix signal 212 (step S1303).

A scaling unit 203 in the encoder 103 makes scaling operations of the plurality of 8 (rows)×8 (columns) quantized orthogonal transform coefficient matrices, which are supplied from the quantizer 202 via the quantized transform coefficient matrix signal 212, on the basis of a scaling factor, which is independently designated by the controller 101 via the encoding parameter indication signal 136, and sequentially outputs a plurality of 8 (rows)×8 (columns) scaled orthogonal transform coefficient matrices obtained as the operation results onto a scaled transform coefficient matrix signal 213 (step S1304).

The scaling operations executed by this scaling unit 203 are based on bit-shift operations. In this embodiment, one of four values "×1", "×2", "×4", and "×8" can be selected as the scaling factor, and the value "×N" means that an orthogonal transform coefficient matrix is equivalent to that obtained by quantizing using a quantization table in which all quantization step values corresponding to AC components of orthogonal transform coefficients are multiplied by N. For example, if the scaling factor is "×2", a value obtained by 1-bit arithmetic shifting an AC component of an input orthogonal transform coefficient to the LSB side is used as an operation result; if the scaling factor is "×4" or "×8", a value obtained by 2- or 3-bit arithmetic shifting an AC component to the LSB side is used as an operation result. However, if the scaling factor is "×1", all components of input orthogonal transform coefficients are directly output as operation results. None of scaling factors operates the DC component of the orthogonal transform coefficients.

As the initial scaling factor of the scaling unit 203, this "×1" is set (step S5).

Table 1 below summarizes input values (AC components of orthogonal transform coefficients), and operation results (scaled transform coefficients) in the form of a table in scaling operations executed by the scaling unit 203.

TABLE 1

| Input value | Scaling factor | | | |
|---|---|---|---|---|
| | x1 | x2 | x4 | x8 |
| +1016, . . ., +1023 | ← | +508, . . ., +511 | +254, +255 | +127 |
| +1008, . . ., +1015 | ← | +504, . . ., +507 | +252, +253 | +126 |
| \| | \| | \| | \| | \| |
| +32, . . ., +39 | ← | +16, . . ., +19 | +8, +9 | +4 |
| +24, . . ., +31 | ← | +12, . . ., +15 | +6, +7 | +3 |
| +16, . . ., +23 | ← | +8, . . ., +11 | +4, +5 | +2 |
| +15 | +15 | +7 | +3 | +1 |
| +14 | +14 | +7 | +3 | +1 |
| +13 | +13 | +6 | +3 | +1 |
| +12 | +12 | +6 | +3 | +1 |
| +11 | +11 | +5 | +2 | +1 |
| +10 | +10 | +5 | +2 | +1 |
| +9 | +9 | +4 | +2 | +1 |
| +8 | +8 | +4 | +2 | +1 |
| +7 | +7 | +3 | +1 | 0 |
| +6 | +6 | +3 | +1 | 0 |
| +5 | +5 | +2 | +1 | 0 |
| +4 | +4 | +2 | +1 | 0 |
| +3 | +3 | +1 | 0 | 0 |
| +2 | +2 | +1 | 0 | 0 |
| +1 | +1 | 0 | 0 | 0 |
| 0 | 0 | 0 | 0 | 0 |
| −1 | −1 | 0 | 0 | 0 |
| −2 | −2 | −1 | 0 | 0 |
| −3 | −3 | −1 | 0 | 0 |
| −4 | −4 | −2 | −1 | 0 |
| −5 | −5 | −2 | −1 | 0 |
| −6 | −6 | −3 | −1 | 0 |
| −7 | −7 | −3 | −1 | 0 |
| −15, . . ., −8 | ← | −7, . . ., −4 | −3, −2 | −1 |
| −23, . . ., −16 | ← | −11, . . ., −8 | −5, −4 | −2 |
| −31, . . ., −24 | ← | −15, . . ., −12 | −7, −6 | −3 |
| −39, . . ., −32 | ← | −19, . . ., −16 | −9, −8 | −4 |
| \| | \| | \| | \| | \| |
| −1015, . . ., −1008 | ← | −507, . . ., −504 | −253, −252 | −126 |
| −1023, . . ., −1016 | ← | −511, . . ., −508 | −255, −254 | −127 |

The entropy encoder 204 in the encoder 103 executes linear conversion in a predetermined scan order, runlength encoding of insignificant transform coefficients with zero values, and variable-length encoding with reference to the variable-length code table 206 in turn for the plurality of 8 (rows)×8 (columns) scaled orthogonal transform coefficient matrices, which are supplied from the scaling unit 203 via the scaled transform coefficient matrix signal 213, and outputs a series of encoded data streams corresponding to individual rectangular regions obtained as results onto the first encoded data stream signal 123 (step S1305).

An encoded data size counter 207 counts the data length of each encoded data stream corresponding to each individual rectangular region in the first encoded data streams, which are output from the entropy encoder 204 onto the first encoded data stream signal 123, and outputs the data sizes of the first encoded data streams onto an encoding additional information notification signal 152 (step S1306).

On the other hand, the controller 101 internally and sequentially accumulates, as the first accumulated value, the data sizes of the first encoded data streams corresponding to the individual rectangular regions, which are sequentially supplied from the encoder 103 via the encoding additional information notification signal 152 (step S7).

Four straight lines that start from the origin on the graph shown in FIG. 4 represent the transitions of the accumulated values of the data sizes of four encoded streams corresponding to individual rectangular regions obtained when compression-encoding processes using the four scaling factors "×1", "×2", "×4", and "×8" are virtually executed for the first source image data shown in FIG. 5. An actual accumulated value never increases linearly in this way, but it is represented by a straight line for the sake of simplicity.

On this graph, the transition of the accumulated value of the data sizes of encoded data streams obtained by the compression-encoding processes using the scaling factor "×1" is represented by a straight line Q1(A). When the relative position of rectangular regions that have already undergone compression-encoding is p1, in other words, when all rectangular regions that form segmented region A on the first source image data have undergone the compression-encoding processes, the accumulated value has reached a maximum allowable encoded data size Llim. Hence, no more compression-encoding processes using the scaling factor "×1" for subsequent rectangular regions are required.

Note that the two-dimensional position of the relative position p1 of this rectangular region on the first source image data is indicated on the first source image data illustrated in FIG. 5. Also, segmented region A is illustrated as a group of all rectangular regions from a rectangular region which has undergone a compression-encoding process first (a rectangular region which is located at the upper left corner on the source image data) to a rectangular region located at the relative position p1.

On the graph in FIG. 4, straight lines Q2(A), Q4(A), and Q8(A) respectively represent the transitions of the accumulated values of the data sizes of encoded data streams obtained by compression-encoding processes using the remaining three scaling factors "×2", "×4", and "×8" while the relative position of a rectangular region which is to undergo a compression-encoding process falls within the range of segmented region A on the first source image data. As shown in this graph, the accumulated values of the data sizes of these three encoded data streams respectively reach L2(A), L4(A), and L8(A) when the relative position of the rectangular regions that have already undergone compression-encoding has reached p1.

Therefore, the compression-encoding processes for rectangular regions after the relative position p1 continue for only the three encoded data streams corresponding to the remaining three scaling factors "×2", "×4", and "×8".

On the graph in FIG. 4, straight lines Q2(B), Q4(B), and Q8(B) respectively represent the transitions of the accumulated values of the data sizes of encoded data streams obtained by compression-encoding processes using the remaining three scaling factors "×2", "×4", and "×8" while the relative position of a rectangular region which is to undergo a compression-encoding process falls within the range of segmented region B (from p1 to p2) on the first source image data. As shown in this graph, the accumulated values of the data sizes of these three encoded data streams respectively reach Llim, L4(A+B), and L8(A+B) when the relative position of the rectangular regions that have already undergone compression-encoding has reached p2.

Since the accumulated value of the data sizes of the encoded data streams obtained by the compression-encoding process using the scaling factor "×2" has reached the maximum allowable encoded data size Llim upon completion of compression-encoding processes of all rectangular regions which form segmented regions A and B on the first source image data, no more compression-encoding processes using the scaling factor "×2" for subsequent rectangular regions are required.

Therefore, the compression-encoding processes for rectangular regions after the relative position p2 continue for only the two encoded data streams corresponding to the remaining two scaling factors "×4" and "×8".

In the compression-encoding processes for the first source image data shown in FIG. 5, straight lines Q4(C) and Q8(C) on the graph in FIG. 4 respectively represent the transitions of the accumulated values of the data sizes of encoded data streams obtained by compression-encoding processes using the remaining two scaling factors "×4" and "×8" while the relative position of a rectangular region which is to undergo a compression-encoding process falls within the range of segmented region C (from p2 to 100%) on the first source image data. As shown in this graph, the accumulated values of the data sizes of these two encoded data streams respectively reach L4(A+B+C), and L8(A+B+C) when the relative position of the rectangular regions that have already undergone compression-encoding has reached 100%.

As can be seen from the above description, upon completion of the compression-encoding processes for all rectangular regions that form the first source image data shown in FIG. 5, the final accumulated values of the data sizes of the two encoded data streams obtained by the compression-encoding processes using the two scaling factors "×4" and "×8" do not exceed the maximum allowable encoded data size Llim.

As a result, the encoded data streams obtained by the compression-encoding processes using the scaling factor "×4" as those having a lower compression ratio in term of encoding distortion are optimal encoded data streams to be output from this image encoding apparatus.

In practice, the result indicating that the scaling factor "×4" is an optimal encoding parameter is unknown at the beginning of a series of compression-encoding processes for the first source image data shown in FIG. 5.

First encoded data streams corresponding to individual rectangular regions, which are output onto the first encoded data stream signal 123, are sequentially stored in the first encoded data stream buffer 104 and are also supplied to the re-encoder 107 via the switch 106 and the selected encoded data stream signal 124. FIG. 14 is a flow chart showing the process executed by the re-encoder 107.

A series of encoded data streams corresponding to individual rectangular regions, which are selected by the switch 106 and are supplied to the re-encoder 107 via the selected encoded data stream signal 124, are input to the entropy decoder 301 in the re-encoder 107.

The entropy decoder 301 in the re-encoder 107 executes decoding with reference to the variable-length code table 304, runlength decoding, and two-dimensional conversion in a predetermined scan order in turn for the encoded data streams corresponding to the individual rectangular regions, which are supplied via the selected encoded data stream signal 124, and sequentially outputs a plurality of 8 (rows)×8 (columns) decoded orthogonal transform coefficient matrices obtained as results onto a decoded transform coefficient matrix signal 311 (step S1401).

A scaling unit 302 in the re-encoder 107 makes scaling operations of the plurality of 8 (rows)×8 (columns) decoded orthogonal transform coefficient matrices, which are supplied from the entropy decoder 301 via the decoded transform coefficient matrix signal 311, on the basis of a re-scaling factor independently designated from the controller 101 via the re-encoding parameter instruction signal 137, and sequentially outputs a plurality of 8 (rows)×8 (columns) re-scaled orthogonal transform coefficient matrices obtained as operation results onto a re-scaled transform coefficient matrix signal 312 (step S1402). The scaling operations executed by the scaling unit 302 are the same as those executed in the scaling unit 203 in the encoder 103. As the scaling factor for the scaling unit 302, a fixed value "×2" is always set except for a special case.

The entropy encoder 303 in the re-encoder 107 executes linear conversion in a predetermined scan order, runlength encoding for insignificant transform coefficients with values "0", and variable-length encoding with reference to the variable-length code table 305 in turn for the plurality of 8 (rows)×8 (columns) re-scaled orthogonal transform coefficient matrices, which are supplied from the scaling unit 302 via the re-scaled transform coefficient matrix signal 312, and outputs a series of encoded data streams corresponding to individual rectangular regions obtained as results onto a second encoded data stream signal 127 (step S1403).

An encoded data size counter 306 in the re-encoder 107 counts the data size of each encoded data stream corresponding to each individual rectangular region in the second encoded data streams, which are output from the entropy encoder 303 onto the second encoded data stream signal 127 and serve as substitution candidates, and outputs the data sizes of the second encoded data streams obtained as count results onto a re-encoding additional information notification signal 153 (step S1404).

The data sizes of the second encoded data streams corresponding to individual rectangular regions, which are similarly sequentially supplied from the re-encoder 107 to the controller 101 via the re-encoding additional information notification signal 153, and serve as substitution candidates, are sequentially accumulated as a second accumulated value in the controller 101 (step S8) The second encoded data streams corresponding to individual rectangular regions, which are output onto the second encoded data stream signal 127 and serve as substitution candidates, are sequentially stored in the second encoded data stream buffer 108.

The first encoded data streams, which are sequentially stored in the first encoded data stream buffer 104 during the period of the first encoding phase, i.e., while the relative position of a rectangular region which is to undergo a compression-encoding process falls within the range of segmented region A on the first source image data shown in FIG. 5, are generated from the first source image data by compression-encoding processes using the scaling factor "×1" (initial value) in the encoder 103. Therefore, the transition of the accumulated value of the data sizes, which are accumulated in the controller 101, is represented by a dotted straight line Q1(A), and its final accumulated value is indicated by Llim on the graph in FIG. 6. This dotted straight line Q1(A) corresponds to the straight line Q1(A) already shown on the graph in FIG. 4.

On the other hand, the second encoded data streams, which are sequentially stored in the second encoded data stream buffer 108 during the period of the first encoding phase and serve as substitution candidates, are generated by further executing compression-encoding processes using the scaling factor "×2" in the re-encoder 107 for the first encoded data stream generated by the compression-encoding processes using the scaling factor "×1" in the encoder 103. Therefore, the transition of the accumulated value of the data sizes, which are accumulated in the controller 101, is represented by a solid straight line Q1(A)→Q2(A), and its final accumulated value is indicated by L2(A) on the graph in FIG. 6. This solid straight line Q1(A)→Q2(A) corresponds to the straight line Q2(A) already shown on the graph in FIG. 4.

If it is confirmed that the accumulated value of the data sizes of the first encoded data streams which are stored in the first encoded data stream buffer 104 and correspond to all rectangular regions that form segmented region A on the first source image data has reached the maximum allowable encoded data size Llim, the controller 101 determines that the first encoding phase in progress is to end (step S9).

If such determination is made, the controller 101 instructs the encoder 103 to immediately abort its encoding process via the encoder operation control signal 131, and also instructs the re-encoder 107 to abort its re-encoding process via the re-encoder operation control signal 132 at the same time (step S11).

After that, the controller 101 executes the following control to shift the active phase of the image encoding apparatus from the first encoding phase to the first transfer phase.

The controller 101 outputs an active phase instruction value, which indicates that the current active phase of the image encoding apparatus is a transfer phase, and sets the corresponding switch 106 to the T side, on the active phase instruction signal 135 (step S12).

In response to the active phase instruction signal 135, the switch 106 is connected to output the second encoded data streams which are supplied via a second buffer read signal 128 onto the selected encoded data stream signal 124.

The controller 101 sends an initialization instruction to the first encoded data stream buffer 104 via the first buffer control signal 133 so as to discard the encoded data streams which were stored in the first encoded data stream buffer 104 during the first encoding phase period (step S13).

The controller 101 determines at that time on the basis the first accumulated value, second accumulated value, relative position information of the rectangular regions that have already undergone compression-encoding in the source image data, which is obtained via rectangular region position information signal 151, and the like, if second encoded data streams which serve as "next" substitution candidates are to be generated by the re-encoder 107 during the period of the first transfer phase, which starts from this time (step S14).

If generation of the second encoded data streams that serve as "next" substitution candidates is selected, the controller 101 outputs a value "×2" as a re-scaling factor onto the re-encoding parameter instruction signal 137 (step S15), and instructs the re-encoder 107, which has been instructed to abort its operation previously (step S11), to restart its re-encoding process via the re-encoder operation control signal 132 (step S16).

Irrespective of whether or not second encoded data streams serving as "next" substitution candidates are to be generated, the controller copies the second accumulated value at that time to process it as the first accumulated value, and resets the second accumulated value to zero (step S17).

After that, the controller 101 sends a read instruction to the second encoded data stream buffer 108 via the second buffer control signal 134 and also sends a write instruction to the first encoded data stream buffer 104 via the first buffer control signal 133, so as to transfer the second encoded data streams, which were generated by the re-encoder 107 during the preceding first encoding phase and were stored in the second encoded data stream buffer 108, and which have the accumulated value L2(A) of their data sizes and serve as substitution candidates, to the first encoded data stream buffer 104 (step S18).

In response to these instructions, the image encoding apparatus enters the first transfer phase in practice.

The second encoded data stream corresponding to individual rectangular regions, which are read out from the second encoded data stream buffer 108 via the second buffer read signal 128, and serve as substitution candidates, are sequentially stored (transferred) in the first encoded data stream buffer 104 and also sequentially supplied to the re-encoder 107 via the switch 106 and the selected encoded data stream signal 124.

If generation of the second encoded data streams that serve as "next" substitution candidates is selected, a series of encoded data stream corresponding to individual rectangular regions, which are selected by the switch 106 and are supplied to the re-encoder 107 via the selected encoded data stream signal 124, are entropy-decoded to obtain a plurality of 8 (rows)×8 (columns) decoded orthogonal transform coefficient matrices, which undergo re-scaling operations using a scaling factor "×2", and also undergo entropy encoding, thus outputting a series of encoded data streams corresponding to the individual rectangular regions onto the second encoded data stream signal 127, and also outputting their data sizes onto the re-encoding additional information notification signal 153, as in the encoding phase.

The second encoded data streams corresponding to the individual rectangular regions, which are output onto the second encoded data stream signal 127 and serve as "next" substitution candidates, are sequentially stored again in the second encoded data stream buffer 108.

The second encoded data streams, which are sequentially stored (transferred) in the first encoded data stream buffer 104 during the first transfer phase, are generated by the re-encoding process using the scaling factor "×2" by the re-encoder 107 during the period of the preceding first encoding phase. Therefore, the transition of the accumulated value of the encoded data streams, which are sequentially stored (transferred) in the first encoded data stream buffer 104 during the period of the first transfer phase, is represented by a dotted straight line Q2(A), and its final accumulated value is indicated by L2(A) on the graph in FIG. 6.

On the other hand, if generation of the second encoded data streams that serve as "next" substitution candidates is selected, the second encoded data streams, which are sequentially stored in the second encoded data stream buffer 108 during the period of the first transfer phase and serve as "next" substitution candidates, are generated by further executing the re-encoding process using a scaling factor "×2" in the re-encoder 107 for the second encoded data streams which were generated by the re-encoding process using the scaling factor "×2" by the re-encoder 107 during the period of the first encoding phase. Therefore, the transition of the accumulated value of their data sizes, which are accumulated in the controller 101, is represented by a solid straight line Q2(A)→Q4(A), and its final accumulated value is indicated by L4(A) on the graph in FIG. 6 (step S19).

If it is confirmed that all the second encoded data streams serving as substitution candidates have been stored (transferred) in the first encoded data stream buffer 104 and all the second encoded data streams serving as "next" substitution candidates have been stored in the second encoded data stream buffer 108, it is determined that the first transfer phase in progress is to end, and the control quickly returns to the second encoding phase (step S20).

If such determination is made, and if generation of the second encoded data streams that serve as "next" substitution candidates is selected during the period of the preceding transfer phase, the controller 101 immediately instructs the re-encoder 107 to abort its re-encoding process via the re-encoder operation control signal 132 (step S21).

After that, the controller 101 executes the following control to shift the active phase of the image encoding apparatus from the first transfer phase to the second encoding phase.

The controller 101 outputs an active phase instruction value, which indicates that the current active phase of the image encoding apparatus is an encoding phase, and sets the corresponding switch 106 to the E side again, on the active phase instruction signal 135 (step S22).

In response to the active phase instruction signal 135, the switch 106 is connected to output first encoded data streams supplied via the first encoded data stream signal 123 onto the selected encoded data stream signal 124.

The controller 101 then outputs a value "×2" as an updated scaling factor onto the encoding parameter instruction signal 136 (step S23), and then instructs the encoder 103, the operation of which has been aborted during the period of the preceding first transfer phase, to restart its encoding operation via the encoder operation control signal 131 (step S24).

If generation of the second encoded data streams that serve as "next" substitution candidates is selected during the period of the preceding first transfer phase, the controller 101 determines that the re-encoding process of the re-encoder 107 also continues during the period of the second encoding phase which starts from this time (step S25), outputs a value "×2" as a re-scaling factor onto the re-encoding parameter instruction signal 137 (step S26), and then instructs the re-encoder 107, which has been instructed to abort its operation previously (step S21), to restart its re-encoding process via the re-encoder operation control signal 132 (step S27).

In response to this instruction, the image encoding apparatus enters the second encoding phase in practice.

The source image data input unit 102 restarts the output operation of rectangular regions, which has been aborted during the period of the preceding first transfer phase, from a rectangular region immediately after the relative position p1 in the first source image data. Also, the encoding process by the encoder 103 is executed according to the flow chart shown in FIG. 13.

That is, source image data of rectangular regions, which are segmented by and output from the source image data input unit 102 and are supplied to the encoder 103 via the to-be-encoded data input signal 122, undergo orthogonal transformation and quantization operations to obtain a plurality of 8 (rows)×8 (columns) quantized orthogonal transform coefficient matrices, which then undergo scaling operations using the scaling factor "×2" and also undergo entropy encoding, thus outputting a series of encoded data streams corresponding to individual rectangular regions onto the first encoded data stream signal 123, and also outputting their data sizes onto encoding additional information notification signal 152 as in the preceding encoding phase.

The first encoded data streams corresponding to individual rectangular regions, which are output onto the first encoded data stream signal 123, are sequentially stored in the first encoded data stream buffer 104 and also supplied to the re-encoder 107 via the switch 106 and the selected encoded data stream signal 124.

In this case, the first encoded data stream buffer 104 stores the input first encoded data streams in turn from the position that follows the encoded data streams of the scaling factor "×2" which are stored (transferred) during the period of the first transfer phase, and correspond to segmented region A on the first source image data.

A series of encoded data streams corresponding to individual rectangular regions, which are selected by the switch 106, and are supplied to the re-encoder 107 via the selected encoded data stream signal 124, are entropy-decoded to obtain a plurality of 8 (rows)×8 (columns) decoded orthogonal transform coefficient matrices, which undergo re-scaling operations using a scaling factor "×2", and also undergo entropy encoding, thus outputting a series of encoded data streams corresponding to the individual rectangular regions onto the second encoded data stream signal 127, and also outputting their data sizes onto the re-encoding additional information notification signal 153, as in the preceding transfer phase.

The second encoded data streams corresponding to individual rectangular regions, which are output onto the second encoded data stream signal 127, and serve as substitution candidates, are sequentially stored again in the second encoded data stream buffer 108.

In this case, the second encoded data stream buffer 108 stores the second encoded data streams in turn from the position that follows the encoded data streams of the scaling factor "×4", which are stored in the preceding first transfer phase and correspond to segmented region A on the first source image.

The first encoded data streams, which are sequentially stored in the first encoded data stream buffer 104 during the period of the second encoding phase, i.e., while the relative position of a rectangular region which is to undergo a compression-encoding process falls within the range of segmented region B on the first source image data shown in FIG. 5, are generated from the first source image data by compression-encoding processes using the scaling factor "×2" in the encoder 103. Therefore, the transition of the accumulated value of the data sizes, which are accumulated in the controller 101, is represented by a dotted straight line Q2(B), and its final accumulated value is indicated by Llim on the graph in FIG. 6. This dotted straight line Q2(B) corresponds to the straight line Q2(B) already shown on the graph in FIG. 4.

On the other hand, the second encoded data streams, which are sequentially stored in the second encoded data stream buffer 108 during the period of the second encoding phase and serve as substitution candidates, are generated by further executing compression-encoding processes using the scaling factor "×2" in the re-encoder 107 for the first encoded data stream generated by the compression-encoding processes using the scaling factor "×2" in the encoder 103. Therefore, the transition of the accumulated value of the data sizes, which are accumulated in the controller 101, is represented by a solid straight line Q2(B)→Q4(B), and its final accumulated value is indicated by L4(A+B) on the graph in FIG. 6. This solid straight line Q2(B)→Q4(B) corresponds to the straight line Q4(B) already shown on the graph in FIG. 4.

If it is confirmed that the accumulated value of the data sizes of the first encoded data streams which are stored in the first encoded data stream buffer 104 and correspond to all rectangular regions that form segmented regions A and B on the first source image data has reached the maximum allowable encoded data size Llim, the controller 101 determines that the second encoding phase in progress is to end (step S9).

If such determination is made, the controller 101 instructs the encoder 103 to immediately abort its encoding process via the encoder operation control signal 131, and also instructs the re-encoder 107 to abort its re-encoding process via the re-encoder operation control signal 132 at the same time (step S11).

After that, the controller 101 executes the following control to shift the active phase of the image encoding apparatus from the second encoding phase to the second transfer phase.

The controller 101 outputs an active phase instruction value, which indicates that the current active phase of the image encoding apparatus is a transfer phase, and sets the corresponding switch 106 to the T side, on the active phase instruction signal 135 (step S12).

In response to the active phase instruction signal 135, the switch 106 is connected to output the second encoded data streams which are supplied via the second buffer read signal 128 onto the selected encoded data stream signal 124.

The controller 101 sends an initialization instruction to the first encoded data stream buffer 104 via the first buffer control signal 133 so as to discard the encoded data streams which were stored in the first encoded data stream buffer 104 during the first transfer phase and the second encoding phase period (step S13).

The controller 101 determines at that time on the basis the first accumulated value, second accumulated value, relative position information of the rectangular regions that have already undergone compression-encoding in the source image data, which is obtained via rectangular region position information signal 151, and the like, if second encoded data streams which serve as "next" substitution candidates are to be generated by the re-encoder 107 during the period of the second transfer phase, which starts from this time (step S14).

If generation of the second encoded data streams that serve as "next" substitution candidates is selected, the controller 101 outputs a value "×2" as a re-scaling factor onto the re-encoding parameter instruction signal 137 (step S15), and instructs the re-encoder 107, which has been instructed to abort its operation previously (step S11), to restart its re-encoding process via the re-encoder operation control signal 132 (step S16).

Irrespective of whether or not second encoded data streams serving as "next" substitution candidates are to be generated, the controller copies the second accumulated value at that time to process it as the first accumulated value, and resets the second accumulated value to zero (step S17).

After that, the controller 101 sends a read instruction to the second encoded data stream buffer 108 via the second buffer control signal 134 and also sends a write instruction to the first encoded data stream buffer 104 via the first buffer control signal 133, so as to transfer the second encoded data streams, which were generated by the re-encoder 107 during the periods of the preceding first transfer phase and the second encoding phase and were stored in the second encoded data stream buffer 108, and which have the accumulated value L4(A+B) of their data sizes and serve as substitution candidates, to the first encoded data stream buffer 104 (step S18).

In response to these instructions, the image encoding apparatus enters the second transfer phase in practice.

The second encoded data stream corresponding to individual rectangular regions, which are read out from the second encoded data stream buffer 108 via the second buffer read signal 128, and serve as substitution candidates, are sequentially stored (transferred) in the first encoded data stream buffer 104 and also sequentially supplied to the re-encoder 107 via the switch 106 and the selected encoded data stream signal 124.

If generation of the second encoded data streams that serve as "next" substitution candidates is selected, a series of encoded data stream corresponding to individual rectangular regions, which are selected by the switch 106 and are supplied to the re-encoder 107 via the selected encoded data stream signal 124, are entropy-decoded to obtain a plurality of 8 (rows)×8 (columns) decoded orthogonal transform coefficient matrices, which undergo re-scaling operations using a scaling factor "×2", and also undergo entropy encoding, thus outputting a series of encoded data streams corresponding to the individual rectangular regions onto the second encoded data stream signal 127, and also outputting their data sizes onto the re-encoding additional information notification signal 153, as in the encoding phase.

The second encoded data streams corresponding to the individual rectangular regions, which are output onto the second encoded data stream signal 127 and serve as "next" substitution candidates, are sequentially stored again in the second encoded data stream buffer 108.

The second encoded data streams, which are sequentially stored (transferred) in the first encoded data stream buffer 104 during the period of the second transfer phase, are generated by the re-encoding process using the scaling factor "×2" by the re-encoder 107 during the periods of the preceding first transfer process and second encoding phase. Therefore, the transition of the accumulated value of the encoded data streams, which are sequentially stored (transferred) in the first encoded data stream buffer 104 during the period of the first transfer phase, is represented by a dotted straight line Q4(A+B), and its final accumulated value is indicated by L4(A+B) on the graph in FIG. 6.

On the other hand, if generation of the second encoded data streams that serve as "next" substitution candidates is selected, the second encoded data streams, which are sequentially stored in the second encoded data stream buffer 108 during the period of the second transfer phase and serve as "next" substitution candidates, are generated by further executing the re-encoding process using a scaling factor "×2" in the re-encoder 107 for the second encoded data streams which were generated by the re-encoding process using the scaling factor "×2" by the re-encoder 107 during the period of the preceding second encoding phase. Therefore, the transition of the accumulated value of their data sizes, which are accumulated in the controller 101, is represented by a solid straight line Q4(A+B)→Q8(A+B), and its final accumulated value is indicated by L8(A+B) on the graph in FIG. 6 (step S19).

If it is confirmed that all the second encoded data streams serving as substitution candidates have been stored (transferred) in the first encoded data stream buffer 104 and all the second encoded data streams serving as "next" substitution candidates have been stored in the second encoded data stream buffer 108, it is determined that the second transfer phase in progress is to end, and the control quickly returns to the third encoding phase (step S20).

If such determination is made, and if generation of the second encoded data streams that serve as "next" substitution candidates is selected during the period of the preceding transfer phase, the controller 101 immediately instructs the re-encoder 107 to abort its re-encoding process via the re-encoder operation control signal 132 (step S21).

After that, the controller 101 executes the following control to shift the active phase of the image encoding apparatus from the second transfer phase to the third encoding phase.

The controller 101 outputs an active phase instruction value, which indicates that the current active phase of the image encoding apparatus is an encoding phase, and sets the corresponding switch 106 to the E side again, on the active phase instruction signal 135 (step S22).

In response to the active phase instruction signal 135, the switch 106 is connected to output first encoded data streams supplied via the first encoded data stream signal 123 onto the selected encoded data stream signal 124.

The controller 101 then outputs a value "×4" as an updated scaling factor onto the encoding parameter instruction signal 136 (step S23), and then instructs the encoder 103, the operation of which has been aborted during the period of the preceding second transfer phase, to restart its encoding operation via the encoder operation control signal 131 (step S24).

If generation of the second encoded data streams that serve as "next" substitution candidates is selected during the period of the preceding second transfer phase, the controller 101 determines that the re-encoding process of the re-encoder 107 also continues during the period of the third encoding phase which starts from this time (step S25), outputs a value "×2" as a re-scaling factor onto the re-encoding parameter instruction signal 137 (step S26), and then instructs the re-encoder 107, which has been instructed to abort its operation previously (step S21), to restart its re-encoding process via the re-encoder operation control signal 132 (step S27).

In response to this instruction, the image encoding apparatus enters the third encoding phase in practice.

The source image data input unit 102 restarts the output operation of rectangular regions, which has been aborted during the period of the preceding second transfer phase, from a rectangular region immediately after the relative position p2 in the first source image data.

Source image data of rectangular regions, which are segmented by and output from the source image data input unit 102 and are supplied to the encoder 103 via the to-be-encoded data input signal 122, undergo orthogonal transformation and quantization operations to obtain a plurality of 8 (rows)×8 (columns) quantized orthogonal transform coefficient matrices, which then undergo scaling operations using the scaling factor "×4" and also undergo entropy encoding, thus outputting a series of encoded data streams corresponding to individual rectangular regions onto the first encoded data stream signal 123, and also outputting their data sizes onto encoding additional information notification signal 152 as in the preceding encoding phase.

The first encoded data streams corresponding to individual rectangular regions, which are output onto the first encoded data stream signal 123, are sequentially stored in the first encoded data stream buffer 104 and also supplied to the re-encoder 107 via the switch 106 and the selected encoded data stream signal 124.

In this case, the first encoded data stream buffer 104 stores the input first encoded data streams in turn from the position that follows the encoded data streams of the scaling factor "×4" which are stored (transferred) during the period of the second transfer phase, and correspond to segmented regions A and B on the first source image data.

A series of encoded data streams corresponding to individual rectangular regions, which are selected by the switch 106, and are supplied to the re-encoder 107 via the selected encoded data stream signal 124, are entropy-decoded to obtain a plurality of 8 (rows)×8 (columns) decoded orthogonal transform coefficient matrices, which undergo re-scaling operations using a scaling factor "×2", and also undergo entropy encoding, thus outputting a series of encoded data streams corresponding to the individual rectangular regions onto the second encoded data stream signal 127, and also outputting their data sizes onto the re-encoding additional information notification signal 153, as in the preceding transfer phase.

The second encoded data streams corresponding to individual rectangular regions, which are output onto the second encoded data stream signal 127, and serve as substitution candidates, are sequentially stored again in the second encoded data stream buffer 108.

In this case, the second encoded data stream buffer 108 stores the second encoded data streams in turn from the position that follows the encoded data streams of the scaling factor "×8", which are stored in the preceding second transfer phase and correspond to segmented regions A and B on the first source image.

The first encoded data streams, which are sequentially stored in the first encoded data stream buffer 104 during the period of the third encoding phase, i.e., while the relative position of a rectangular region which is to undergo a compression-encoding process falls within the range of segmented region C on the first source image data shown in FIG. 5, are generated from the first source image data by compression-encoding processes using the scaling factor "×4" in the encoder 103. Therefore, the transition of the accumulated value of the data sizes, which are accumulated in the controller 101, is represented by a dotted straight line Q4(C), and its final accumulated value is indicated by L4(A+B+C) on the graph in FIG. 6. This dotted straight line Q4(C) corresponds to the straight line Q4(C) already shown on the graph in FIG. 4.

On the other hand, the second encoded data streams, which are sequentially stored in the second encoded data stream buffer 108 during the period of the third encoding phase and serve as substitution candidates, are generated by further executing compression-encoding processes using the scaling factor "×4" in the re-encoder 107 for the first encoded data stream generated by the compression-encoding processes using the scaling factor "×2" in the encoder 103. Therefore, the transition of the accumulated value of the data sizes, which are accumulated in the controller 101, is represented by a solid straight line Q4(C)→Q8(C), and its final accumulated value is indicated by L8(A+B+C) on the graph in FIG. 6. This solid straight line Q4(C)→Q8(C) corresponds to the straight line Q8(C) already shown on the graph in FIG. 4.

If it is confirmed that the accumulated value of the data sizes of the first encoded data streams which are stored in the first encoded data stream buffer 104 and correspond to all rectangular regions that form the first source image data does not exceed the maximum allowable encoded data size Llim, the controller 101 determines that the third encoding phase in progress is to end (step S10).

If such determination is made, the controller 101 instructs the encoder 103 to immediately end its encoding process via the encoder operation control signal 131, and also instructs the re-encoder 107 to end its re-encoding process via the re-encoder operation control signal 132 at the same time (step S28).

Subsequently, the controller 101 sends a read instruction to the first encoded data stream buffer 14 so as to output the encoded data streams, which are stored in the first encoded data stream buffer 104 during the periods of the preceding second transfer phase and third encoding phase, and have the accumulated value L4(A+B+C) of their data sizes, from the image encoding apparatus (step S29).

An encoded data stream output unit 105 combines the encoded data streams corresponding to individual rectangular regions, which are read out from the first encoded data stream buffer 104 via the first buffer read signal 125, into one encoded data stream for the entire first source image data, and outputs that encoded data stream onto an encoded data stream output signal 126 as the result of the compression-encoding processes of the image encoding apparatus.

The image encoding apparatus of this embodiment ends a series of compression-encoding processes for the first source image data upon completion of the output process of the encoded data stream from the encoded data stream output unit 105 (step S30).

In a series of compression-encoding processes for the first source image data mentioned above, since a final encoded data stream is generated by the compression-encoding process using the scaling factor "×4", a total of two transfer phases are inserted to update the scaling factors and to transfer encoded data streams serving as substitution candidates accordingly.

Furthermore, second encoded data streams which serve as "next" substitution candidates and correspond to the scaling factor "×8" are generated by the re-encoding process by the re-encoder 107 during the periods of the second transfer phase and subsequent third encoding phase.

As a constream, the second encoded data streams serving as last substitution candidates end up by "candidates", and are never output from the image encoding apparatus. This is because when the active phase of the image encoding apparatus shifts to the second transfer phase, the controller 101 determines in step S14 that encoded data streams serving as "next" substitution candidates are to be generated.

As described above, according to the image encoding apparatus and method of this embodiment, since the data size of the image compression-encoding result can be suppressed to be equal to or smaller than a predetermined size, and no redundant processes are required unlike in the conventional compression-encoding process, the time required for the compression-encoding process can be shortened compared to the conventional method.

[Second Embodiment]

In this embodiment, processes upon compression-encoding a second source image, which is different from the first source image, using the image encoding apparatus with the arrangement shown in FIG. 1, will be explained. The first source image requires three encoding phases, but the second source image is an image to be compression-encoded in four encoding phases.

Figure 7:
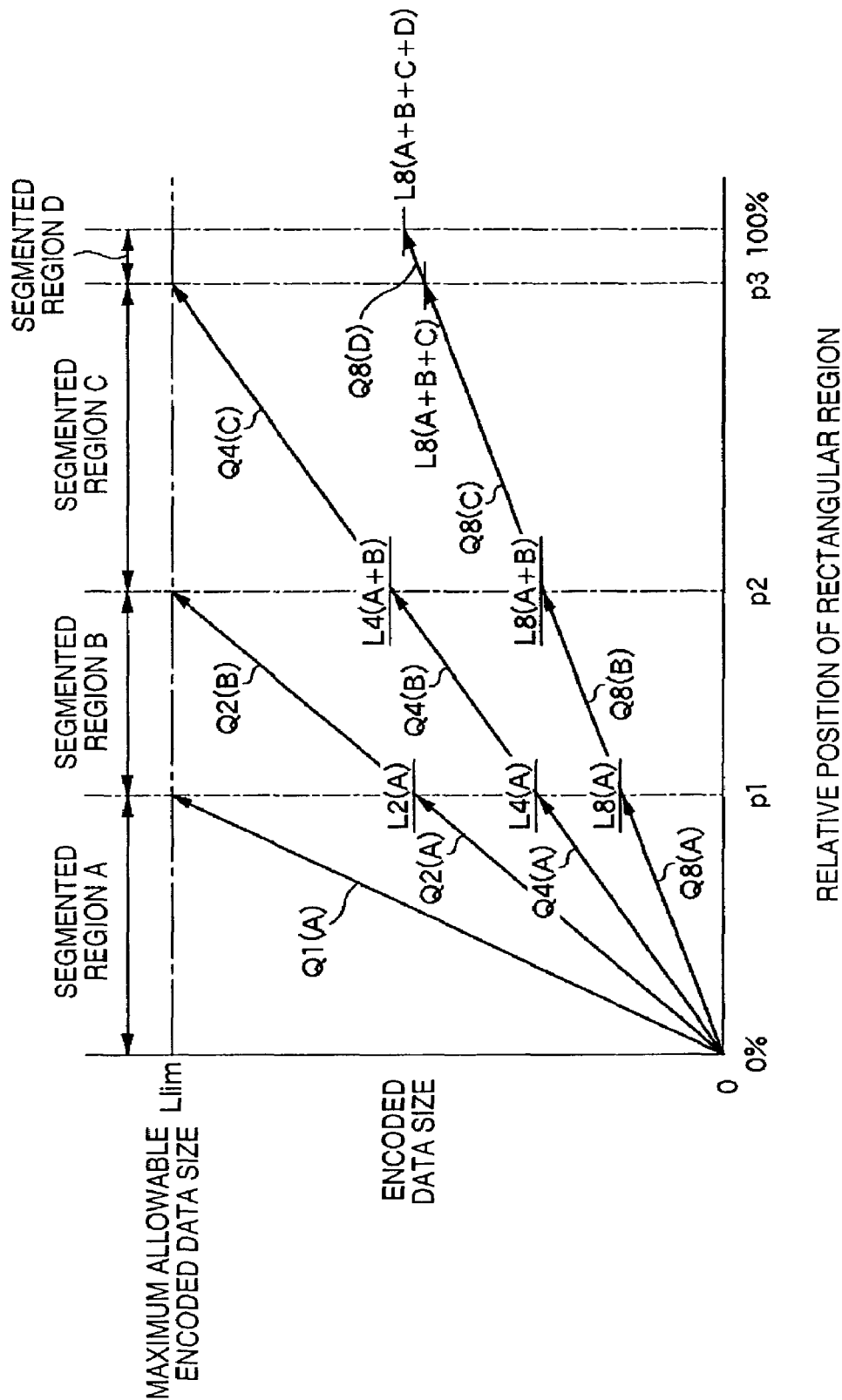
FIG. 7 is a graph showing the relationship between the accumulated value of the data sizes of encoded data streams (ordinate) obtained when compression-encoding processes of second source image data input as data to be encoded to the image encoding apparatus shown in FIG. 1 are sequentially executed for respective rectangular regions using a single quantization table and four different quantization scaling factors ×1, ×2, ×3, and ×4, and the relative position of a rectangular region that has already undergone the compression-encoding process at that time in the source image data (abscissa)
Figure 8:
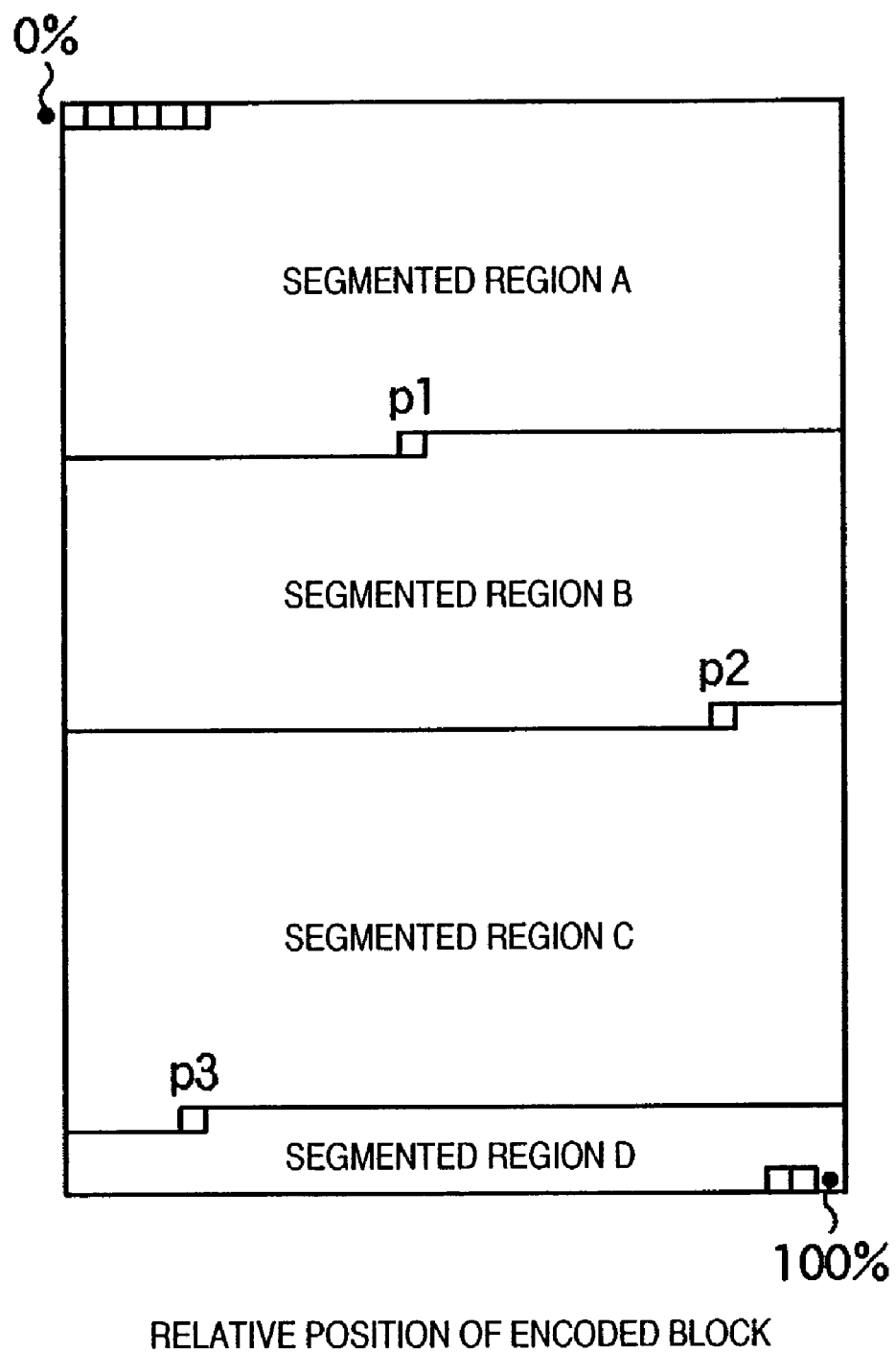
FIG. 8 shows the second source image.
Figure 9:
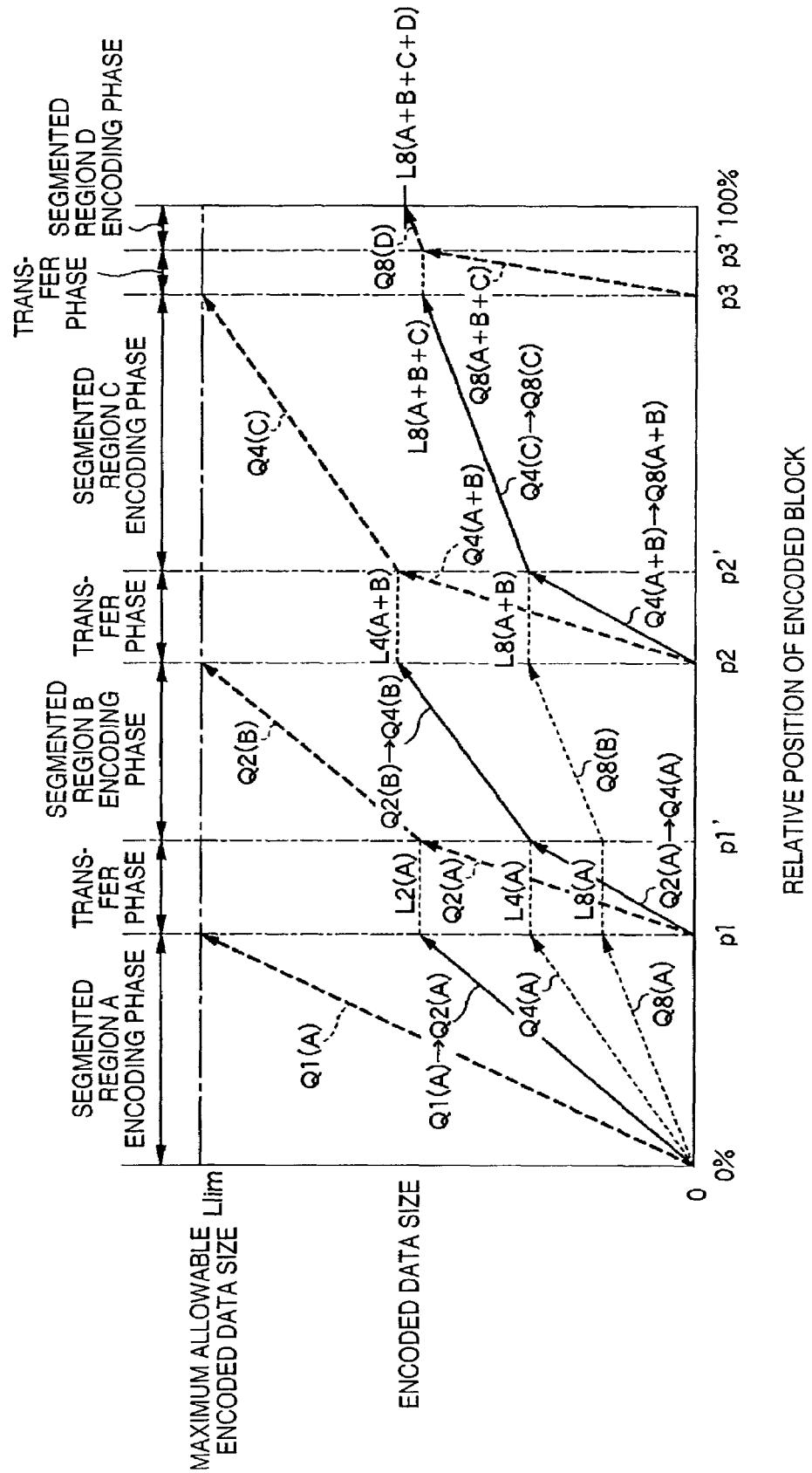
FIG. 9 is a graph showing the relationship between the accumulated value of the data sizes of encoded data streams (ordinate) stored in the first and second encoded data stream buffers 104 and 108 during a series of compression-encoding processes for the second source image input as data to be encoded to the image encoding apparatus shown in FIG. 1, and the relative position of a rectangular region that has already undergone the compression-encoding process at that time in the source image data (abscissa)

FIG. 7 is a graph showing the relationship between the accumulated value of the data sizes of encoded data streams (ordinate) obtained when compression-encoding processes of the second source image data input as data to be encoded to the image encoding apparatus shown in FIG. 1 are sequentially executed for respective rectangular regions using a single quantization table and four different quantization scaling factors ×1, ×2, ×3, and ×4, and the relative position of a rectangular region that has already undergone the compression-encoding process at that time in the source image data (abscissa). FIG. 8 shows the second source image. FIG. 9 is a graph showing the relationship between the accumulated value of the data sizes of encoded data streams (ordinate) stored in the first and second encoded data stream buffers 104 and 108 during a series of compression-encoding processes for the second source image input as data to be encoded to the image encoding apparatus shown in FIG. 1, and the relative position of a rectangular region that has already undergone the compression-encoding process at that time in the source image data (abscissa).

A series of compression-encoding processes that the image encoding apparatus of this embodiment executes for the second source image data shown in FIG. 8 will be described below using FIGS. 1 to 3 and FIGS. 7 to 10C. Note that the compression-encoding process in this embodiment follows the flow chart shown in FIGS. 10A to 10C.

Four straight lines that start from the origin on the graph shown in FIG. 7 represent the transitions of the accumulated values of the data sizes of four encoded streams corresponding to individual rectangular regions obtained when compression-encoding processes using the four scaling factors "×1", "×2", "×4", and "×8" are executed for the second source image data shown in FIG. 8.

On this graph, the transitions of the accumulated values of the data sizes of encoded data streams obtained by the compression-encoding processes using the scaling factors "×1", "×2", "×4", and "×8" while the relative position of a rectangular region which is to undergo the compression-encoding process falls within the range of segmented region A on the second source image data are represented by straight lines Q1(A), Q2(A), Q4(A), and Q8(A). As shown in this graph, when the relative position of rectangular regions that have already undergone compression-encoding is p1, the accumulated values of the data sizes of these four encoded data streams have reached Llim, L2(A), L4(A), and L8(A).

Since the accumulated value of the data sizes of encoded data streams, which are obtained by the compression-encoding process using the scaling factor "×1", has reached the maximum allowable encoded data size Llim upon completion of the compression-encoding process of all rectangular regions which form segmented region A on the second source image data, no more compression-encoding processes using the scaling factor "×1" for subsequent rectangular regions are required.

Therefore, the compression-encoding processes for rectangular regions after the relative position p1 continue for only the three encoded data streams corresponding to the remaining three scaling factors "×2", "×4", and "×8".

On the graph in FIG. 7, straight lines Q2(B), Q4(B), and Q8(B) respectively represent the transitions of the accumulated values of the data sizes of encoded data streams obtained by compression-encoding processes using the remaining three scaling factors "×2", "×4", and "×8" while the relative position of a rectangular region which is to undergo a compression-encoding process falls within the range of segmented region B (from p1 to p2) on the second source image data. As shown in this graph, the accumulated values of the data sizes of these three encoded data streams respectively reach Llim, L4(A+B), and L8(A+B) when the relative position of the rectangular regions that have already undergone compression-encoding has reached p2.

Since the accumulated value of the data sizes of the encoded data streams obtained by the compression-encoding process using the scaling factor "×2" has reached the maximum allowable encoded data size Llim upon completion of compression-encoding processes of all rectangular regions which form segmented regions A and B on the second source image data, no more compression-encoding processes using the scaling factor "×2" for subsequent rectangular regions are required.

Therefore, the compression-encoding processes for rectangular regions after the relative position p2 continue for only the two encoded data streams corresponding to the remaining two scaling factors "×4" and "×8".

In the compression-encoding processes for the second source image data shown in FIG. 8, straight lines Q4(C) and Q8(C) on the graph in FIG. 7 respectively represent the transitions of the accumulated values of the data sizes of encoded data streams obtained by compression-encoding processes using the remaining two scaling factors "×4" and "×8" while the relative position of a rectangular region which is to undergo a compression-encoding process falls within the range of segmented region C (from p2 to p3) on the second source image data. As shown in this graph, the accumulated values of the data sizes of these two encoded data streams respectively reach Llim and L8(A+B+C) when the relative position of the rectangular regions that have already undergone compression-encoding has reached p3.

Since the accumulated value of the data sizes of the encoded data streams obtained by the compression-encoding process using the scaling factor "×4" has reached the maximum allowable encoded data size Llim upon completion of compression-encoding processes of all rectangular regions which form segmented regions A, B, and C on the second source image data, no more compression-encoding processes using the scaling factor "×4" for subsequent rectangular regions are required.

Therefore, the compression-encoding processes for rectangular regions after the relative position p3 continue for only the encoded data streams corresponding to the remaining scaling factor "×8".

In the compression-encoding processes for the second source image data shown in FIG. 8, the transitions of the accumulated values of the data sizes of encoded data streams obtained by compression-encoding processes using the remaining scaling factor "×8" while the relative position of a rectangular region which is to undergo a compression-encoding process falls within the range of segmented region D (from p3 to 100%) on the second source image data is represented by a straight line Q8(D) on the graph in FIG. 7. As shown in this graph, the accumulated value of the data sizes of the encoded data streams reach L8(A+B+C+D) when the relative position of the rectangular regions that have already undergone compression-encoding has reached 100%.

As can be seen from the above description, upon completion of the compression-encoding processes for all rectangular regions that form the second source image data shown in FIG. 8, the final accumulated value of the data sizes of the two encoded data streams obtained by the compression-encoding processes using the scaling factor "×8" does not exceed the maximum allowable encoded data size Llim.

As a result, the encoded data streams obtained by the compression-encoding processes using the scaling factor "×8" are optimal encoded data streams to be output from this image encoding apparatus.

Upon executing a series of compression-encoding processes in the image encoding apparatus for the second source image data in practice, the transitions of the accumulated values of the data sizes of encoded data streams which are stored in the first and second encoded data stream buffers 104 and 108 are as shown in FIG. 9.

As can be seen from FIG. 9, in a series of compression-encoding processes for the second source image data, a final encoded data stream is generated by the compression-encoding process using the scaling factor "×8", three transfer phases are inserted to update the scaling factors and to transfer encoded stream data serving as substitution candidates accordingly.

However, in the example of the second source image data, the re-encoder 107 does not execute any re-encoding process for generating second encoded data streams that serve as "next" substitution candidates during the periods of the third transfer phase and subsequent four encoding phase.

This is because when the active phase of the image encoding apparatus shifts to the third transfer phase, the controller 101 determines in step S14 that encoded data streams serving as "next" substitution candidates need not be generated.

As described above, in the image encoding apparatus of the first and second embodiments, the controller 101 controls shift between the encoding and transfer phases as two active phases during a series of compression-encoding processes.

Upon aborting the encoding phase in progress and shifting to the transfer phase due to necessity of updating of an encoding parameter (scaling factor), the controller 101 determines using a predetermined determination criterion based on the first and second accumulated values, relative position information of the rectangular regions that have already undergone compression-encoding in the source image data, which is obtained via rectangular region position information signal 151, and the like, whether or not new encoded data streams which can be "next" substitution candidates are to be generated by a re-encoding process. This determination criterion is based on the predicted probability indicating if encoded data streams that can be still "next" substitution candidates can be actually transferred to the first encoded stream buffer during the period of the next transfer phase.

For example, the method of calculating the predicted probability exploits the statistical nature that the probability becomes lower with decreasing ratio of remaining rectangular regions that have not undergone compression-encoding at the shift timing to the transfer phase on the source image data, and the probability becomes lower with decreasing accumulated value of the data sizes of encoded data streams which are stored in the second encoded data stream buffer at that time and serve as latest substitution candidates, the statistical nature of source image data itself such as the maximum data size of an encoded data stream for each rectangular region, and the like, and so forth.

[Third Embodiment]

In the image encoding apparatus of the first and second embodiments, the re-encoding process in the dedicated re-encoder 107 is adopted as implementation means for generating encoded data streams that serve as "next" substitution candidates during the period of the transfer phase. Also, the re-encoder 107 that receives first encoded data streams generated by the encoder 103 (encoded data streams that serve as output candidates) is adopted as both implementation means for generating encoded data streams which serve as first substitution candidates during the period of the first encoding phase, and implementation for generating subsequent encoded data streams serving as the substitution candidates during the period of the encoding phase that follows the preceding transfer phase.

This arrangement is advantageous for the purpose of suppressing a circuit scale since the operation rate of the re-encoder 107 increases. However, for the re-encoding process of already generated encoded data streams, a busy state may occur with relatively high possibility on the flow control upon data transfer of the re-encoder, since the number of processing cycles associated with the re-encoding process increases. Hence, such problem may deteriorate the performance of a series of compression-encoding processes as the whole image encoding apparatus.

From such viewpoint, an arrangement in which an encoder simultaneously generates first encoded data streams, and encoded data streams which serve as substitution candidates as implementation means for generating subsequent encoded data streams which serve as the substitution candidates during the period of an encoding phase may be used.

Figure 11:
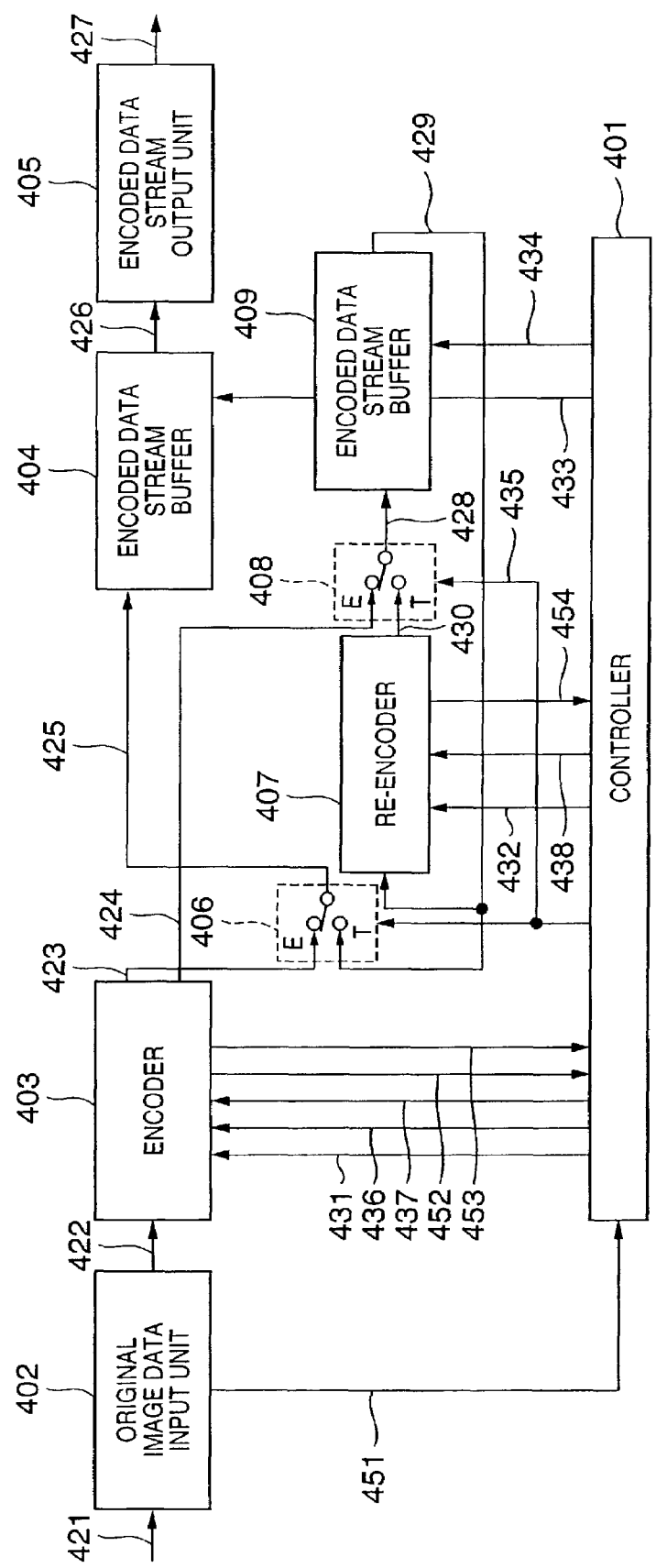
FIG. 11 is a block diagram showing the arrangement of an image encoding apparatus in the third embodiment of the present invention.
Figure 12:
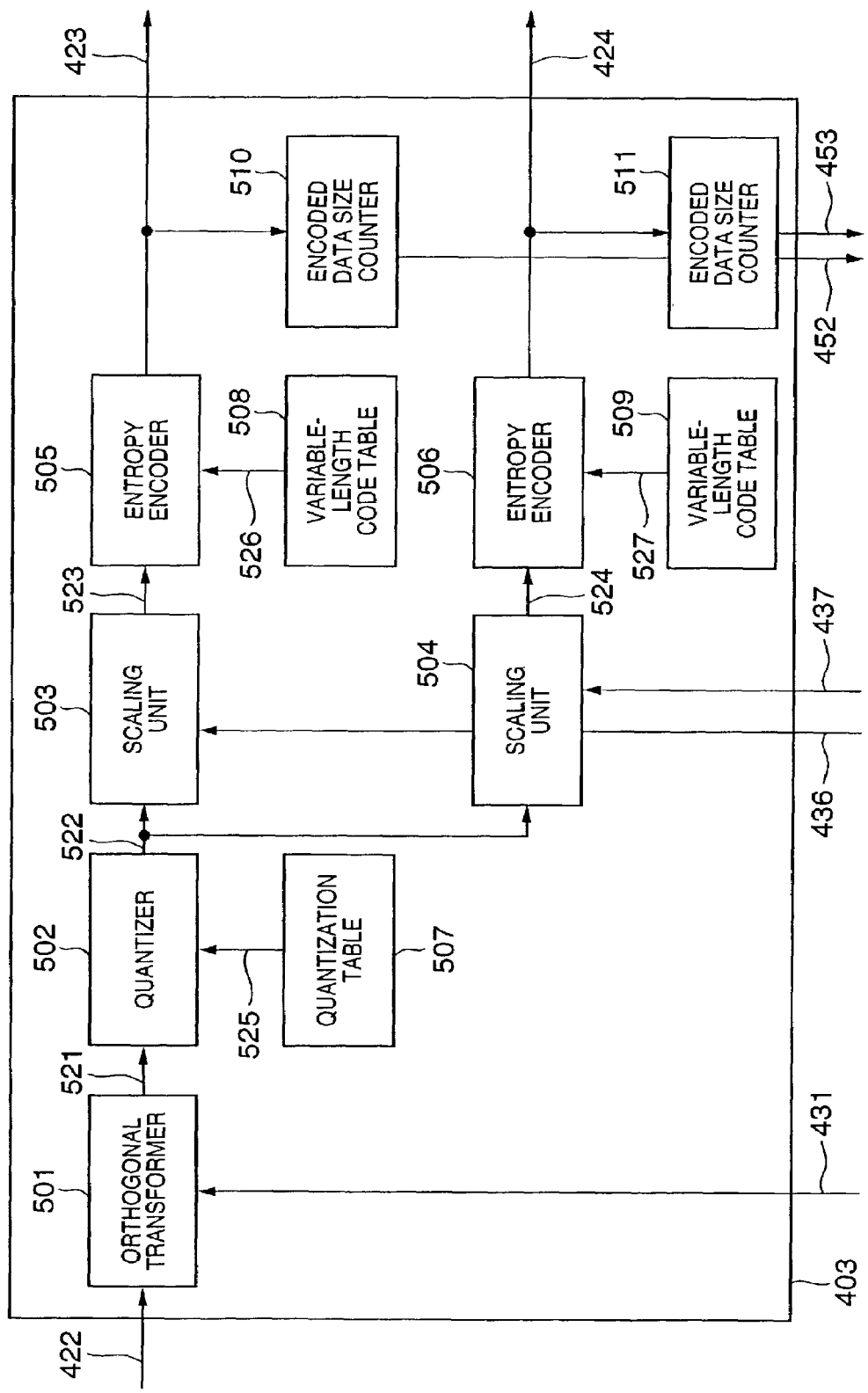
FIG. 12 is a block diagram showing the arrangement of an encoder 403 in the image encoding apparatus shown in FIG. 11.

FIG. 11 is a block diagram showing the arrangement of the image encoding apparatus of this embodiment, which adopts the aforementioned arrangement. FIG. 12 is a block diagram showing the arrangement of an encoder 403 in the image encoding apparatus shown in FIG. 11.

In the image encoding apparatus of this embodiment, two different encoded data streams generated by the encoder 403 during the period of an encoding phase, i.e., first encoded data streams that serve as output candidates are sequentially stored in a first encoded data stream buffer 404 via a first encoded data stream signal 423, first switch 406, and selected encoded data stream signal 425. At the same time, second encoded data streams that serve as substitution candidates are sequentially stored in a second encoded data stream buffer 409 via a second encoded data stream signal 424, second switch 408, and second buffer write signal 428.

The encoder 403 receives, from a controller 401, independent encoding parameters for the two different encoded data streams via first and second encoding parameter instruction signals 436 and 437.

For example, when a scaling factor "×2" is instructed on the first encoding parameter instruction signal 436, a scaling factor "×4" is instructed on the second encoding parameter instruction signal 437. In this manner, the second encoded data streams corresponding to the second encoding parameter instruction signal 437 become substitution candidates for the first encoded data streams.

For example, encoded data streams, which are to undergo a re-encoding process may be adaptively selected on the basis of, e.g., the ratio of the accumulated data size of respective encoded data streams to the target encoded data size at the time when shift to the re-encoding process is determined.

Other processes can be done in the same manner as in the first and second embodiments.

The aforementioned embodiments will be summarized below. That is, upon executing so-called information size control involved in a series of compression-encoding processes for input image data, the control means in the image encoding apparatus in an encoding phase determines as needed on the basis of the maximum allowable encoded data size, which is set in advance, the ratio of a set region of rectangular regions that have already undergone the encoding process so far to the source image data, an independently calculated target encoded data size, the accumulated value of the data sizes of encoded data streams generated so far, and the like if the encoding phase is to be continued.

If the control means determines using a predetermined determination criterion that the compression-encoding process using the current encoding parameter is to end, the control means shifts to "transfer mode" and executes various kinds of operation control accordingly so as to issue an update instruction of an encoding parameter to the encoding means, and to substitute with encoded data streams as substitution candidates.

The image encoding apparatus of the present invention is premised that an encoding parameter to be updated upon shifting to the next transfer phase is known. Hence, a process for generating another encoded data stream that can be a substitution candidate can be executed simultaneously with a compression-encoding process during the period of an encoding phase in principle.

As a practical implementation method of generating an encoded data stream that can be a substitution candidate, the present invention adopts two methods.

In one method, a first encoded data stream which is generated by a compression-encoding process of the encoding means and can be an output candidate is supplied to the re-encoding means as input data, and symbol information obtained via entropy decoding undergoes a re-encoding process using the next encoding parameter to be updated, thus generating a second encoded data stream that can be a substitution candidate.

In the other method, the encoding means executes an encoding process of a first encoded data stream that can be an output candidate parallel to an encoding process of an encoded data stream corresponding to the next encoding parameter to be updated, thus generating a second encoded data stream that can be a substitution candidate.

The second encoded data stream, which was generated by one of the above methods and was stored in the second encoded data stream buffer as a substitution candidate during the period of the encoding phase, is transferred to the first encoded data stream buffer when the image encoding apparatus enters the transfer phase, and replaces the encoded data stream, which was stored as an output candidate so far.

Furthermore, an up-front re-encoding process for generating an encoded data stream that can be a "next" substitution candidate can be executed parallel to the transfer process of the encoded data stream between the two buffers during the period of a transfer phase.

In an implementation method of generating an encoded data stream that can be a "next" substitution candidate simultaneously with the transfer operation, the encoded data stream whose transfer is in progress is input as input data to the re-encoding means, and symbol information obtained via entropy decoding undergoes a re-encoding process using the still next encoding parameter to be updated, thus generating an encoded data stream that can be a "next" substitution candidate.

Upon completion of the up-front re-encoding process, which is executed parallel to the transfer process of the encoded data stream between the two buffer memories, the active phase of the image encoding apparatus returns from the transfer phase to the encoding phase again.

In the image encoding apparatus which returns to the encoding phase again, the control means issues an update instruction of the encoding parameter to the encoding means, and cancels the aborted state of an encoding process for that encoding means. With this operation control, the compression-encoding process using the updated encoding parameter restarts.

An encoded data stream generated by the encoding means using the updated encoding parameter is sequentially stored on the first encoded data stream buffer to follow the encoded data stream (as the substitution candidate), which has been transferred and stored during the period of the preceding transfer phase.

An encoded data stream that can be a still "next" substitution candidate is generated by the aforementioned method parallel to the compression-encoding process in the encoding means during the period of the encoding phase.

The encoded data stream which is generated by one of the above methods and can be the still "next" substitution candidate is sequentially stored on the second encoded data stream buffer to follow the encoded data stream, which has been generated and stored during the period of the preceding transfer phase.

Note that the necessity of the up-front re-encoding process for generating an encoded data stream that can be a "next" substitution candidate during the period of the transfer phase, in other words, the possibility that the encoded data stream which is generated in such way and can be the "next" substitution candidate is actually transferred to the first encoded data stream buffer as an encoded data stream of an output candidate in the future transfer phase, is quantitatively evaluated on the basis of the maximum allowable encoded data size, the ratio of a set region of rectangular regions that have already undergone the encoding process so far to the source image data, an independently calculated target encoded data size, the accumulated value of the data sizes of encoded data streams as substitution candidates generated so far, and the like, when the control enters the transfer phase.

Therefore, upon shifting to the transfer phase, it may be determined that no re-encoding process for generating an encoded data stream as a "next" substitution candidate is required. In such case, only the transfer process of an encoded data stream between the two encoded data stream buffers, which is to be executed in the transfer phase, and only a compression-encoding process for generating an encoded data stream as an output candidate during the period of the subsequent encoding phase are executed in the image encoding apparatus.

[Fourth Embodiment]

Figure 15:
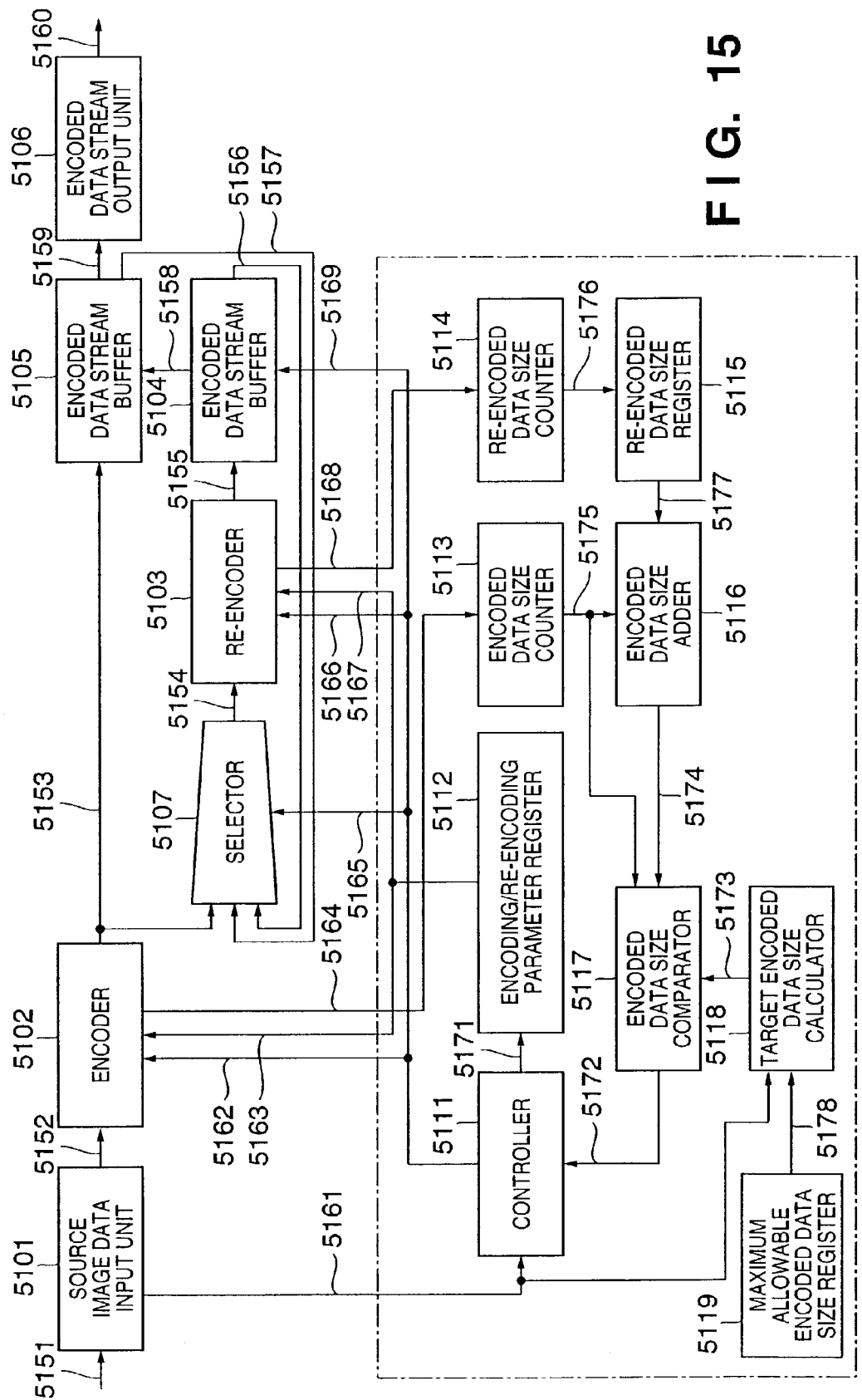
FIG. 15 is a block diagram showing the arrangement of an image encoding apparatus in the fourth embodiment of the present invention.

FIG. 15 is a block diagram showing the arrangement of an image encoding apparatus in this embodiment. Respective units will be described later. Also, a controller of the image encoding apparatus of this embodiment always generates encoded data streams that serve as "next" substitution candidates.

Figure 18:
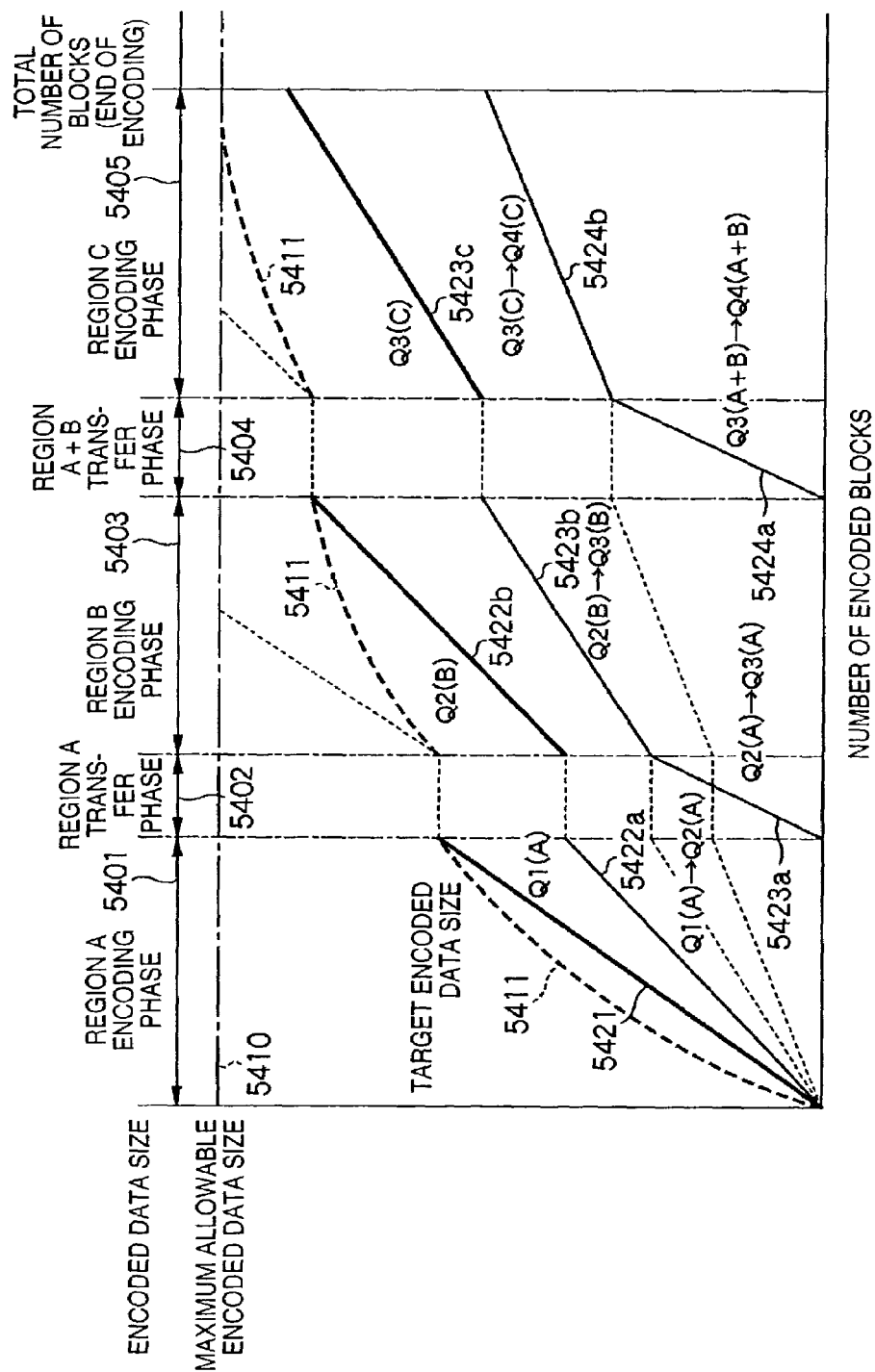
FIG. 18 is a graph showing the relationship among a maximum allowable encoded data size 5410 set in the image encoding apparatus of this embodiment, a target encoded data size 5411 calculated by a target encoded data size calculator 5118 shown in FIG. 15, the sum totals of the encoded data sizes of encoded data streams (ordinate) generated by an encoder 5102 and re-encoder 5103, and the relative position of blocks that have already undergone the compression-encoding process at that time in source image data (abscissa)

FIG. 18 is a graph showing the relationship among a maximum allowable encoded data size 5410 set in the image encoding apparatus of this embodiment, a target encoded data size 5411 calculated by a target encoded data size calculator 5118 shown in FIG. 15, the sum totals of the encoded data sizes of encoded data streams (ordinate) generated by an encoder 5102 and re-encoder 5103, and the relative position of blocks that have already undergone the compression-encoding process at that time in source image data (abscissa).

FIG. 21 two-dimensionally shows four relative positions 0%, P1, P2, and 100% of rectangular regions, and three segmented regions A, B, and C shown on the graph in FIG. 18 on source image data.

The image encoding apparatus of this embodiment will be described below with reference to FIGS. 15, 18, and 21.

Prior to the beginning of an encoding process of the image encoding apparatus, an allowable upper limit value of the sum total of the data sizes of encoded data streams is externally set in a maximum allowable encoded data size register 5119. A controller 5111 sets predetermined quantization scaling factors Q1 and Q2 in encoding/re-encoding parameter registers 5112. In the following description, in case of quantization scaling factors Qn and Qm (m>n), the quantization scaling factor Qm can assure a higher compression ratio than the quantization scaling factor Qn. In the image encoding apparatus of this embodiment, the parameters set in the encoding/re-encoding parameter register 5112 are not limited to the quantization scaling factors. For example, a quantization table may be set.

When source image data 5151 is input, an source image data input unit 5101 segments the source image data 5151 into blocks each having a predetermined size. If an encoder 5102 is ready to start an encoding process, the source image data input unit 5101 sends image data 5152 of segmented blocks. At the same time, the source image data input unit 5101 outputs a relative position 5161 of a block to be encoded in the source image. The encoder 5102 compression-encodes the image data 5152 of segmented blocks on the basis of the quantization scaling factor Q1 stored in the encoding/re-encoding parameter register 5112, and outputs encoded data streams 5153 and encoded data sizes 5164, under the control of the controller 5111. Since the encoding process using the quantization scaling factor is the state-of-the-art technique, a description thereof will be omitted.

The encoded data streams 5153 are input to an encoded data stream buffer 5105 and selector 5107. The selector 5107 selects the encoded data streams 5153 under the control of the controller 5111. A re-encoder 5103 compression-encodes selected encoded data streams 5154 again using the quantization scaling factor Q2 obtained from the encoding/re-encoding parameter register 5112, outputs re-encoded data streams 5155 to an encoded data stream buffer 5104, and outputs encoded data sizes 5168 of the re-encoded data streams 5155 to a re-encoded data size counter 5114.

An encoded data size counter 5113 sequentially accumulates the encoded data sizes 5164. The re-encoded data size counter 5114 sequentially accumulates the encoded data sizes 5168 of the re-encoded data streams 5155.

With the aforementioned encoding and re-encoding processes, the encoded data size counter 5113 outputs an accumulated encoded data size Q1 (5421) of the encoded data streams encoded using the quantization scaling factor Q1, and the re-encoded data size counter 5114 outputs an accumulated encoded data size Q2 (5422a) of the encoded data streams encoded using the quantization scaling factor Q2, as shown in FIG. 18. A phase in which the aforementioned processes are done will be referred to as an encoding phase (5401) hereinafter. In the encoding phase 5401, source image data of blocks in region A shown in FIG. 21 are encoded.

On the other hand, a target encoded data size calculator 5118 calculates a target encoded data size 5173 (5411 in FIG. 18) on the basis of a maximum allowable encoded data size 5178 obtained from the maximum allowable encoded data size register 5119, and the relative position of the encoded blocks in the source image, which is obtained from the source image data input unit 5101. Note that the practical calculation method of the target encoded data size may use the following method. Let Lmax be the maximum allowable encoded data size, N be the number of blocks which have not undergone the encoding process of the encoder 5102 yet, and C be a maximum allowable encoded data size calculation constant. Then, a target encoded data size Lt is given by:

$$Lt = Lmax - C \times N$$

Note that the target encoded data size calculation method is not limited to such specific method. An encoded data size comparator 5117 compares the target encoded data size 5173 and an accumulated encoded data size 5175 obtained from the encoded data size counter 5113 as needed.

When the accumulated encoded data size 5175 has exceeded the target encoded data size 5173 upon completion of the encoding process of block p1 in FIG. 21, the controller 5111 stops input of the image data 5152 of segmented blocks to the encoder 5102, discards the encoded data streams stored in the encoded data stream buffer 5105, sets quantization scaling factors Q2 and Q3 in the encoding/re-encoding parameter register 5112, stores the accumulated encoded data size 5176 of the re-encoded data streams 5155 in a re-encoded data size register 5115, clears the encoded data sizes counted by the encoded data size counter 5113 and re-encoded data size counter 5114 to zero, and then begins to read out the re-encoded data streams 5156 stored in the encoded data stream buffer 5104.

Re-encoded data streams 5158 stored in the encoded data stream buffer 5104 are copied to the encoded data stream buffer 5105.

The selector 5107 selects the re-encoded data streams 5156 and outputs them to the re-encoder 5103. The re-encoder 5103 executes a compression re-encoding process of the re-encoded data streams 5156 on the basis of the quantization scaling factor Q3, and outputs further compressed re-encoded data streams 5155 and encoded data sizes 5168 (5423a in FIG. 18) of the re-encoded data streams 5155.

A phase in which the aforementioned processes are done will be referred to as a transfer phase (5402 in FIG. 18). In the transfer phase 5402, the source image data of the blocks in region A in FIG. 21, which have been encoded based on the quantization scaling factor Q2, are re-encoded on the basis of the quantization scaling factor Q3.

Upon completion of the compression re-encoding process for the re-encoded data streams 5156 (upon completion of the transfer phase 5402 in FIG. 18), the control enters a phase for encoding blocks in region B shown in FIG. 21. In this phase, the controller 5111 begins to input the image data 5152 of segmented blocks to the encoder 5102, which restarts an encoding process using the quantization scaling factor Q2, which was set previously (the control enters an encoding phase 5403 in FIG. 18). Then, encoded data streams 5153 are input to the encoded data stream buffer 5105 and are stored as those which follow the encoded data streams of region A that were stored previously.

The selector 5107 selects the encoded data streams 5153. An encoded data size adder 5116 adds an encoded data size 5177 stored in the re-encoded data size register 5115, and the accumulated encoded data size 5175 obtained from the encoded data size counter 5113. The encoded data size comparator 5117 compares the maximum allowable encoded data size 5178 and a sum 5174 (the sum of 5422a and 5422b in FIG. 18).

When the sum 5174 obtained from the encoded data size adder 5116 has exceeded the target encoded data size 5173 upon completion of encoding of source image data of block p2 in FIG. 21, the controller 5111 stops input of the image data 5152 of segmented blocks to the encoder 5102, discards the encoded data streams stored in the encoded data stream buffer 5105, sets quantization scaling factors Q3 and Q4 in the encoding/re-encoding parameter register 5112, stores the accumulated encoded data size 5176 of the re-encoded data streams 5155 in the re-encoded data size register 5115, and clears the encoded data sizes counted by the encoded data size counter 5113 and re-encoded data size counter 5114 to zero. After the aforementioned processes, the controller 5111 begins to read out the re-encoded data streams 5156 stored in the encoded data stream buffer 5104, and the control enters a transfer phase 5404 in FIG. 18.

In the transfer phase 5404, the source image data of the blocks in regions A and B in FIG. 21, which have been encoded based on the quantization scaling factor Q3, are copied to the encoded data stream buffer 5105, and are re-encoded based on the quantization scaling factor Q4 by the re-encoder 5103.

After that, similar processes are repeated, and encoded data streams Q3 (5423a to 5423c), which are encoded based on the quantization scaling factor Q3 in FIG. 18, and do not exceed the target encoded data size and maximum allowable encoded data size upon completion of encoding of all blocks which form the source image, are determined as final outputs. The controller 5111 externally outputs encoded data streams Q3 (5423a, 5423b) of regions A and B in FIG. 21, which are stored in the encoded data stream buffer 5104 and are re-encoded based on the quantization scaling factor Q3, and encoded data streams Q3 (5423c) of region C in FIG. 21, which are stored in the encoded data stream buffer 5105, via an encoded data stream output unit 5106.

As described above, since the encoded data size increases along with progress of encoding of source image data of segmented blocks, as shown in the graph of FIG. 18, the image encoding apparatus of this embodiment calculates the target encoded data size on the basis of the relative position of blocks in the source image as the encoding process progresses, adaptively sets quantization scaling factors in accordance with the comparison result between the target encoded data size and the sum total of the encoded data sizes after the encoding process, and executes the encoding process while switching between the encoding phase and transfer phase.

An increase in encoded data size and the time required to encode an source image in an image encoding apparatus which does not comprise a target encoded data size calculator, sets a quantization scaling factor in accordance with only the comparison result with the maximum allowable encoded data size, and makes control for switching between the encoding phase and transfer phase will be explained below.

Figure 19:
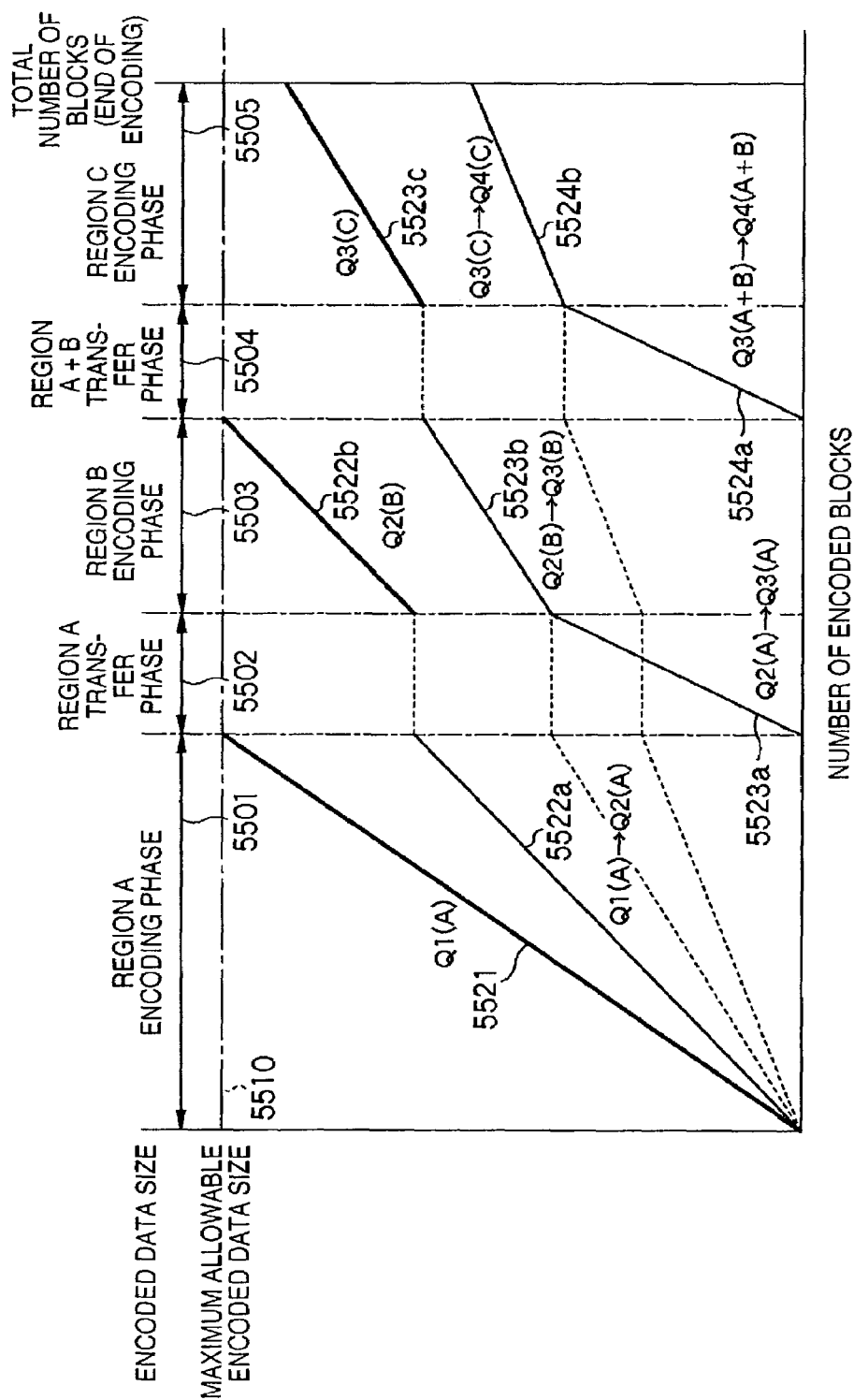
FIG. 19 is a graph showing the relationship between the sum total of the encoded data sizes of encoded data streams (ordinate) and the relative position of a block that has already undergone the compression-encoding process at that time in source image data (abscissa) when an encoding phase and transfer phase are switched in accordance with the comparison result with the maximum allowable encoded data size.

FIG. 19 is a graph showing the relationship between the sum total of the encoded data sizes of encoded data streams (ordinate) and the relative position of blocks that have already undergone the compression-encoding process at that time in source image data (abscissa) when the encoding phase and transfer phase are switched in accordance with the comparison result with the maximum allowable encoded data size. Compared to the graph shown in FIG. 18, shift to a transfer phase of region A delays in the graph shown in FIG. 19. As a result, the size of source image data of blocks of region A, which are to be re-encoded in a transfer phase 5502, becomes larger than that in the image encoding apparatus of this embodiment. Hence, the time required for the transfer phase of region A becomes longer than that in the image encoding apparatus of this embodiment. The same applies to a transfer phase of regions A and B. Therefore, the image encoding apparatus that makes the switching control of the encoding and transfer phases shown in FIG. 19 requires a longer time for an encoding process than the image encoding apparatus of this embodiment.

As described above, since the image encoding apparatus of this embodiment calculates the target encoded data size on the basis of the relative position information of encoded blocks in the source image as needed, and switches control between the encoding and transfer phases in accordance with the comparison result with the encoded data size, shift to the transfer phase can be put forward, and the data size which is to undergo the re-encoding process in the transfer phase can be reduced. Therefore, the time required for the encoding process of the entire source image with the code size control can be shortened.

[Fifth Embodiment]

Figure 20:
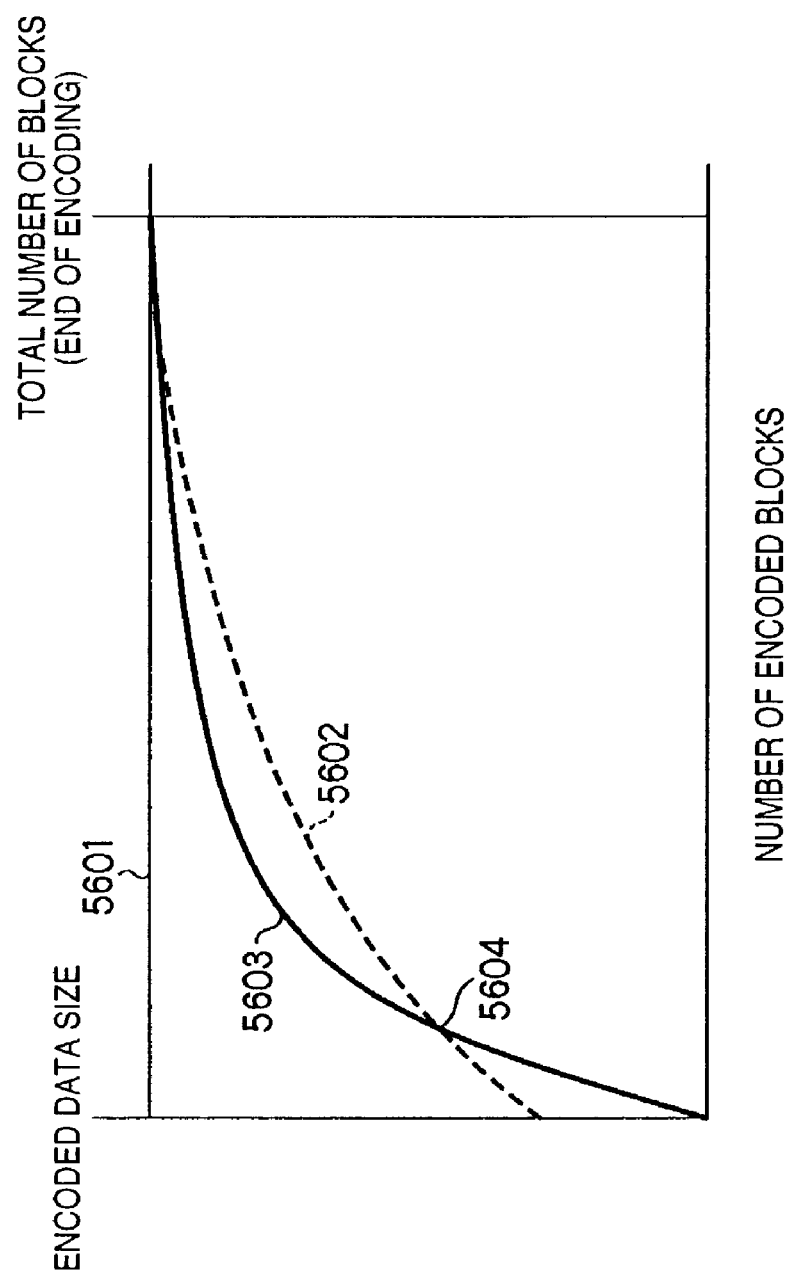
FIG. 20 is a graph for explaining the effect of an image encoding apparatus in the fifth embodiment of the present invention.

In the image encoding apparatus of the fourth embodiment, the control may enter the transfer phase although the encoded data size of an source image falls within the maximum allowable encoded data size depending on a feature of the source image. FIG. 20 is used to explain this drawback. FIG. 20 is a graph showing a change in encoded data size (ordinate) in accordance with the number of encoded blocks (abscissa).

For example, when the encoded data size increases, as shown in the graph of FIG. 20, the control enters the transfer phase and starts a re-encoding process at a timing 5604 when a target encoded data size 5602 has been exceeded, although an accumulated encoded data size 5603 does not reach a maximum allowable encoded data size 5601. As a result, quantization distortion of an image may increase, and the image quality may deteriorate. Hence, in order to generate an encoded data stream that suffers minimum quantization distortion, the target encoded data size must be calculated more precisely.

To solve this problem, the image encoding apparatus of this embodiment comprises means for calculating a target encoded data size by a method different from the fourth embodiment, and can calculate the target encoded data size more precisely.

Figure 16:
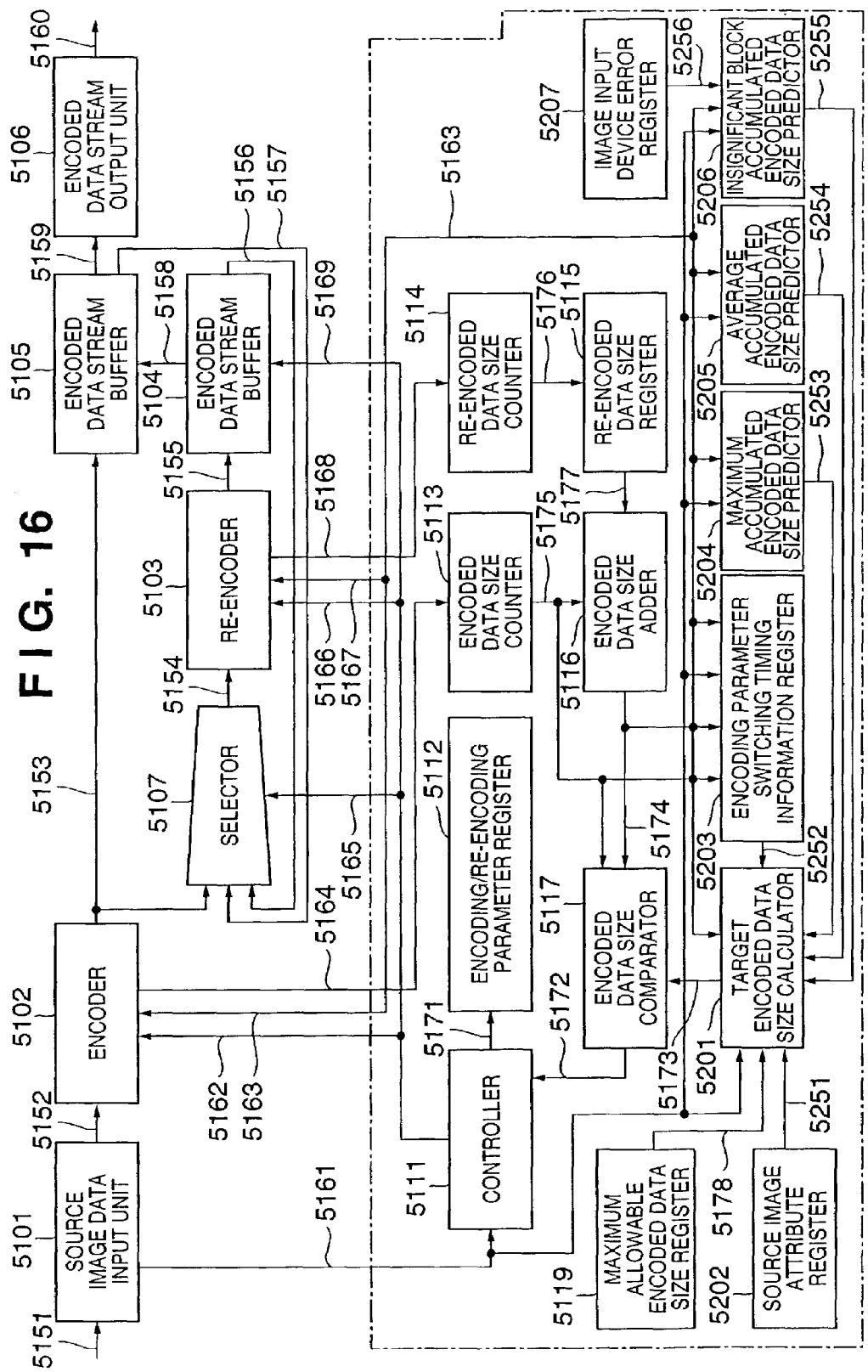
FIG. 16 is a block diagram showing the arrangement of an image encoding apparatus in the fifth embodiment of the present invention.

FIG. 16 is a block diagram showing the arrangement of the image encoding apparatus of this embodiment. The image encoding apparatus shown in FIG. 16 comprises an source image attribute register 5202, encoding parameter change timing information register 5203, maximum accumulated encoded data size predictor 5204, average accumulated encoded data size predictor 5205, insignificant block accumulated encoded data size predictor 5206, and image input device error register 5207, in addition to the arrangement of the image encoding apparatus shown in FIG. 15.

The source image attribute register 5202 holds attribute information of an source image, e.g., information indicating that an source image is a natural image, document, or the like. Note that this information is externally set. Text data tend to have a larger encoded data size than natural image data since correlation between neighboring pixels is low. Since such tendency is pre-stored in the source image attribute register 5202 as information, the prediction precision of the encoded data size can be further improved using such information.

The encoding parameter change timing information register 5203 holds the relative position 5161 of encoded blocks in an source image, and the accumulated encoded data sizes obtained from the encoded data size counter 5113 and encoded data size adder 5116, when the control shifts control from the encoding phase to the transfer phase by switching quantization scaling factors.

The maximum accumulated encoded data size predictor 5204 calculates a predicted value 5253 of the accumulated encoded data size of future encoded data streams when only blocks that maximize the encoded data size are present after the source image data of blocks that have undergone the encoding process, on the basis of the relative position 5161 of encoded blocks in the source image.

The average accumulated encoded data size predictor 5205 calculates an average encoded data size of an encoded data stream per block on the basis of the accumulated encoded data size obtained form the encoded data size counter 5113 or the encoded data size adder 5116, and the relative position 5161 of encoded blocks in the source image, and calculates a predicted value 5254 of the accumulated encoded data sizes of encoded data streams on the basis of the average encoded data size.

In the image input device error register 5207, errors upon scanning an source image by a device that scans an source image to be input to the source image data input unit 5101 (e.g., an optical image scanner or the like) are externally set. Such errors include color misregistration when the scanner scans an source image. If color misregistration has occurred, a change between neighboring pixels occurs due to slight color misregistration even on a blank document.

The insignificant block accumulated encoded data size predictor 5206 calculates a predicted value 5255 of the accumulated encoded data size of encoded data streams of future insignificant blocks, when only insignificant blocks that contain no significant information except for scan errors of an image input device follow the source image data of blocks that have undergone the encoding process, in accordance with the relative position 5161 of encoded blocks in the source image, and scan error information 5256 stored in the image input device error register 5207.

A target encoded data size calculator 5201 can calculate a plurality of target encoded data sizes in accordance with the relative position 5161 of encoded blocks in the source image, on the basis of an attribute 5251 of the source image, which is obtained from the source image attribute register 5202, the relative position 5161 of encoded blocks in the source image when the controller switches quantization scaling factors and shifts control from the encoding phase to the transfer phase, which is obtained from the encoding parameter change timing information register 5203, the accumulated encoded data sizes obtained from the encoded data size counter 5113 and encoded data size adder 5116, the predicted value 5253 of the accumulated encoded data size of encoded data streams, which is obtained from the maximum accumulated encoded data size predictor 5204, the predicted value 5254 of the accumulated encoded data size of encoded data streams, which is obtained from the average accumulated encoded data size predictor 5205, and the predicted value 5255 of the accumulated encoded data size of encoded data streams, which is obtained from the insignificant block accumulated encoded data size predictor 5206.

More specifically, the calculator 5201 can calculate three predicted values (5253 to 5255) according to the relative position 5161 of encoded blocks in the source image, i.e., three target encoded data sizes.

Note that the method of calculating the target encoded data sizes from the predicted values is not particularly limited. In the image encoding apparatus of this embodiment, the target encoded data sizes are calculated as follows.

Let Lmax be the maximum allowable encoded data size, M be the number of blocks which form the source image, N be the number of blocks that have undergone the encoding process by the encoder 5102, Lt be the target encoded data size, L1 be the predicted value 5253 of the encoded data size, which is calculated based on blocks that maximize the encoded data size, L2 be the predicted value 5254 of the encoded data size calculated based on the average encoded data size, and L3 be the predicated value 5255 of the encoded data size calculated based on the encoded data size of insignificant blocks.

Then, if N<M/4, the target encoded size is calculated by:

$$Lt = L\max - (M-N) \times L1/M$$

using the predicted value 5253 of the encoded data size, which is calculated based on blocks that maximize the encoded data size, so as to reduce the number of blocks to be processed in the transfer blocks and to prevent an encoding rate drop of the entire image by advancing shift to the transfer phase.

If M/4≦N<3/4×M, the target encoded size is calculated by:

$$Lt = L\max - (M-N) \times L2/M$$

using the predicted value 5254 of the encoded data size calculated based on the average encoded data size.

If N 3/4×M, the target encoded size is calculated by:

$$Lt = L\max - (M-N) \times L3/M$$

using the predicated value 5255 of the encoded data size calculated based on the encoded data size of insignificant blocks, so as to prevent the control from entering the transfer phase although the encoded data size of the source image falls within the maximum allowable encoded data size.

Note that the present invention is not limited to such specific target encoded data size calculation methods. When a plurality of target encoded data sizes are calculated in this manner, since the number of samples used to predict the accumulated encoded data size increases, the accumulated encoded data size can be predicted more precisely. Hence, the image encoding apparatus of this embodiment can progress an encoding process without starting the transfer phase even for an image, the encoded data size of which increases, as shown in the graph of FIG. 20. Also, the image encoding apparatus of this embodiment can generate an encoded data stream which suffers minimum quantization distortion within the range of the maximum allowable encoded data size, without any encoding rate drop.

[Sixth Embodiment]

As a method of avoiding any encoding rate drop due to the re-encoding process, a method of starting a re-encoding process of encoded data streams in the encoded data stream buffer by shifting to the transfer phase before the accumulated encoded data size of encoded data streams reaches the target encoded data size in accordance with the load on the re-encoding process is available. Note that the re-encoding process decodes encoded data streams to convert them into orthogonal transform coefficient matrices, re-quantizes the orthogonal transform coefficient matrices, and encodes the quantized matrices. Hence, the load on the re-encoding process depends on the number of symbols corresponding to code words of encoded data streams in encoding and decoding.

Figure 17:
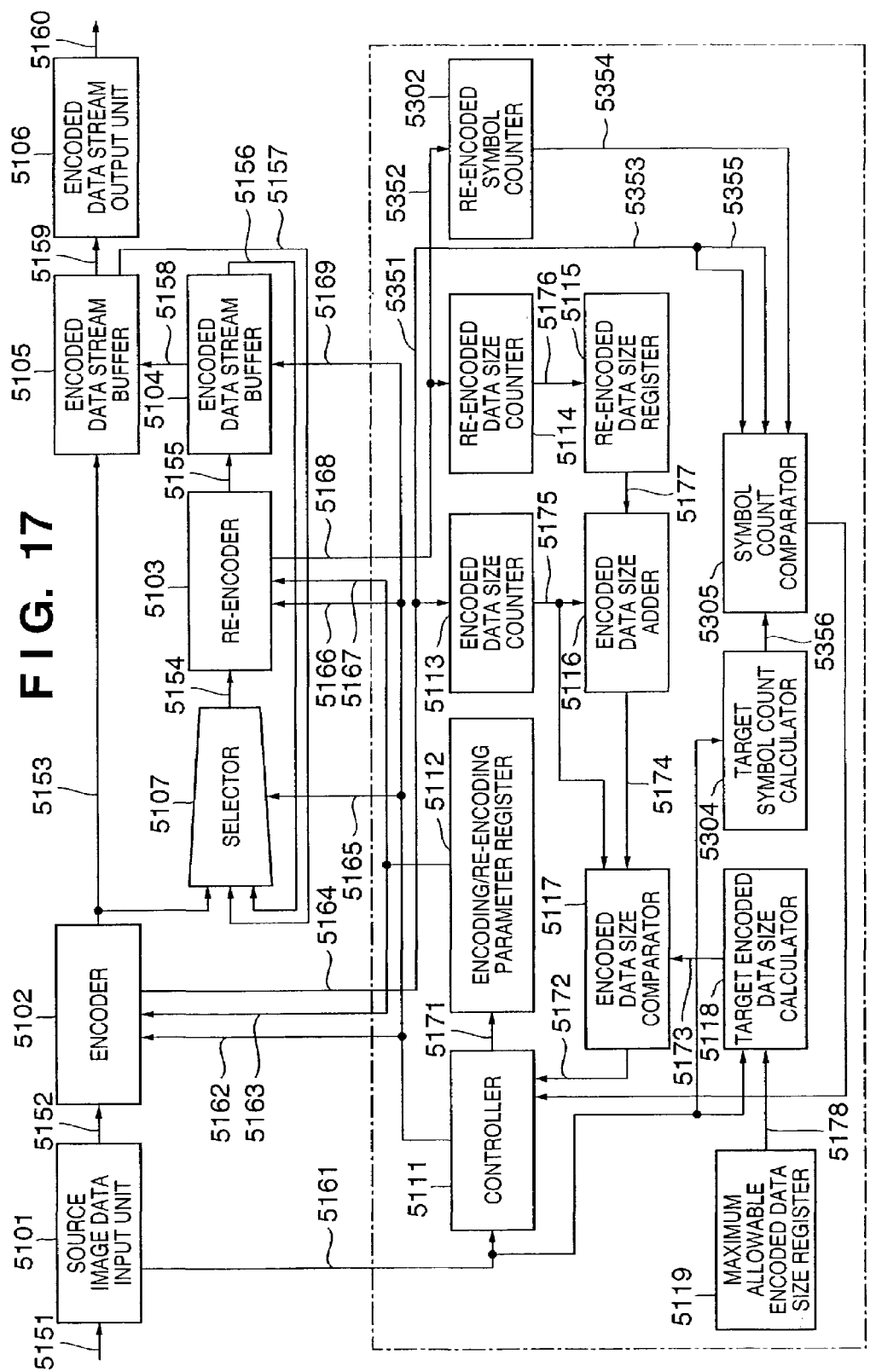
FIG. 17 is a block diagram showing the arrangement of an image encoding apparatus in the sixth embodiment of the present invention.

FIG. 17 is a block diagram showing the arrangement of an image encoding apparatus of this embodiment. The image encoding apparatus of this embodiment comprises a re-encoded symbol counter 5302, target symbol count calculator 5304, and symbol count comparator 5305, in addition to the arrangement of the image encoding apparatus shown in FIG. 15.

The re-encoded symbol counter 5302 accumulates the number 5352 of symbols of code words corresponding to re-encoded data streams obtained from the re-encoder 5103.

The target symbol count calculator 5304 calculates the number of target symbols on the basis of the relative position 5161 of encoded blocks in the source image. The number of target symbols can be calculated by, e.g., the following method. Since the load on the re-encoding process depends on the number of symbols corresponding to code words of encoded data streams in encoding and decoding, the time required for the transfer phase depends on the accumulated number of symbols. Hence, the target number of symbols is calculated to suppress the time required for the transfer phase within a predetermined time. For example, when the re-encoding process performance of the re-encoder 5103 is 1 cycle per symbol, and the time required for the transfer phase is to be suppressed within n cycles, the target number of symbols is n. However, if the number of blocks which are not encoded yet of those which form the source image is small, the target number of symbols is adaptively changed, e.g., the target number of symbols is decreased on the basis of the relative position 5161 of encoded blocks in the source image so as to avoid an encoding rate drop of the entire image by minimizing the time required for the transfer phase.

The symbol count comparator 5305 compares the accumulated number 5354 of symbols obtained from the re-encoded symbol counter 5302 and the target number 5356 of symbols obtained from the target symbol count calculator 5304.

The controller 5111 changes encoding parameters and shifts control from the encoding phase to the transfer phase as in the image encoding apparatus of the fourth embodiment on the basis of the comparison results obtained from the encoded data size comparator 5117 and the symbol count comparator 5305, when the accumulated encoded data size has exceeded the target encoded data size or when the accumulated number of symbols has exceeded the target number of symbols.

According to the image encoding apparatus of this embodiment, since the code size control is done according to the load on the re-encoding process, any encoding rate drop can be avoided more reliably.

[Seventh Embodiment]

An encoding process that encodes an image which has low correlation between neighboring pixels, e.g., an image filled with noise, to a predetermined encoded data size or less will be explained below.

Figure 22:
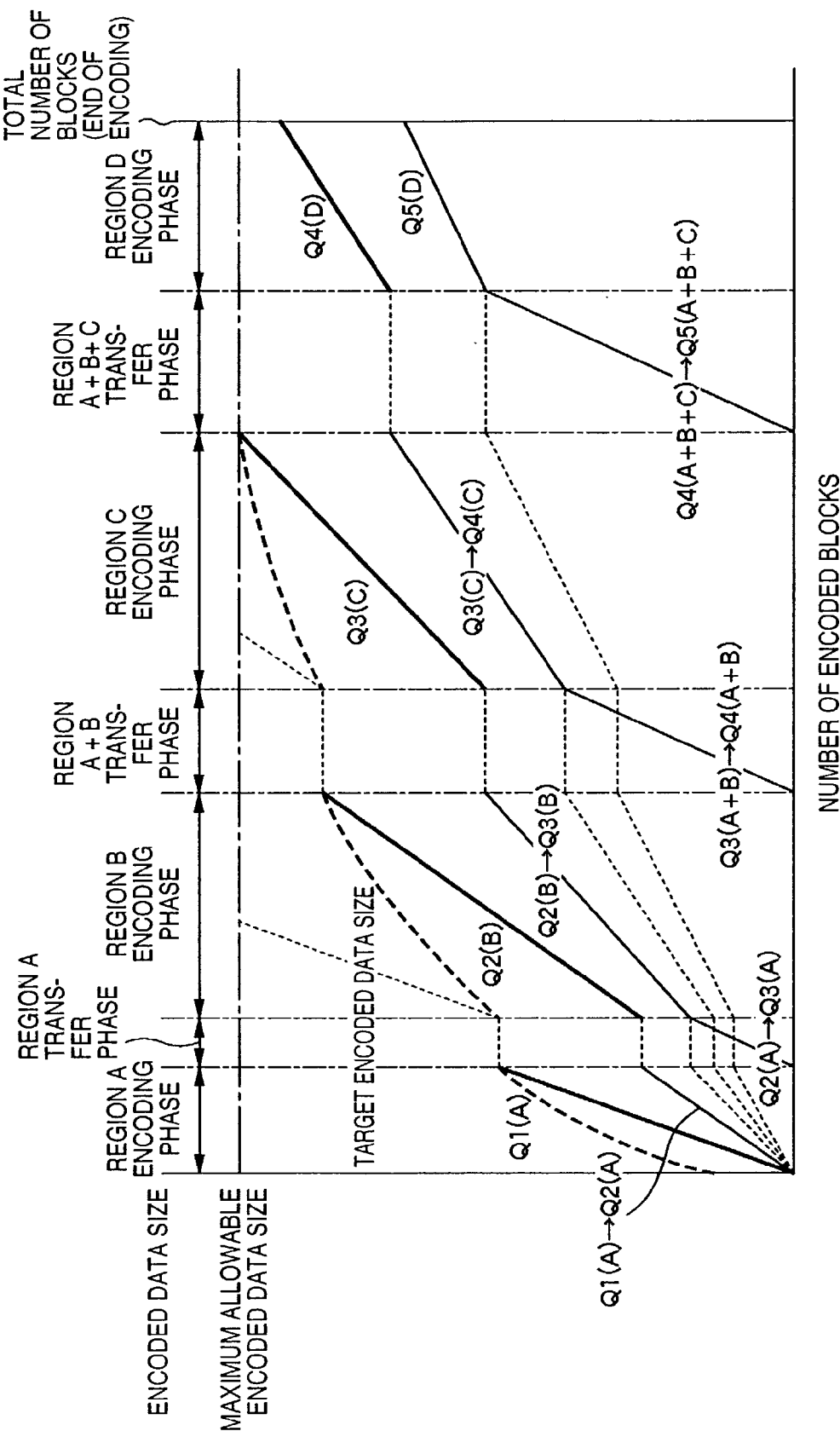
FIG. 22 is a graph showing the relationship between the sum total of the data sizes of encoded data streams (ordinate) and the relative position of a rectangular region that has already undergone the compression-encoding process at that time in source image data (abscissa) upon encoding an image filled with noise.

The encoded data size of an image which has low correlation between neighboring pixels cannot fall within the maximum allowable encoded data size unless it is coarsely quantized. When such image is re-encoded while changing quantization scaling factors by switching control between the encoding and transfer phases, the re-encoding process must be repeated again and again, as shown in the graph of FIG. 22, and the processing time in the transfer phase becomes a large overhead in the encoding process of the entire image.

Figure 23:
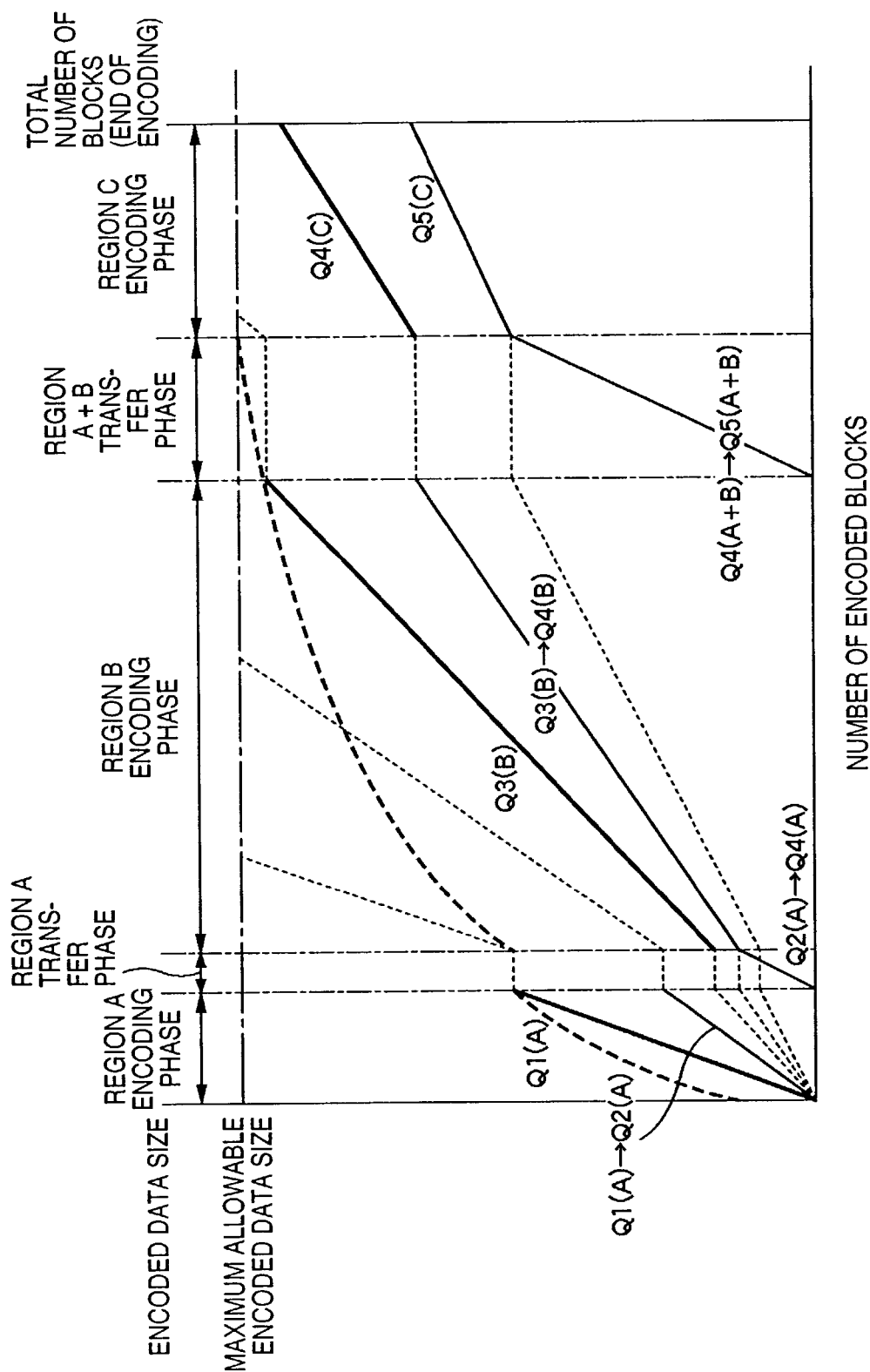
FIG. 23 is a graph showing the relationship between the sum total of the data sizes of encoded data streams (ordinate) and the relative position of a rectangular region that has already undergone the compression-encoding process at that time in source image data (abscissa) upon encoding an image filled with noise.

Hence, as shown in the graph of FIG. 23, when the accumulated encoded data size of encoded data streams Q1(A) encoded using a quantization scaling factor Q1 has exceeded the target encoded data size in a relatively early stage of encoding processes for respective blocks, quantization scaling factors larger than those to be normally are set in the encoding parameter register, thus reducing the number of times of transfer phases, and preventing any encoding rate drop.

An image encoding apparatus of this embodiment will be explained below. The image encoding apparatus of this embodiment has the same arrangement as that of the image encoding apparatus of the fourth embodiment shown in FIG. 15, but the process in the controller 5111 is different from the fourth embodiment. The image encoding apparatus of this embodiment will be described below using FIGS. 15 and 23.

The controller 5111 in this embodiment determines quantization scaling factors in accordance with relative position information 5161 of the current block which is to undergo an encoding process in the source image data, and changes quantization scaling factors to be held by the encoding/re-encoding parameter register 5112. More specifically, upon shifting to a region A transfer phase in FIG. 23, a quantization scaling factor Q4 is set, and the re-encoder 5103 re-encodes, on the basis of the quantization scaling factor Q4, encoded data streams Q2(A) that have been encoded using a quantization scaling factor Q2 in a region A encoding phase, thus generating quantized data Q4(A). Note that re-encoding using the quantization scaling factor Q4 has been exemplified, but the present invention is not limited to such specific example.

With the aforementioned control, since the number of re-encoding processes to be executed in the transfer phases can be reduced, an overhead associated with the re-encoding process can be minimized even in an encoding process of an image, the encoded data size of which cannot fall within the maximum allowable encoded data size unless re-encoding is repeated again and again.

[Eighth Embodiment]

Figure 24:
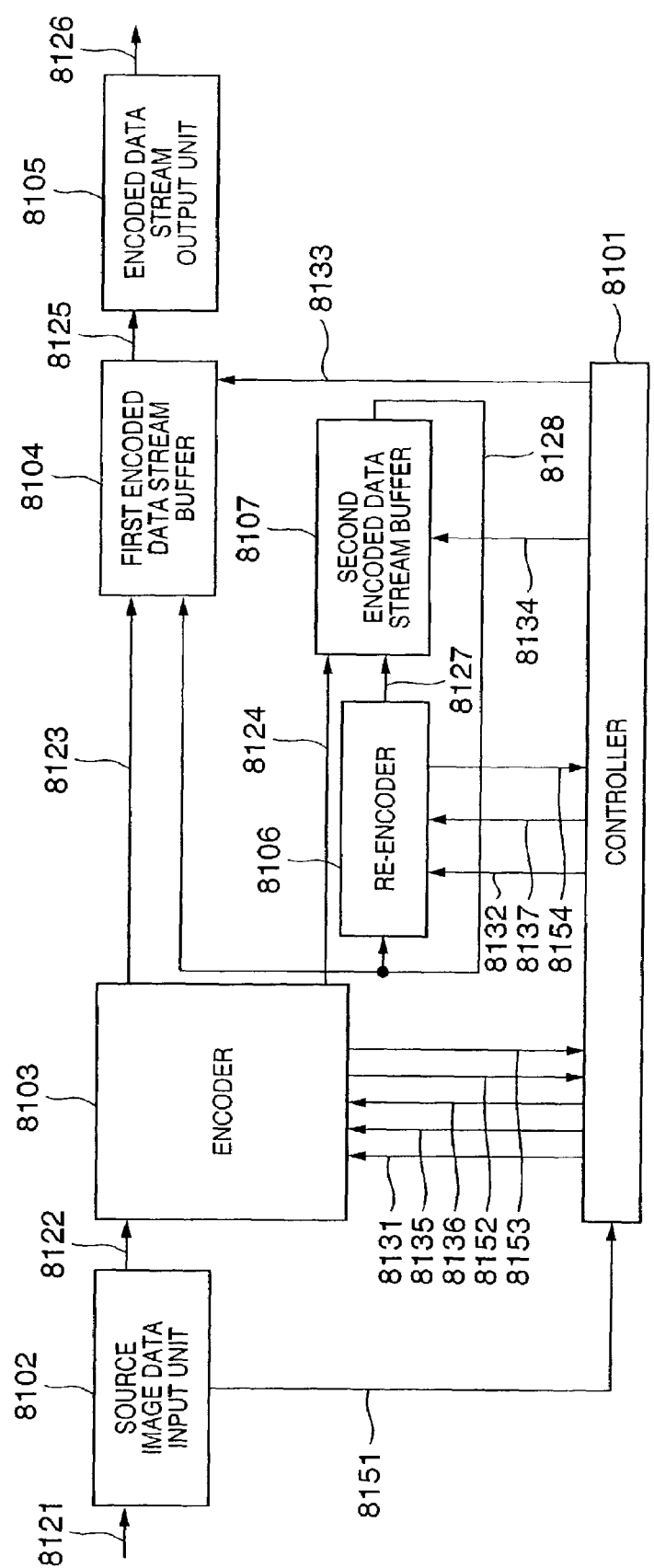
FIG. 24 is a block diagram showing the functional arrangement of an image encoding apparatus in the eighth embodiment of the present invention.
Figure 25:
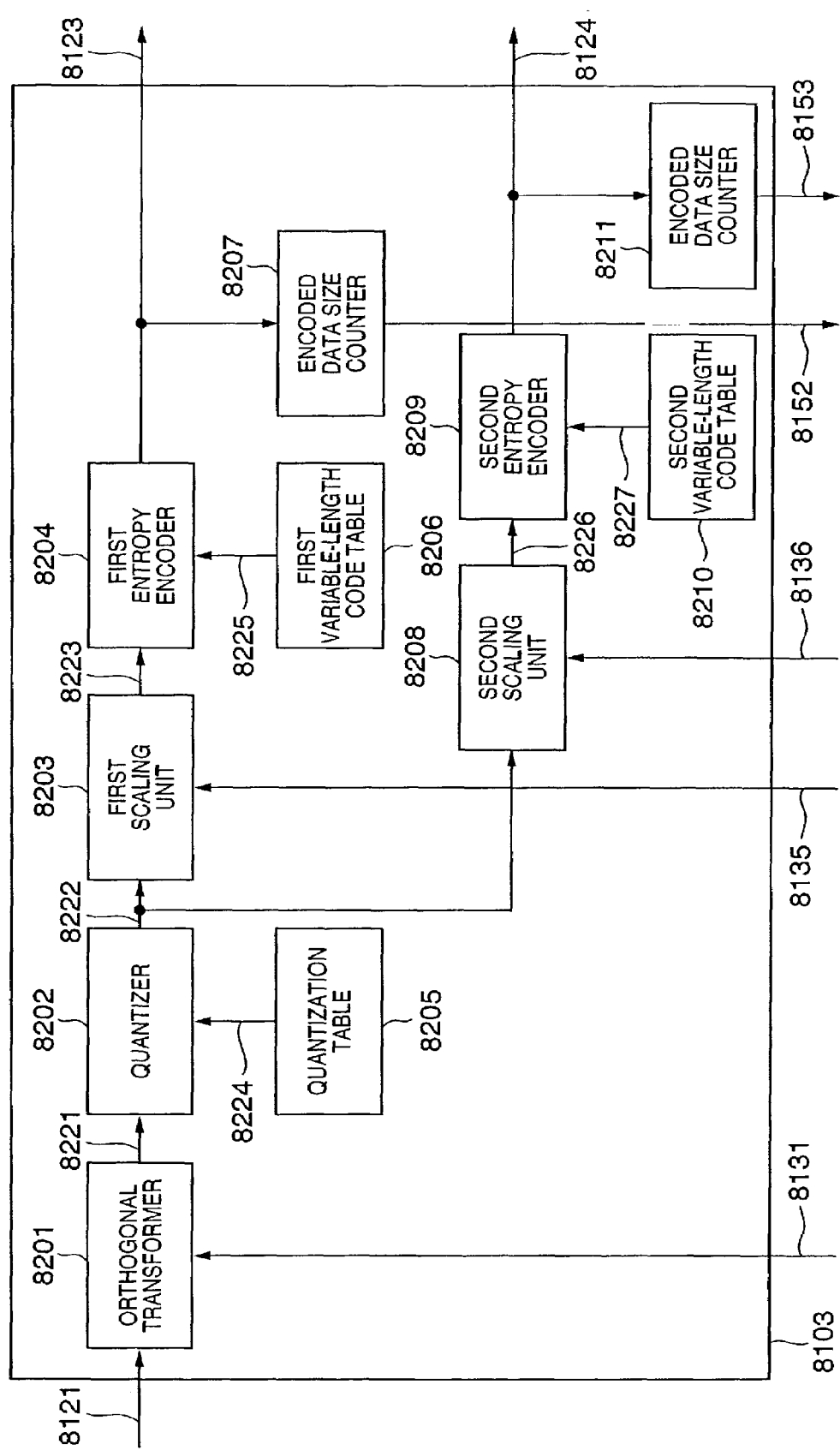
FIG. 25 is a block diagram showing the functional arrangement of an encoder 8103 shown in FIG. 24.
Figure 26:
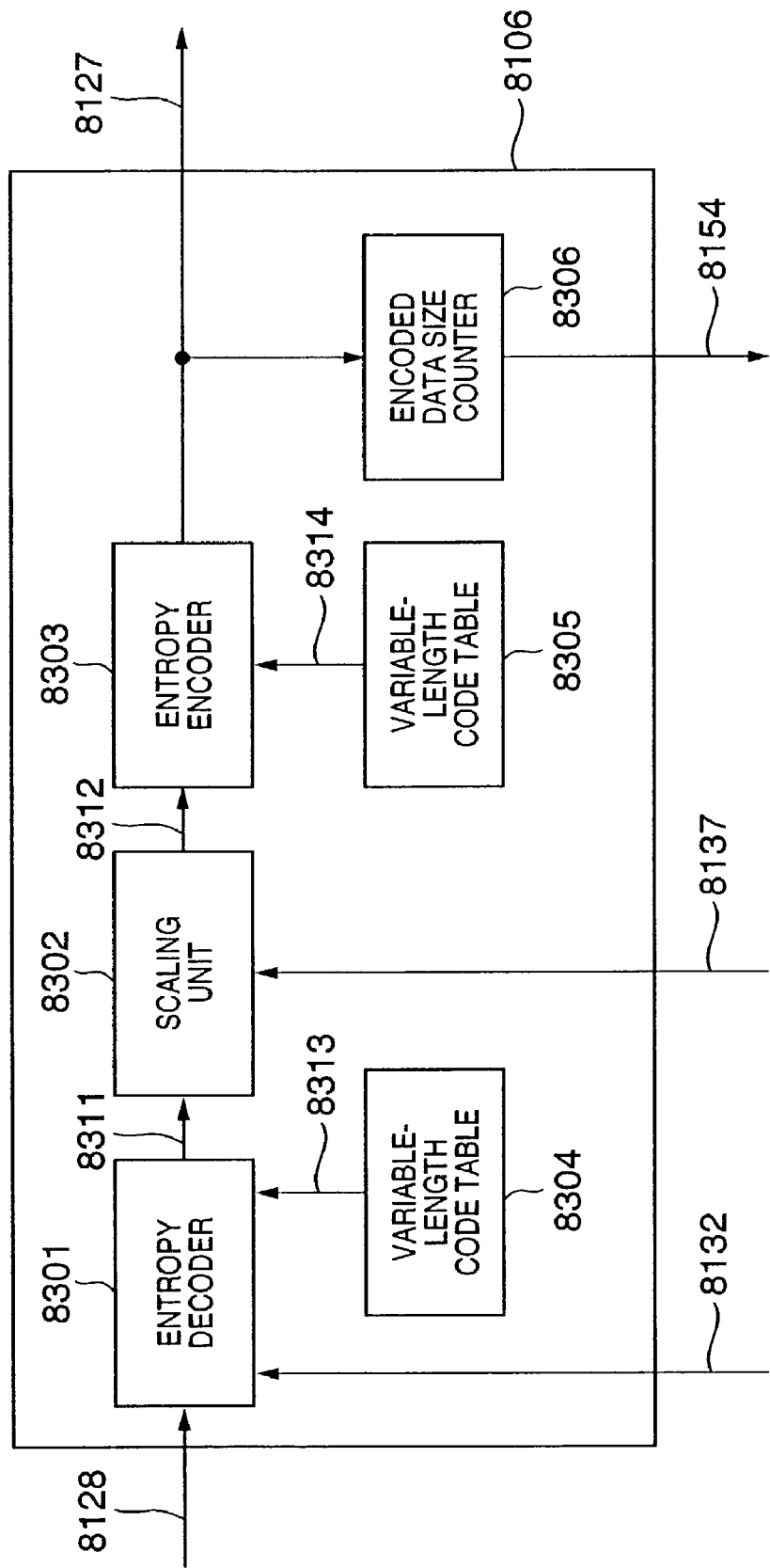
FIG. 26 is a block diagram showing the functional arrangement of a re-encoder 8106 shown in FIG. 24.

FIG. 24 is a block diagram showing the functional arrangement of an image encoding apparatus of this embodiment. Details of respective units will be explained later. FIG. 25 is a block diagram showing the functional arrangement of an encoder 8103 shown in FIG. 24. Details of respective units will be explained later. FIG. 26 is a block diagram showing the functional arrangement of a re-encoder 8106 shown in FIG. 24. Details of respective units will be explained later.

Figure 27:
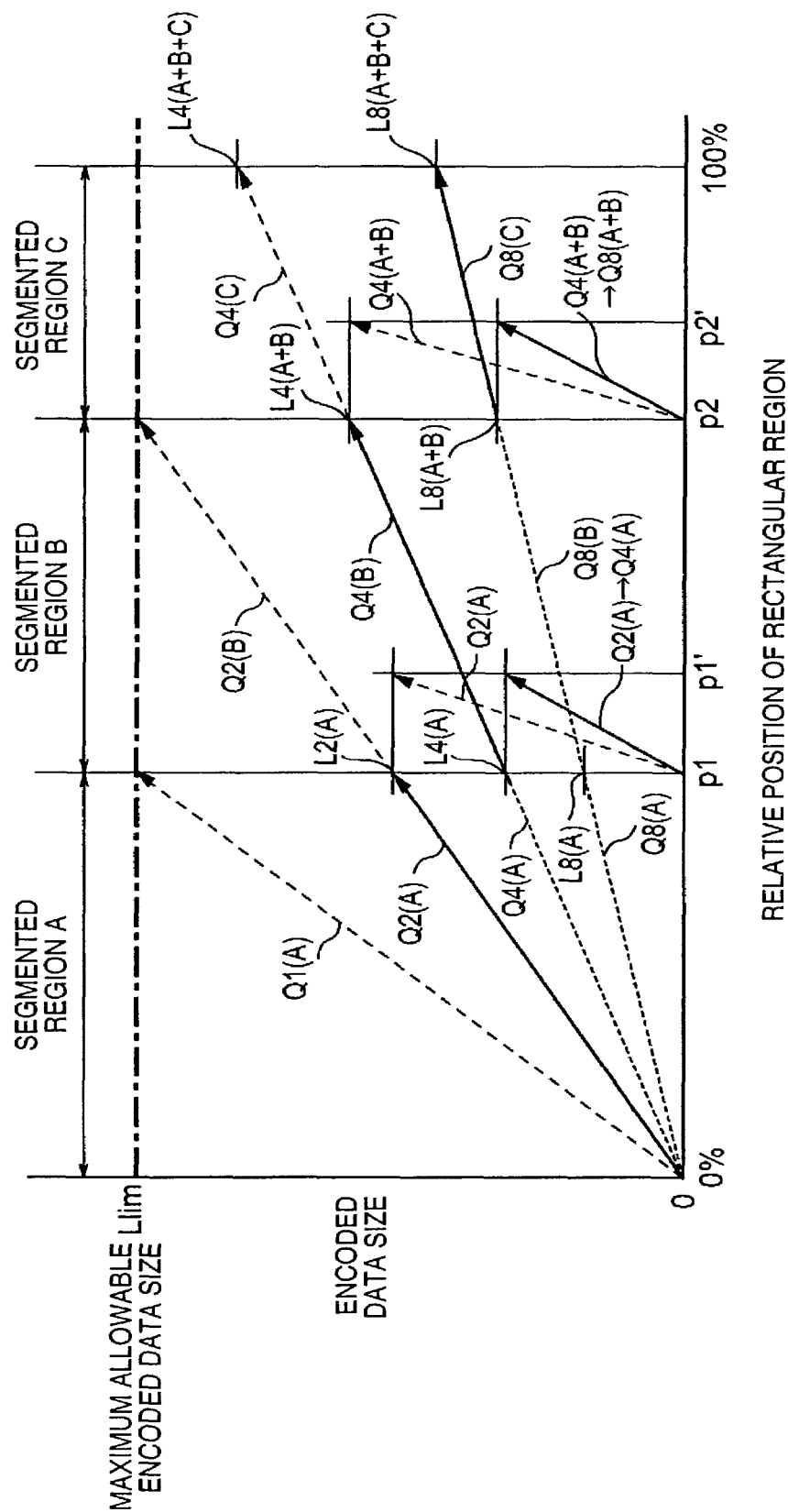
FIG. 27 is a graph showing the relationship between the accumulated values of the data sizes of encoded data streams (ordinate) stored in first and second encoded data stream buffers 8104 and 8107 during a series of compression-encoding processes for the first source image to be input as data to be encoded to the image encoding apparatus shown in FIG. 24, and the relative position of rectangular regions that have already undergone the compression-encoding process at that time in the source image data (abscissa)

A graph that shows the relationship between the accumulated value of the data sizes of encoded data streams (ordinate) obtained when compression-encoding processes of first source image data input as data to be encoded to the image encoding apparatus shown in FIG. 24 are sequentially executed for respective rectangular regions using a single quantization table and four different quantization scaling factors ×1, ×2, ×3, and ×4, and the relative position of a rectangular region that has already undergone the compression-encoding process at that time in the first source image data (abscissa) is the same as that shown in FIG. 4. As the first source image data, image data shown in FIG. 5 is used. FIG. 27 is a graph showing the relationship between the accumulated values of the data sizes of encoded data streams (ordinate) stored in first and second encoded data stream buffers 8104 and 8107 during a series of compression-encoding processes for the first source image to be input as data to be encoded to the image encoding apparatus shown in FIG. 24, and the relative position of rectangular regions that have already undergone the compression-encoding process at that time in the source image data (abscissa).

Figure 31A:
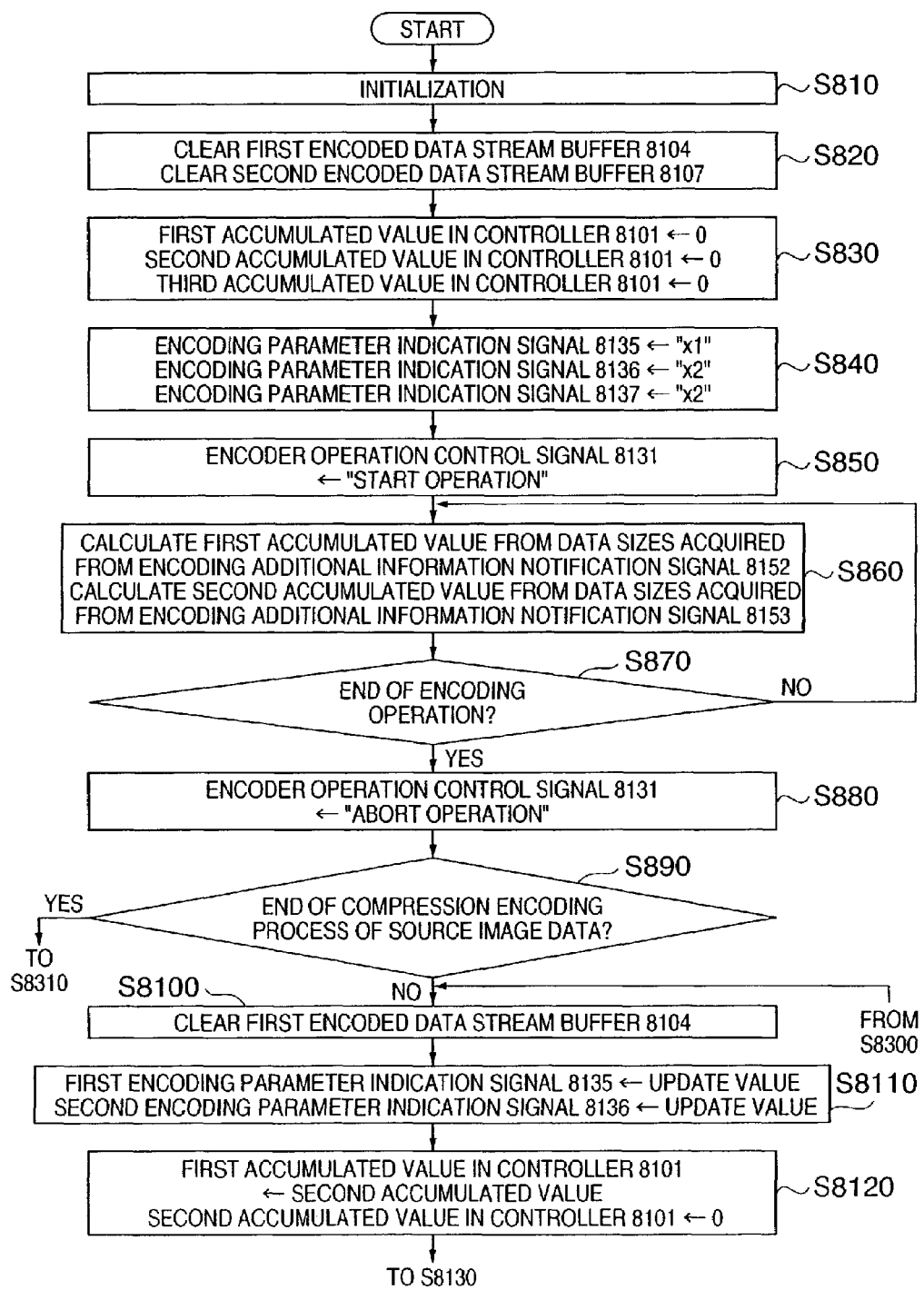
FIG. 31A is a flow chart showing the former half of the process to be executed by a controller 8101 of the image encoding apparatus shown in FIG. 24.
Figure 31B:
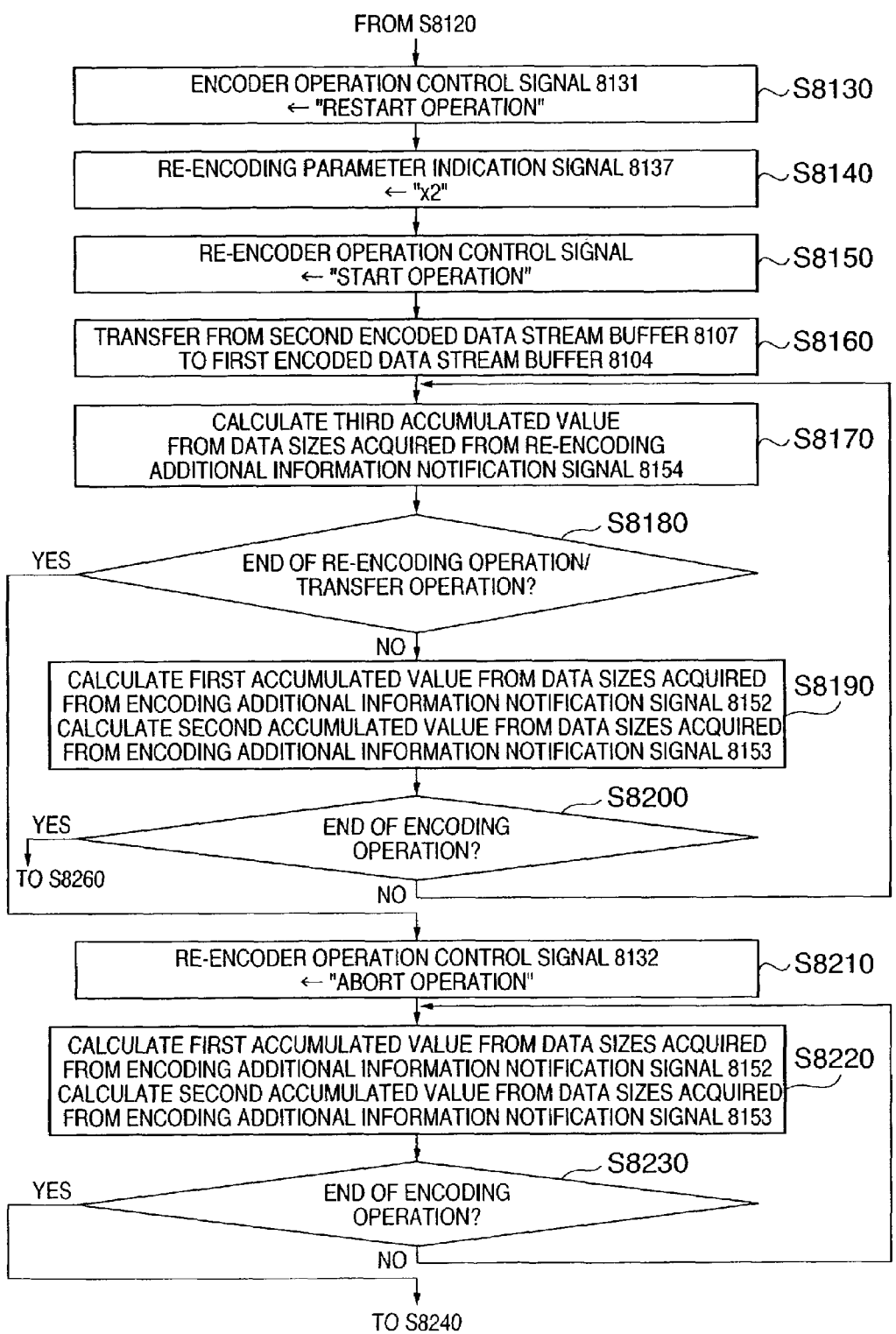
FIG. 31B is a flow chart showing the latter half of the process to be executed by the controller 8101 of the image encoding apparatus shown in FIG. 24.
Figure 31C:
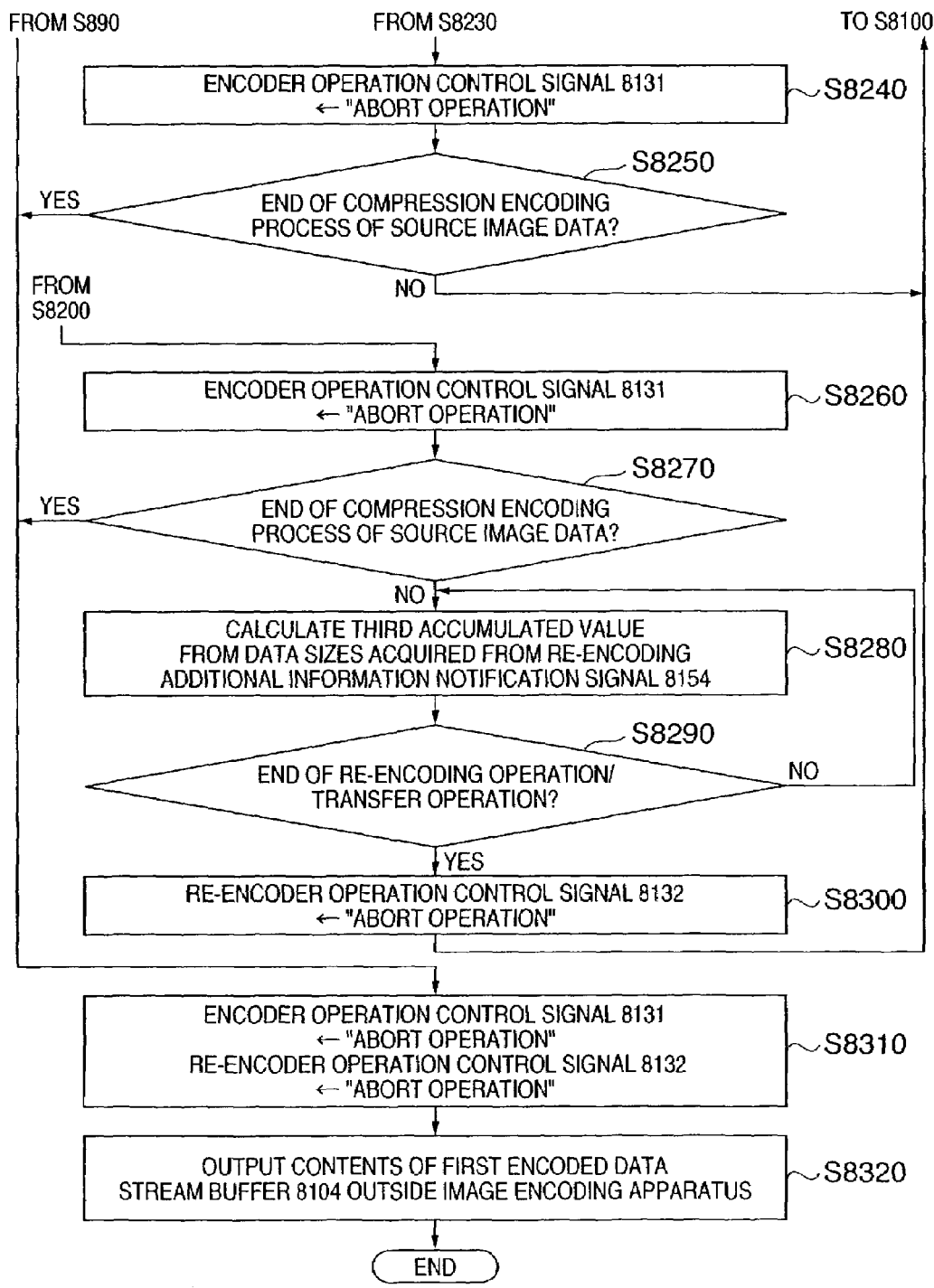
FIG. 31C is a flow chart showing the latter half of the process to be executed by the controller 8101 of the image encoding apparatus shown in FIG. 24.

Furthermore, FIGS. 31A to 31C are flow charts of the processes executed by a controller 8101 of the image encoding apparatus shown in FIG. 24. The processes executed by respective units shown in FIGS. 24 to 26 will be described below with reference to the flow charts shown in FIGS. 31A to 31C. In this case, the graphs shown in FIGS. 4 and 27 and the first source image shown in FIG. 5 will be referred to.

Prior to the compression-encoding process to be described later, some pieces of information must be pre-stored in the image encoding apparatus of this embodiment. Such information will be explained below.

The controller 8101 of the image encoding apparatus of this embodiment pre-stores information indicating the size of the first source image data input as data to be encoded shown in FIG. 4 (more specifically, the total number of rectangular regions which form that source image data). Assume that each rectangular region has a size of 16×16 pixels, but the present invention is not limited to such specific size. The controller 8101 of the image encoding apparatus of this embodiment pre-stores a maximum allowable value (the number of bits or bytes) of the accumulated data size of an encoded data stream finally output from the image encoding apparatus. The maximum allowable encoded data size stored in the controller 8101 is indicated by the horizontal dotted line in an upper portion of each of the graphs shown in FIGS. 4 and 27.

A quantization table 8205 in an encoder 8103 of the image encoding apparatus of this embodiment pre-stores a matrix of 8×8 quantization step values corresponding to orthogonal transform coefficients which form an 8 (rows)×8 (columns) orthogonal transform coefficient matrix. The values of elements which form the quantization step value matrix are referred to by a quantizer 8202 via a quantization step signal 8224.

First and second variable-length code tables 8206 and 8210 in the encoder 8103 of the image encoding apparatus of this embodiment store variable-length code word sets corresponding to symbols as data to be encoded. Respective variable-length code words are referred to by a first entropy encoder 8204 via a first variable-length code word signal 8225, and a second entropy encoder 8209 via a second variable-length code word signal 8227.

Furthermore, variable-length code tables 8304 (decoding) and 8305 (encoding) in a re-encoder 8106 store the same variable-length code word sets as those stored in the first and second variable-length code tables 8206 and 8210 in the encoder 8103. Respective variable-length code words are referred to by an entropy decoder 8301 via a (decoding) variable-length code word signal 8313 and by an entropy encoder 8303 via an (encoding) variable-length code word signal 8314.

As described above, a process for pre-storing information in the image encoding apparatus of this embodiment, i.e., an initialization process, is executed prior to the compression-encoding process to be described later (step S810).

When a series of compression-encoding processes for the first source image as data to be encoded shown in FIG. 5 are input to the image encoding apparatus of this embodiment in practice, the controller 8101 starts the following process.

The controller 8101 issues an initialization instruction to an encoded data stream buffer 8104 to clear the contents of the encoded data stream buffer 8104 via a buffer control signal 8133, and also issues an initialization instruction to an encoded data stream buffer 8107 to clear the contents of the encoded data stream buffer 8107 via a buffer control signal 8134 (step S820).

The controller 8101 internally resets first, second, and third accumulated values, which correspond to first, second, and third encoded data streams, and are used to accumulate their data sizes to zero (step S830).

Furthermore, the controller 8101 outputs a value "×1" as an initial scaling factor onto an encoding parameter instruction signal 8135, a value "×2" as an initial scaling factor onto an encoding parameter instruction signal 8136, and a value "×2" as a re-scaling factor onto a re-encoding parameter instruction signal 8137 (step S840).

After that, the controller 8101 instructs the encoder 8103 to start its encoding process via an encoder operation control signal 8131 (step S850). When the encoder 8103 receives this instruction, the image encoding apparatus of this embodiment executes a first "encoding operation" for the first source image data in practice.

The flow chart of an encoding process to be executed by the encoder 8103 is as shown in FIG. 13. The scanned first source image data is input to an source image data input unit 8102 via an source image data input signal 8121, is segmented into equal rectangular regions each having a predetermined size, and is sequentially output onto a to-be-encoded data input signal 8122 for respective rectangular regions. In this case, the source image data input unit 8102 sequentially outputs position information of a rectangular region, which is currently output onto the to-be-encoded data input signal 8122, in the source image data (more specifically, the total number of rectangular regions that have already been output) onto a rectangular region position information signal 8151 (step S1301).

The source image data for each rectangular region supplied from the source image data input unit 8102 to the encoder 8103 via the to-be-encoded data input signal 8122 is further segmented into a plurality of equal blocks each consisting of 8 (rows)×8 (columns) samples by an orthogonal transformer 8201 in the encoder 8103, and undergoes orthogonal transformation operations for respective blocks, thus sequentially outputting a plurality of 8 (rows)×8 (columns) orthogonal transform coefficient matrices obtained as the operation results onto a transform coefficient matrix signal 8221 (step S1302).

A quantizer 8202 in the encoder 8103 makes quantization operations using the plurality of 8 (rows)×8 (columns) orthogonal transform coefficient matrices supplied from the orthogonal transformer 8201 via the transform coefficient matrix signal 8221, and 8×8 quantization step values supplied from the quantization table 8205 via the quantization step signal 8224, and sequentially outputs a plurality of 8 (rows)×8 (columns) quantized orthogonal transform coefficient matrices obtained as the operation results onto a quantized transform coefficient matrix signal 8222 (step S1303).

A first scaling unit 8203 in the encoder 8103 makes scaling operations of the plurality of 8 (rows)×8 (columns) quantized orthogonal transform coefficient matrices, which are supplied from the quantizer 8202 via the quantized transform coefficient matrix signal 8222, on the basis of a scaling factor, which is independently designated by the controller 8101 via the encoding parameter instruction signal 8135, and sequentially outputs a plurality of 8 (rows)×8 (columns) scaled orthogonal transform coefficient matrices obtained as the operation results onto a scaled transform coefficient matrix signal 8223 (step S1304).

Also, a second scaling unit 8208 in the encoder 8103 makes scaling operations of the plurality of 8 (rows)×8 (columns) quantized orthogonal transform coefficient matrices, which are supplied from the quantizer 8202 via the quantized transform coefficient matrix signal 8222, on the basis of a scaling factor, which is independently designated by the controller 8101 via the encoding parameter instruction signal 8136, and sequentially outputs a plurality of 8 (rows)×8 (columns) scaled orthogonal transform coefficient matrices obtained as the operation results onto a scaled transform coefficient matrix signal 8226 (step S1304).

The scaling operations executed by the aforementioned first and second scaling units 8203 and 8208 are based on bit-shift operations. In this embodiment, one of four values "×1", "×2", "×4", and "×8" can be selected as the scaling factor, and the value "×N" means that an orthogonal transform coefficient matrix is equivalent to that obtained by quantizing using a quantization table in which all quantization step values corresponding to AC components of orthogonal transform coefficients are multiplied by N. For example, if the scaling factor is "×2", a value obtained by 1-bit arithmetic shifting the AC component of an input orthogonal transform coefficient to the LSB side is used as an operation result; if the scaling factor is "×4" or "×8", a value obtained by 2- or 3-bit arithmetic shifting the AC component to the LSB side is used as an operation result. However, if the scaling factor is "×1", all components of input orthogonal transform coefficients are directly output as operation results. None of scaling factors operate the DC component of the orthogonal transform coefficients.

This value "×1" is set as the initial scaling factor of the first scaling unit 8203, and "×2" is set as the initial scaling factor of the second scaling unit 8208 (step S840).

Input values (AC components of orthogonal transform coefficients) and operation results (scaled transform coefficients) in scaling operations executed by the first and second scaling units 8203 and 8208 are summarized in the form of table 1 presented previously.

The first entropy encoder 8204 in the encoder 8103 executes linear conversion in a predetermined scan order, runlength encoding of insignificant transform coefficients with zero values, and variable-length encoding with reference to the first variable-length code table 8206 in turn for the plurality of 8 (rows)×8 (columns) scaled orthogonal transform coefficient matrices, which are supplied from the first scaling unit 8203 via the scaled transform coefficient matrix signal 8223, and outputs a series of encoded data streams corresponding to individual rectangular regions obtained as results onto a first encoded data stream output signal 8123 (step S1305). First encoded data streams corresponding to individual rectangular regions, which are output onto the first encoded data stream output signal 8123 are sequentially stored in the first encoded data stream buffer 8104.

A first encoded data size counter 8207 in the encoder 8103 counts the data length of each encoded data stream corresponding to each individual rectangular region in the first encoded data streams, which are output from the first entropy encoder 8204 onto the first encoded data stream output signal 8123, and outputs the data sizes of the first encoded data streams obtained as count results onto a first encoding additional information notification signal 8152 (step S1306).

Referring back to FIG. 31A, as the next process, the controller 8101 internally and sequentially accumulates, as the first accumulated value, the data sizes of the first encoded data streams corresponding to the individual rectangular regions, which are sequentially supplied from the encoder 8103 via the first encoding additional information notification signal 8152 (step S860).

Likewise, the second entropy encoder 8209 in the encoder 8103 executes linear conversion in a predetermined scan order, runlength encoding of insignificant transform coefficients with zero values, and variable-length encoding with reference to the second variable-length code table 8210 in turn for the plurality of 8 (rows)×8 (columns) scaled orthogonal transform coefficient matrices, which are supplied from the second scaling unit 8208 via the scaled transform coefficient matrix signal 8226, and outputs a series of encoded data streams corresponding to individual rectangular regions obtained as results onto a second encoded data stream signal 8124 (step S1305).

Second encoded data streams corresponding to individual rectangular regions, which are output onto the second encoded data stream output signal 8124 are sequentially stored in the second encoded data stream buffer 8107.

A second encoded data size counter 8211 in the encoder 8103 counts the data length of each encoded data stream corresponding to each individual rectangular region in the first encoded data streams, which are output from the second entropy encoder 8209 onto the second encoded data stream signal 8124, and outputs the data sizes of the first encoded data streams obtained as count results onto a second encoding additional information notification signal 8153 (step S1306).

The controller 8101 internally and sequentially accumulates, as the second accumulated value, the data sizes of the second encoded data streams corresponding to the individual rectangular regions, which are sequentially supplied from the encoder 8103 via the second encoding additional information notification signal 8153 (step S860).

Four straight lines that start from the origin on the graph shown in FIG. 4 represent the transitions of the accumulated values of the data sizes of four encoded streams corresponding to individual rectangular regions obtained when compression-encoding processes using the four scaling factors "×1", "×2", "×4", and "×8" are virtually executed for the first source image data as data to be encoded shown in FIG. 5. An actual accumulated value never increases linearly in this way, but it is represented by a straight line for the sake of simplicity.

On this graph, the transition of the accumulated value of the data sizes of encoded data streams obtained by the compression-encoding processes using the scaling factor "×1" is represented by a straight line Q1(A). When the relative position of rectangular regions that have already undergone compression-encoding is p1, in other words, when all rectangular regions that form segmented region A on the first source image data have undergone the compression-encoding processes, the accumulated value has reached a maximum allowable encoded data size Llim. Hence, no more compression-encoding processes using the scaling factor "×1" for subsequent rectangular regions are required.

Note that the two-dimensional position of the relative position p1 of this rectangular region on the first source image data is indicated on the first source image data illustrated in FIG. 5. Also, segmented region A is illustrated as a group of all rectangular regions from a rectangular region which has undergone a compression-encoding process first (a rectangular region which is located at the upper left corner on the source image data) to a rectangular region located at the relative position p1.

On the graph in FIG. 4, straight lines Q2(A), Q4(A), and Q8(A) respectively represent the transitions of the accumulated values of the data sizes of encoded data streams obtained by compression-encoding processes using the remaining three scaling factors "×2", "×4", and "×8" while the relative position of a rectangular region which is to undergo a compression-encoding process falls within the range of segmented region A on the first source image data. As shown in this graph, the accumulated values of the data sizes of these three encoded data streams respectively reach L2(A), L4(A), and L8(A) when the relative position of the rectangular regions that have already undergone compression-encoding has reached p1.

Therefore, the virtual compression-encoding processes for rectangular regions after the relative position p1 continue for only the three encoded data streams corresponding to the remaining three scaling factors "×2", "×4", and "×8".

On the graph in FIG. 4, straight lines Q2(B), Q4(B), and Q8(B) respectively represent the transitions of the accumulated values of the data sizes of encoded data streams obtained by compression-encoding processes using the remaining three scaling factors "×2", "×4", and "×8" while the relative position of a rectangular region which is to undergo a compression-encoding process falls within the range of segmented region B (from p1 to p2) on the first source image data. As shown in this graph, the accumulated values of the data sizes of these three encoded data streams respectively reach Llim, L4(A+B), and L8(A+B) when the relative position of the rectangular regions that have already undergone compression-encoding has reached p2.

Since the accumulated value of the data sizes of the encoded data streams obtained by the compression-encoding process using the scaling factor "×2" has reached the maximum allowable encoded data size Llim upon completion of compression-encoding processes of all rectangular regions which form segmented regions A and B on the first source image data, no more compression-encoding processes using the scaling factor "×2" for subsequent rectangular regions are required.

Therefore, the virtual compression-encoding processes for rectangular regions after the relative position p2 continue for only the two encoded data streams corresponding to the remaining two scaling factors "×4" and "×8".

In the compression-encoding processes for the first source image data shown in FIG. 5, straight lines Q4(C) and Q8(C) on the graph in FIG. 4 respectively represent the transitions of the accumulated values of the data sizes of encoded data streams obtained by compression-encoding processes using the remaining two scaling factors "×4" and "×8" while the relative position of a rectangular region which is to undergo a compression-encoding process falls within the range of segmented region C (from p2 to 100%) on the first source image data. As shown in this graph, the accumulated values of the data sizes of these two encoded data streams respectively reach L4(A+B+C), and L8(A+B+C) when the relative position of the rectangular regions that have already undergone compression-encoding has reached 100%.

As can be seen from the above description, upon completion of the compression-encoding processes for all rectangular regions that form the first source image data shown in FIG. 5, the final accumulated values of the data sizes of the two encoded data streams obtained by the compression-encoding processes using the two scaling factors "×4" and "×8" do not exceed the maximum allowable encoded data size Llim.

As a result, the encoded data streams obtained by the compression-encoding processes using the scaling factor "×4" as those having a lower compression ratio in term of encoding distortion are optimal encoded data streams to be output from this image encoding apparatus.

In practice, the result indicating that the scaling factor "×4" is an optimal encoding parameter is unknown at the beginning of a series of compression-encoding processes for the first source image data shown in FIG. 5.

The first encoded data streams, which are sequentially stored in the first encoded data stream buffer 8104 during the period of the first encoding operation, i.e., while the relative position of a rectangular region which is to undergo a compression-encoding process falls within the range of segmented region A on the first source image data shown in FIG. 5, are generated from the first source image data by compression-encoding processes using the scaling factor "×1" (initial value) in the encoder 8103. Therefore, the transition of the accumulated value of the data sizes, which are accumulated in the controller 8101, is represented by a dotted straight line Q1(A), and its final accumulated value is indicated by Llim on the graph in FIG. 27. This dotted straight line Q1(A) corresponds to the straight line Q1(A) already shown on the graph in FIG. 4.

On the other hand, the second encoded data streams, which are sequentially stored in the second encoded data stream buffer 8107 during the period of the first encoding phase and serve as substitution candidates, are generated by compression-encoding processes using the scaling factor "×2" in the encoder 8103. Therefore, the transition of the accumulated value of the data sizes, which are accumulated in the controller 8101, is represented by a solid straight line Q2(A), and its final accumulated value is indicated by L2(A) on the graph in FIG. 27. This solid straight line Q2(A) corresponds to the straight line Q2(A) already shown on the graph in FIG. 4.

If it is confirmed that the accumulated value of the data sizes of the first encoded data streams which are stored in the first encoded data stream buffer 8104 and correspond to all rectangular regions that form segmented region A on the first source image data has reached the maximum allowable encoded data size Llim, the controller 8101 determines that the first encoding operation in progress is to end (step S870).

If such determination is made, the controller 8101 instructs the encoder 8103 to immediately abort its encoding process via the encoder operation control signal 8131 (step S880).

Then, the controller 8101 sends an initialization instruction to the first encoded data stream buffer 8104 via the first buffer control signal 8133 so as to discard the encoded data streams which were stored in the first encoded data stream buffer 8104 during the first encoding operation period (step S8100).

Furthermore, the controller 8101 outputs a value "×2" as a scaling factor to the first scaling unit 8203 via the first encoding parameter instruction signal 8135, and also outputs a value "×4" as a scaling factor to the second scaling unit 8208 via the second encoding parameter instruction signal 8136 (step S8110).

The controller 8101 copies the second accumulated value at that time to process it as the first accumulated value, and resets the second accumulated value to zero (step S8120).

After that, the controller 8101 sends an operation start instruction of an encoding process to the encoder 8103 via the encoder operation control signal 8131 so as to start the second encoding operation by the encoder 8103 (step S8130)

Immediately after the above process, the controller 8101 executes the following control to launch the first transfer operation and re-encoding operation.

The controller 8101 outputs a value "×2" as a re-scaling factor onto the re-encoding parameter instruction signal 8137 (step S8140), and then sends an operation start instruction of a re-encoding process to the re-encoder 8106 via a re-encoder operation control signal 8132 (step S8150).

After that, the controller 8101 sends a read instruction to the second encoded data stream buffer 8107 via the second buffer control signal 8134 and also sends a write instruction to the first encoded data stream buffer 8104 via the first buffer control signal 8133, so as to transfer the second encoded data streams, which were generated by the encoder 8103 during the preceding first encoding operation and were stored in the second encoded data stream buffer 8107, and which have the accumulated value L2(A) of their data sizes and serve as substitution candidates, to the first encoded data stream buffer 8104 (step S8160).

With the above instruction, the image encoding apparatus of this embodiment practically starts the first transfer operation and re-encoding operation.

The second encoded data streams, which are sequentially stored (transferred) in the first encoded data stream buffer 8104 during the first transfer operation, are generated by the encoding process using the scaling factor "×2" by the encoder 8103 during the period of the preceding first encoding operation. Therefore, the transition of the accumulated value of the encoded data streams, which are sequentially stored (transferred) in the first encoded data stream buffer 8104 during the period of the first transfer operation, is represented by a dotted straight line Q2(A), and its final accumulated value is indicated by L2(A) on the graph in FIG. 27.

The second encoded data stream corresponding to individual rectangular regions, which are read out from the second encoded data stream buffer 8107 via a second encoded data stream buffer output signal 8128, and serve as substitution candidates, are sequentially stored (transferred) in the first encoded data stream buffer 8104 and also sequentially supplied to the re-encoder 8106.

A series of encoded data streams corresponding to individual rectangular regions, which are supplied to the re-encoder 8106 via the second encoded data stream buffer output signal 8128 are input to the entropy decoder 8301 in the re-encoder 8106.

The flow chart of the process to be executed by the re-encoder 8106 is as shown in FIG. 14. The entropy decoder 8301 in the re-encoder 8106 executes decoding with reference to the variable-length code table 8304, runlength decoding, and two-dimensional conversion in a predetermined scan order in turn for the encoded data streams corresponding to the individual rectangular regions, which are supplied via the second encoded data stream buffer output signal 8128, and sequentially outputs a plurality of 8 (rows)×8 (columns) decoded orthogonal transform coefficient matrices obtained as results onto a decoded transform coefficient matrix signal 8311 (step S1401).

A scaling unit 8302 in the re-encoder 8106 makes scaling operations of the plurality of 8 (rows)×8 (columns) decoded orthogonal transform coefficient matrices, which are supplied from the entropy decoder 8301 via the decoded transform coefficient matrix signal 8311, on the basis of a re-scaling factor independently designated from the controller 8101 via the re-encoding parameter instruction signal 8137, and sequentially outputs a plurality of 8 (rows)×8 (columns) re-scaled orthogonal transform coefficient matrices obtained as operation results onto a re-scaled transform coefficient matrix signal 8312 (step S1402).

The scaling operations executed by the scaling unit 8302 are the same as those executed in the first and second scaling units 8203 and 8208 in the encoder 8103. As the scaling factor for the scaling unit 8302, a fixed value "×2" is always set except for a special case.

The entropy encoder 8303 in the re-encoder 8106 executes linear conversion in a predetermined scan order, runlength encoding for insignificant transform coefficients with values "0", and variable-length encoding with reference to the variable-length code table 8305 in turn for the plurality of 8 (rows)×8 (columns) re-scaled orthogonal transform coefficient matrices, which are supplied from the scaling unit 8302 via the re-scaled transform coefficient matrix signal 8312, and outputs a series of encoded data streams corresponding to individual rectangular regions obtained as results onto a third encoded data stream signal 8127 (step S1403).

An encoded data size counter 8306 in the re-encoder 8106 counts the data size of each encoded data stream corresponding to each individual rectangular region in the third encoded data streams, which are output from the entropy encoder 8303 onto the third encoded data stream signal 8127 and serve as substitution candidates, and outputs the data sizes of the third encoded data streams obtained as count results onto a re-encoding additional information notification signal 8154 (step S1404).

Referring back to FIG. 31B, the data sizes of the third encoded data streams corresponding to individual rectangular regions, which are similarly sequentially supplied from the re-encoder 8106 to the controller 8101 via the re-encoding additional information notification signal 8154, and serve as substitution candidates, are sequentially accumulated as a third accumulated value in the controller 8101 (step S8170).

The aforementioned re-encoding operation will be summarized below. A series of encoded data streams corresponding to individual rectangular regions, which are supplied to the re-encoder 8106 via the second encoded data stream buffer output signal 8128, are entropy-decoded to obtain a plurality of 8 (rows)×8 (columns) decoded orthogonal transform coefficient matrices, which undergo re-scaling operations using a scaling factor "×2", and also undergo entropy encoding, thus outputting a series of encoded data streams corresponding to the individual rectangular regions onto the third encoded data stream signal 8127, and also outputting their data sizes onto the re-encoding additional information notification signal 8154.

The third encoded data streams corresponding to individual rectangular regions, which are output onto the third encoded data stream output signal 8127, and serve as "next" substitution candidates, are sequentially stored in the second encoded data stream buffer 8107 again.

The third encoded data streams, which are sequentially stored in the second encoded data stream buffer 8107 during the period of the first re-encoding operation and serve as "next" substitution candidates, are generated by further executing the re-encoding process using a scaling factor "×2" in the re-encoder 8106 for the second encoded data streams which were generated by the encoding process using the scaling factor "×2" by the encoder 8103 during the period of the first encoding operation. Therefore, the transition of the accumulated value of their data sizes, which are accumulated in the controller 8101, is represented by a solid straight line Q2(A)→Q4(A), and its final accumulated value is indicated by L4(A) on the graph in FIG. 27.

If it is confirmed that all the second encoded data streams serving as substitution candidates have been stored (transferred) in the first encoded data stream buffer 8104 and all the third encoded data streams serving as "next" substitution candidates have been stored in the second encoded data stream buffer 8107, the first transfer operation and re-encoding operation in progress are to end (step S8180). Also, the data sizes of the first encoded data streams corresponding to individual rectangular regions, which are sequentially supplied from the encoder 8103 to the controller 8101 via the first encoding additional information notification signal 8152 are sequentially accumulated as the first accumulated value in the controller 8101, and the data sizes of the second encoded data streams corresponding to individual rectangular regions, which are sequentially supplied to the controller 8101 via the second encoding additional information notification signal 8153 are sequentially accumulated as the second accumulated value in the controller 8101 (step S8190).

With the process in step S8190, the first accumulated value indicates the data size stored in the first encoded data stream buffer 8104, and the second accumulated value indicates the data size stored in the second encoded data stream buffer 8107.

Upon completion of the first transfer operation and re-encoding operation, the controller 8101 instructs the re-encoder 8106 to abort its re-encoding operation via the re-encoder operation control signal 8132 (step S8210).

Furthermore, the controller 8101 sends a read end instruction to the second encoded data stream buffer 8107 via the second buffer control signal 8134, and also sends a write end instruction to the first encoded data stream buffer 8104 via the first buffer control signal 8133.

On the other hand, the second encoding operation by the encoder 8103 is in progress, and the source image data input unit 8102 sequentially outputs image data from a rectangular region immediately after the relative position p1 in the first source image data, which follows the preceding first encoding operation. Source image data of rectangular regions, which are segmented by and output from the source image data input unit 8102 and are supplied to the encoder 8103 via the to-be-encoded data input signal 8122, undergo orthogonal transformation and quantization operations to obtain a plurality of 8 (rows)×8 (columns) quantized orthogonal transform coefficient matrices, which then undergo scaling operations using the scaling factor "×2" and also undergo entropy encoding, thus outputting a series of encoded data streams corresponding to individual rectangular regions onto the first encoded data stream output signal 8123, and also outputting their data sizes onto the first encoding additional information notification signal 8152 as in the preceding encoding operation.

Then, the data sizes of the first encoded data streams corresponding to individual rectangular regions, which are sequentially supplied from the encoder 8103 via the first encoding additional information notification signal 8152, are sequentially accumulated as the first accumulated value in the controller 8101 (step S8220).

The first encoded data streams corresponding to individual rectangular regions, which are output onto the first encoded data stream output signal 8123, are sequentially stored in the first encoded data stream buffer 8104. In this case, in the first encoded data stream buffer 8104, storage of the first encoded data streams input via the first encoded data stream output signal 8123, and storage (transfer) of encoded data streams of the scaling factor "×2", which are output from the second encoded data stream buffer output signal 8128 and correspond to segmented region A on the first source image data, occur at the same time. Therefore, the first encoded data stream buffer 8104 must rearrange these encoded data on the basis of the corresponding position information on the first source image data.

At the same time, source image data of rectangular regions, which are segmented by and output from the source image data input unit 8102 and are supplied to the encoder 8103 via the to-be-encoded data input signal 8122, undergo orthogonal transformation and quantization operations to obtain a plurality of 8 (rows)×8 (columns) quantized orthogonal transform coefficient matrices, which then undergo scaling operations using the scaling factor "×4" and also undergo entropy encoding, thus outputting a series of encoded data streams corresponding to individual rectangular regions onto the second encoded data stream output signal 8124, and also outputting their data sizes onto the re-encoding additional information notification signal 8153.

Then, the data sizes of the first encoded data streams corresponding to individual rectangular regions, which are sequentially supplied from the encoder 8103 via the re-encoding additional information notification signal 8153, are sequentially accumulated as the second accumulated value in the controller 8101 (step S8220).

The second encoded data streams corresponding to individual rectangular regions, which are output onto the second encoded data stream output signal 8124, are sequentially stored in the second encoded data stream buffer 8107. In this case, in the second encoded data stream buffer 8107, storage of the second encoded data streams input via the second encoded data stream output signal 8124, and storage of encoded data streams of the scaling factor "×4", which are input via the third encoded data stream buffer output signal 8127 and correspond to segmented region A on the second source image data by the aforementioned first re-encoding operation, occur at the same time. Therefore, the second encoded data stream buffer 8107 must rearrange these encoded data on the basis of the corresponding position information on the second source image data.

The first encoded data streams, which are sequentially stored in the first encoded data stream buffer 8104 during the period of the second encoding operation, i.e., while the relative position of a rectangular region which is to undergo a compression-encoding process falls within the range of segmented region B on the first source image data shown in FIG. 5, are generated from the first source image data by compression-encoding processes using the scaling factor "×2" in the encoder 8103. Therefore, the transition of the accumulated value of the data sizes, which are accumulated in the controller 8101, is represented by a dotted straight line Q2(B), and its final accumulated value is indicated by Llim on the graph in FIG. 27. This dotted straight line Q2(B) corresponds to the straight line Q2(B) already shown on the graph in FIG. 4.

On the other hand, the second encoded data streams, which are sequentially stored in the second encoded data stream buffer 8107 during the identical second encoding operation and serve as substitution candidates, are generated by compression-encoding processes using the scaling factor "×4" in the encoder 8103. Therefore, the transition of the accumulated value of the data sizes, which are accumulated in the controller 8101, is represented by a dotted straight line Q4(B), and its final accumulated value is indicated by L4(A+B) on the graph in FIG. 27. This dotted straight line Q4(B) corresponds to the straight line Q4(B) already shown on the graph in FIG. 4.

If it is confirmed that the accumulated value of the data sizes of the first encoded data streams which are stored in the first encoded data stream buffer 8104 and correspond to all rectangular regions that form segmented regions A and B on the first source image data has reached the maximum allowable encoded data size Llim, the controller 8101 determines that the second encoding operation in progress is to end (step S8230).

If such determination is made, the controller 8101 instructs the encoder 8103 to immediately abort its encoding process via the encoder operation control signal 8131 (step S8240).

Since the compression-encoding processes of the first source image is not complete yet, the flow returns to step S8100, and the controller 8101 sends an initialization instruction to the first encoded data stream buffer 8104 via the first buffer control signal 8133 so as to discard the encoded data streams which were stored in the first encoded data stream buffer 8104 during the periods of the first transfer operation and second encoding operation (step S8100).

Furthermore, the controller 8101 outputs a value "×4" as a scaling factor to the first scaling unit 8203 via the first encoding parameter instruction signal 8135, and also outputs a value "×8" as a scaling factor to the second scaling unit 8208 via the second encoding parameter instruction signal 8136 (step S8110).

The controller 8101 copies the second accumulated value at that time to process it as the first accumulated value, and resets the second accumulated value to zero (step S8120). After that, the controller 8101 sends an operation start instruction of an encoding process to the encoder 8103 via the encoder operation control signal 8131 so as to start the third encoding operation by the encoder 8103 (step S8130). Immediately after the above process, the controller 8101 executes the following control to launch the second transfer operation and re-encoding operation.

The controller 8101 outputs a value "×2" as a re-scaling factor onto the re-encoding parameter instruction signal 8137 (step S8140), and then sends an operation start instruction of a re-encoding process to the re-encoder 8106 via a re-encoder operation control signal 8132 (step S8150). After that, the controller 8101 sends a read instruction to the second encoded data stream buffer 8107 via the second buffer control signal 8134 and also sends a write instruction to the first encoded data stream buffer 8104 via the first buffer control signal 8133, so as to transfer the second encoded data streams, which were generated by the re-encoder 8106 and encoder 8103 during the periods of the preceding first transfer operation and second encoding operation, and were stored in the second encoded data stream buffer 8107, and which have the accumulated value L4(A+B) of their data sizes and serve as substitution candidates, to the first encoded data stream buffer 8104 (step S8160).

With the above instruction, the image encoding apparatus of this embodiment practically starts the second transfer operation and re-encoding operation.

The second encoded data streams, which are sequentially stored (transferred) in the first encoded data stream buffer 8104 during the period of the second transfer operation, include those generated by the encoding process using the scaling factor "×4" by the encoder 8103 during the period of the preceding second encoding operation, and those generated by the re-encoding process using the scaling factor "×2" by the re-encoder 8106 during the period of the preceding re-encoding operation. Therefore, the transition of the accumulated value of the encoded data streams, which are sequentially stored (transferred) in the first encoded data stream buffer 8104 during the period of the second transfer operation, is represented by a dotted straight line Q4(A+B), and its final accumulated value is indicated by L4(A+B) on the graph in FIG. 27.

The second encoded data stream corresponding to individual rectangular regions, which are read out from the second encoded data stream buffer 8107 via the second encoded data stream buffer output signal 8128, and serve as substitution candidates, are sequentially stored (transferred) in the first encoded data stream buffer 8104 and also sequentially supplied to the re-encoder 8106.

Then, the re-encoder 8106 executes the aforementioned re-encoding process. That is, a series of encoded data stream corresponding to individual rectangular regions, which are supplied to the re-encoder 8106 via the second encoded data stream buffer output signal 8128, are entropy-decoded to obtain a plurality of 8 (rows)×8 (columns) decoded orthogonal transform coefficient matrices, which undergo re-scaling operations using a scaling factor "×2", and also undergo entropy encoding, thus outputting a series of encoded data streams corresponding to the individual rectangular regions onto the third encoded data stream signal 8127, and also outputting their data sizes onto the re-encoding additional information notification signal 8154.

The data sizes of the third encoded data streams corresponding to individual rectangular regions, which are similarly sequentially supplied from the re-encoder 8106 to the controller 8101 via the re-encoding additional information notification signal 8154, and serve as substitution candidates, are sequentially accumulated as a third accumulated value in the controller 8101 (step S8170).

The third encoded data streams corresponding to individual rectangular regions, which are output onto the third encoded data stream output signal 8127, and serve as "next"

substitution candidates, are sequentially stored in the second encoded data stream buffer 8107 again.

The third encoded data streams, which are sequentially stored in the second encoded data stream buffer 8107 via the third encoded data stream output signal 8127 during the period of the second re-encoding operation, and serve as "next" substitution candidate, include those which are generated by the re-encoding process using the scaling factor "×2" by the re-encoder 8106 for the first encoded data streams, that were generated by the re-encoding process using the scaling factor "×2" by the re-encoder 8106 for the first encoded data streams generated by the encoding process using the scaling factor "×2" by the encoder 8103 during the period of the preceding first encoding operation, and those which are generated by the re-encoding process using the scaling factor "×2" by the re-encoder 8106 for the first encoded data streams that were generated by the encoding process using the scaling factor "×4" by the encoder 8103 during the period of the preceding second encoding operation. Therefore, the transition of the accumulated value of their data sizes, which are accumulated in the controller 8101, is represented by a solid straight line Q4(A+B)→Q8(A+B), and its final accumulated value is indicated by L8(A+B) on the graph in FIG. 27.

If it is confirmed that all the second encoded data streams serving as substitution candidates have been stored (transferred) in the first encoded data stream buffer 8104 and all the third encoded data streams serving as "next" substitution candidates have been stored in the second encoded data stream buffer 8107, the second transfer operation and re-encoding operation in progress are to end (step S8180). Also, the data sizes of the first encoded data streams corresponding to individual rectangular regions, which are sequentially supplied from the encoder 8103 to the controller 8101 via the first encoding additional information notification signal 8152 are sequentially accumulated as the first accumulated value in the controller 8101, and the data sizes of the second encoded data streams corresponding to individual rectangular regions, which are sequentially supplied to the controller 8101 via the second encoding additional information notification signal 8153 are sequentially accumulated as the second accumulated value in the controller 8101 (step S8190).

With the process in step S8190, the first accumulated value indicates the data size stored in the first encoded data stream buffer 8104, and the second accumulated value indicates the data size stored in the second encoded data stream buffer 8107.

Upon completion of the second transfer operation and re-encoding operation, the controller 8101 instructs the re-encoder 8106 to abort its re-encoding operation via the re-encoder operation control signal 8132 (step S8210). Furthermore, the controller 8101 sends a read end instruction to the second encoded data stream buffer 8107 via the second buffer control signal 8134, and also sends a write end instruction to the first encoded data stream buffer 8104 via the first buffer control signal 8133.

On the other hand, the third encoding operation by the encoder 8103 is in progress, and the source image data input unit 8102 sequentially outputs image data from a rectangular region immediately after the relative position p2 in the first source image data, which follows the preceding second encoding operation. Source image data of rectangular regions, which are segmented by and output from the source image data input unit 8102 and are supplied to the encoder 8103 via the to-be-encoded data input signal 8122, undergo orthogonal transformation and quantization operations to obtain a plurality of 8 (rows)×8 (columns) quantized orthogonal transform coefficient matrices, which then undergo scaling operations using the scaling factor "×4" and also undergo entropy encoding, thus outputting a series of encoded data streams corresponding to individual rectangular regions onto the first encoded data stream output signal 8123, and also outputting their data sizes onto the first encoding additional information notification signal 8152 as in the preceding encoding operation.

Then, the data sizes of the first encoded data streams corresponding to individual rectangular regions, which are sequentially supplied from the encoder 8103 via the first encoding additional information notification signal 8152, are sequentially accumulated as the first accumulated value in the controller 8101 (step S8220).

The first encoded data streams corresponding to individual rectangular regions, which are output onto the first encoded data stream output signal 8123, are sequentially stored in the first encoded data stream buffer 8104. In this case, in the first encoded data stream buffer 8104, storage of the first encoded data streams input via the first encoded data stream output signal 8123, and storage (transfer) of encoded data streams of the scaling factor "×4", which are output from the second encoded data stream buffer output signal 8128 and correspond to segmented regions A and B on the first source image data, take place at the same time. Therefore, the first encoded data stream buffer 8104 must rearrange these encoded data on the basis of the corresponding position information on the first source image data.

At the same time, source image data of rectangular regions, which are segmented by and output from the source image data input unit 8102 and are supplied to the encoder 8103 via the to-be-encoded data input signal 8122, undergo orthogonal transformation and quantization operations to obtain a plurality of 8 (rows)×8 (columns) quantized orthogonal transform coefficient matrices, which then undergo scaling operations using the scaling factor "×8" and also undergo entropy encoding, thus outputting a series of encoded data streams corresponding to individual rectangular regions onto the second encoded data stream output signal 8124, and also outputting their data sizes onto the re-encoding additional information notification signal 8153.

Then, the data sizes of the first encoded data streams corresponding to individual rectangular regions, which are sequentially supplied from the encoder 8103 via the re-encoding additional information notification signal 8153, are sequentially accumulated as the second accumulated value in the controller 8101 (step S8220).

The second encoded data streams corresponding to individual rectangular regions, which are output onto the second encoded data stream output signal 8124, are sequentially stored in the second encoded data stream buffer 8107. In this case, in the second encoded data stream buffer 8107, storage of the second encoded data streams input via the second encoded data stream output signal 8124, and storage of encoded data streams of the scaling factor "×8", which are input via the third encoded data stream buffer output signal 8127 and correspond to segmented regions A and B on the second source image data by the aforementioned second re-encoding operation, take place at the same time. Therefore, the second encoded data stream buffer 8107 must rearrange these encoded data on the basis of the corresponding position information on the second source image data.

The first encoded data streams, which are sequentially stored in the first encoded data stream buffer 8104 during the period of the third encoding operation, i.e., while the relative position of a rectangular region which is to undergo a compression-encoding process falls within the range of segmented region C on the first source image data shown in FIG. 5, are generated from the first source image data by compression-encoding processes using the scaling factor "×4" in the encoder 8103. Therefore, the transition of the accumulated value of the data sizes, which are accumulated in the controller 8101, is represented by a dotted straight line Q4(C), and its final accumulated value is indicated by L4(A+B+C) on the graph in FIG. 27. This dotted straight line Q4(C) corresponds to the straight line Q4(C) already shown on the graph in FIG. 4.

On the other hand, the second encoded data streams, which are sequentially stored in the second encoded data stream buffer 8107 during the identical third encoding operation and serve as substitution candidates, are generated by compression-encoding processes using the scaling factor "×8" in the encoder 8103. Therefore, the transition of the accumulated value of the data sizes, which are accumulated in the controller 8101, is represented by a dotted straight line Q8(C), and its final accumulated value is indicated by L8(A+B+C) on the graph in FIG. 27. This dotted straight line Q8(C) corresponds to the straight line Q8(C) already shown on the graph in FIG. 4.

If it is confirmed that the accumulated value of the data sizes of the first encoded data streams, which are stored in the first encoded data stream buffer 8104 and correspond to all rectangular regions that form the first source image data, do not exceed the maximum allowable encoded data size Llim, the controller 8101 determines that the third encoding operation in progress is to end (step S8230). If such determination is made, the controller 8101 instructs the encoder 8103 to immediately end its encoding process via the encoder operation control signal 8131 (step S8240).

Subsequently, the controller 8101 issues a read instruction to the first encoded data stream buffer 8104 via the first encoded data stream buffer access control signal 8133, so as to output the encoded data streams, which were stored in the first encoded data stream buffer 8104 during the periods of the preceding second transfer operation and third encoding operation, and which have the accumulated value L4(A+B+C) of their data sizes, from the image encoding apparatus (step S8320).

The encoded data streams corresponding to individual rectangular regions, which are read out from the first encoded data stream buffer 8104 via the first encoded data stream buffer output signal 8125, are combined into one encoded data stream corresponding to the entire first source image data by an encoded data stream output unit 8105, and that encoded data stream is output onto an encoded data stream output signal 8126 as the result of the compression-encoding processes of the image encoding apparatus.

The image encoding apparatus of this embodiment ends a series of compression-encoding processes for the first source image data upon completion of the output process of the encoded data stream from the encoded data stream output unit 8105.

The operation of the image encoding apparatus of this embodiment when second source image data as another source image data is used will be explained below.

Figure 28:
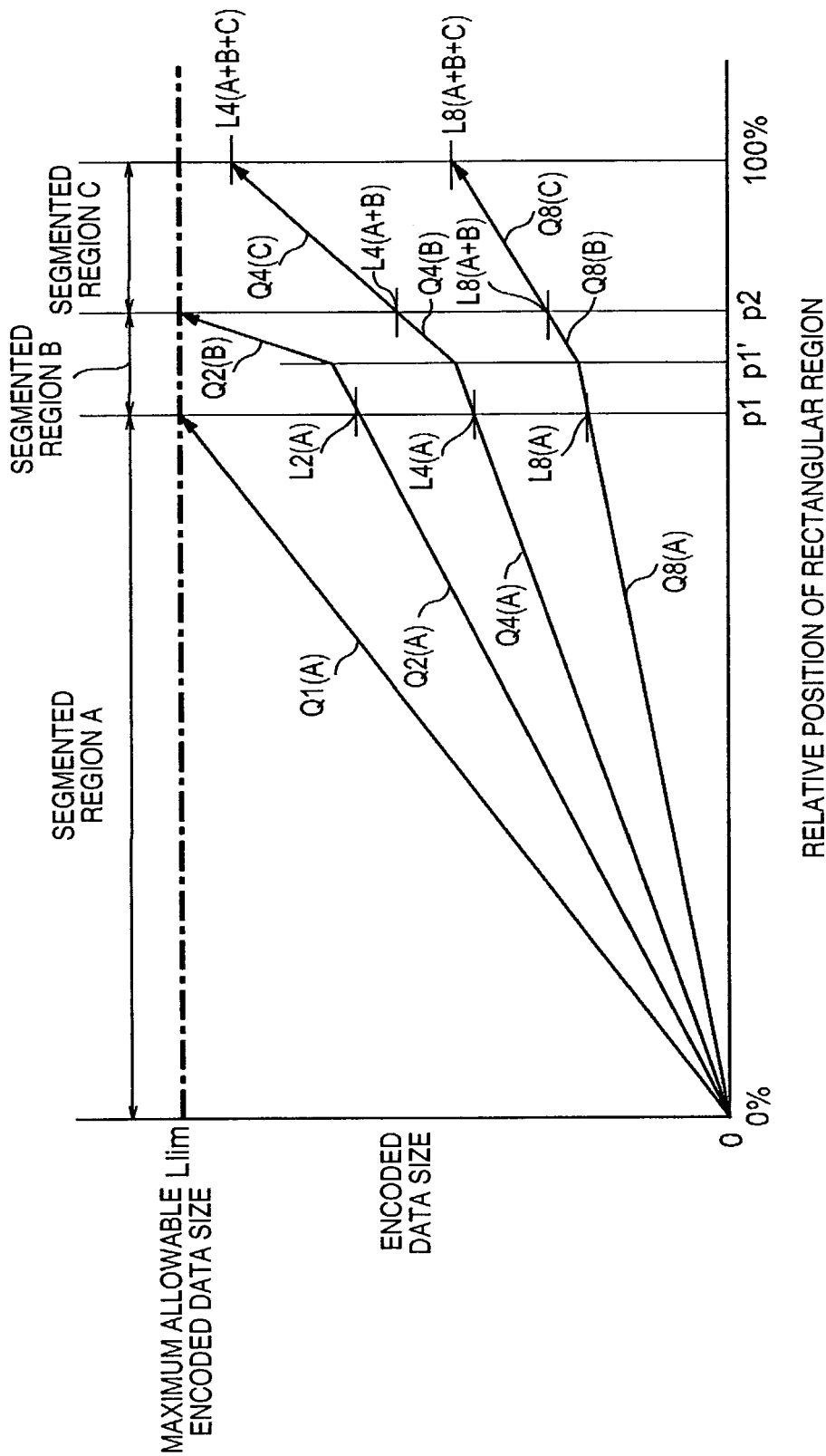
FIG. 28 is a graph showing the relationship between the accumulated value of the data sizes of encoded data streams (ordinate) obtained when compression-encoding processes of second source image data input as data to be encoded to the image encoding apparatus shown in FIG. 24 are sequentially executed for respective rectangular regions using a single quantization table and four different quantization scaling factors ×1, ×2, ×3, and ×4, and the relative position of a rectangular region that has already undergone the compression-encoding process at that time in the source image data (abscissa)

FIG. 28 is a graph showing the relationship between the accumulated value of the data sizes of encoded data streams (ordinate) obtained when compression-encoding processes of second source image data input as data to be encoded to the image encoding apparatus shown in FIG. 24 are sequentially executed for respective rectangular regions using a single quantization table and four different quantization scaling factors ×1, ×2, ×3, and ×4, and the relative position of a rectangular region that has already undergone the compression-encoding process at that time in the source image data (abscissa).

Figure 29:
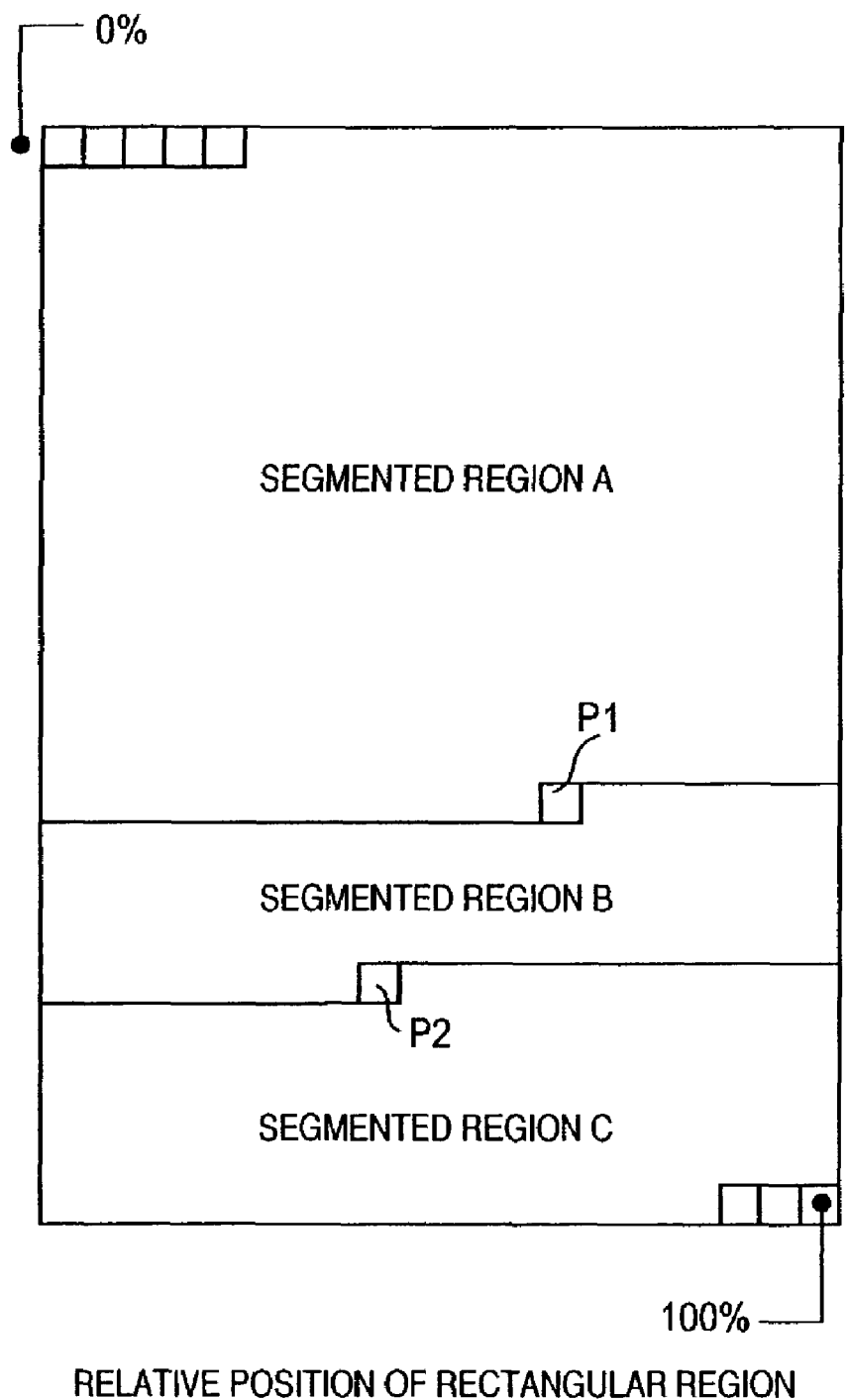
FIG. 29 shows the second source image data.

FIG. 29 shows the second source image data.

Figure 30:
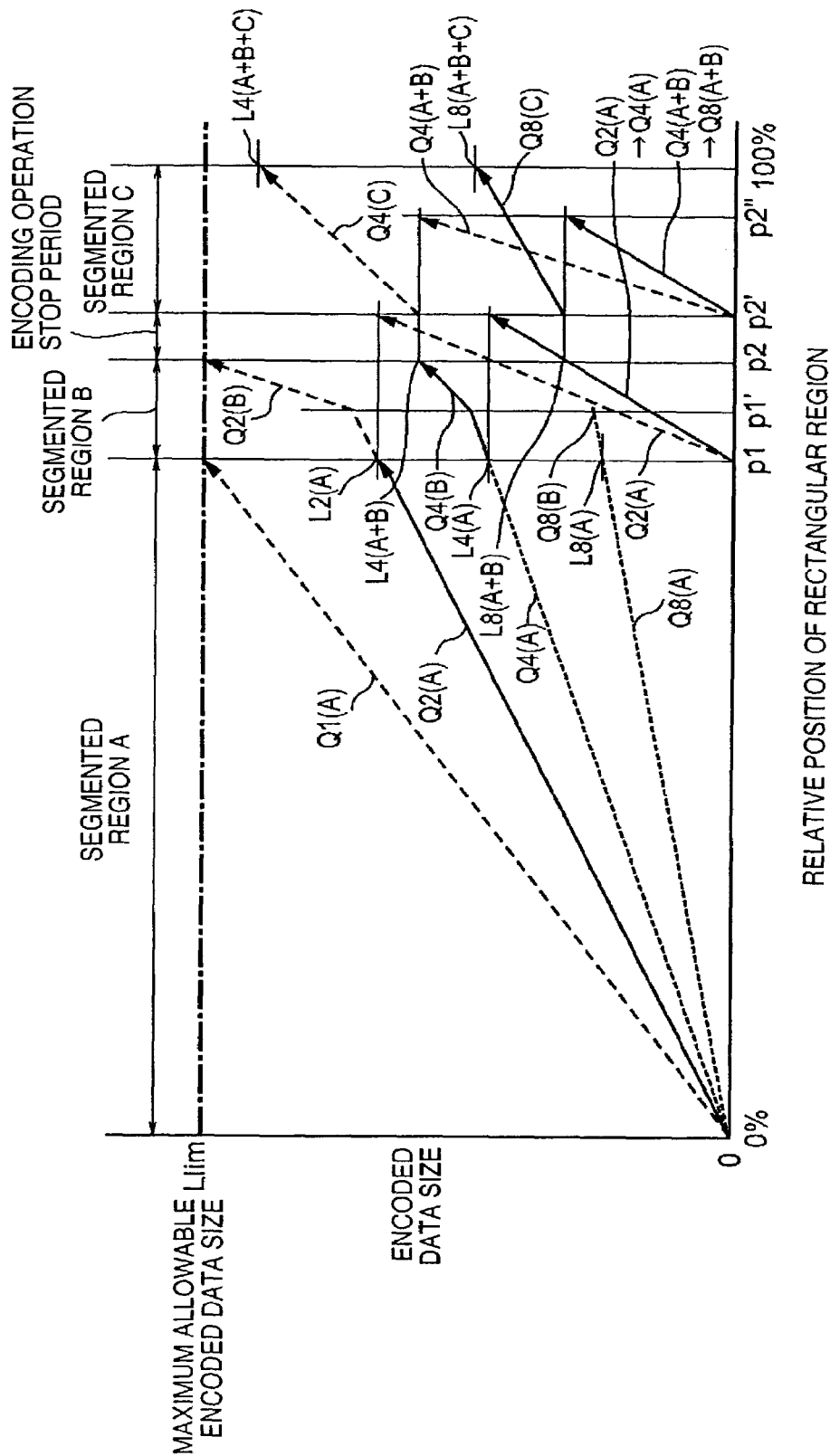
FIG. 30 is a graph showing the relationship between the accumulated value of the data sizes of encoded data streams (ordinate) stored in the first and second encoded data stream buffers 8104 and 8107 during a series of compression-encoding processes for the second source image to be input as data to be encoded to the image encoding apparatus shown in FIG. 24, and the relative position of a rectangular region that has already undergone the compression-encoding process at that time in the source image data (abscissa)

FIG. 30 is a graph showing the relationship between the accumulated value of the data sizes of encoded data streams (ordinate) stored in the first and second encoded data stream buffers 8104 and 8107 during a series of compression-encoding processes for the second source image to be input as data to be encoded to the image encoding apparatus shown in FIG. 24, and the relative position of a rectangular region that has already undergone the compression-encoding process at that time in the source image data (abscissa).

A series of compression-encoding processes that the image encoding apparatus of this embodiment executes for the second source image data will be explained below using FIGS. 24 to 26 and FIGS. 28 to 31C.

Four straight lines that start from the origin on the graph shown in FIG. 28 represent the transitions of the accumulated values of four encoded data sizes corresponding to individual rectangular regions obtained when compression-encoding processes using the four scaling factors "×1", "×2", "×4", and "×8" are virtually executed for the second source image data shown in FIG. 29.

On this graph, the transitions of the accumulated values of the data sizes of encoded data streams obtained by the compression-encoding processes using the scaling factors "×1", "×2", "×4", and "×8" while the relative position of a rectangular region which is to undergo the compression-encoding process falls within the range of segmented region A on the second source image data are represented by straight lines Q1(A), Q2(A), Q4(A), and Q8(A). As shown in this graph, when the relative position of rectangular regions that have already undergone compression-encoding is p1, the accumulated values of the data sizes of these four encoded data streams have reached Llim, L2(A), L4(A), and L8(A).

Since the accumulated value of the data sizes of encoded data streams, which are obtained by the compression-encoding process using the scaling factor "×1", has reached the maximum allowable encoded data size Llim upon completion of the compression-encoding process of all rectangular regions which form segmented region A on the second source image data, no more compression-encoding processes using the scaling factor "×1" for subsequent rectangular regions are required.

Therefore, the virtual compression-encoding processes for rectangular regions after the relative position p1 use one of the remaining three scaling factors "×2", "×4", and "×8".

On the graph in FIG. 28, straight lines Q2(B), Q4(B), and Q8(B) respectively represent the transitions of the accumulated values of the data sizes of encoded data streams obtained by compression-encoding processes using the remaining three scaling factors "×2", "×4", and "×8" while the relative position of a rectangular region which is to undergo a compression-encoding process falls within the range of segmented region B (from p1 to p2) on the second source image data. As shown in this graph, the accumulated values of the data sizes of these three encoded data streams respectively reach Llim, L4(A+B), and L8(A+B) when the relative position of the rectangular regions that have already undergone compression-encoding has reached p2.

Since the slopes of the straight lines Q2(B), Q4(B), and Q8(B) begin to immediately increase at a relative position of rectangular regions in FIG. 28, it can be estimated that the information size of the second source image data increases immediately from the relative position p1' toward 100%.

Since the accumulated value of the data sizes of the encoded data streams obtained by the compression-encoding process using the scaling factor "×2" has reached the maximum allowable encoded data size Llim upon completion of compression-encoding processes of all rectangular regions which form segmented regions A and B on the second source image data, no more compression-encoding processes using the scaling factor "×2" for subsequent rectangular regions are required.

Therefore, the virtual compression-encoding processes for rectangular regions after the relative position p2 use one of the remaining two scaling factors "×4" and "×8".

On the graph in FIG. 28, straight lines Q4(C) and Q8(C) respectively represent the transitions of the accumulated values of the data sizes of encoded data streams obtained by compression-encoding processes using the remaining two scaling factors "×4" and "×8" while the relative position of a rectangular region which is to undergo a compression-encoding process falls within the range of segmented region C (from p2 to 100%) on the second source image data. As shown in this graph, the accumulated values of the data sizes of these two encoded data streams respectively reach L4(A+B+C), and L8(A+B+C) when the relative position of the rectangular regions that have already undergone compression-encoding has reached 100%.

As can be seen from the above description, upon completion of the compression-encoding processes for all rectangular regions that form the second source image data, the final accumulated values of the data sizes of encoded data streams obtained by the compression-encoding processes using the scaling factor "×4" do not exceed the maximum allowable encoded data size Llim. As a result, the encoded data streams obtained by the compression-encoding processes using the scaling factor "×4" are determined as optimal encoded data streams to be output from this image encoding apparatus.

The transitions of the accumulated values of the data sizes of encoded data streams, which are respectively stored in the first and second encoded data stream buffers 8104 and 8107 upon executing a series of compression-encoding processes for the second source image data are as shown in FIG. 30.

Referring to FIG. 30, the slope of the dotted straight line Q2(B) that represents the accumulated value of the data sizes of first encoded data streams, which are generated by the encoder 8103 and correspond to segmented region B, begins to increase from the relative position p1' of rectangular regions, and the line Q2(B) drastically approaches the maximum allowable encoded data size Llim. The dotted straight line Q2(B) has reached Llim at the relative position p2 of the rectangular regions, but a re-encoding operation for re-encoding encoded data streams, which were generated using the quantization scaling factor "×2" by the preceding encoding operation, and correspond to segmented region A, by the re-encoder 8106, as indicated by a solid straight line Q2(A)→Q4(A), is not complete yet at that time. Encoded data streams which are to undergo the re-encoding process in the re-encoder 8106 and correspond to segmented region A, are also transferred to and stored in the first encoded data stream buffer 8104, and that transfer operation is not complete yet at the relative position p2 of rectangular regions as in the re-encoding operation.

Since the re-encoding operation and the transfer operation of the encoded data streams are not complete yet at the relative position p2 of rectangular regions, the controller 8101 instructs the encoder 8103 to abort its encoding process via the encoder operation control signal 8131 (step S8260).

The encoding process remains aborted until the re-encoding operation and transfer operation, which are in progress, are complete, as indicated by an encoding operation stop period (from p2 to p2') inserted between segmented regions B and C in FIG. 30 (step S8290).

The controller 8101 instructs the re-encoder 8106 to abort its re-encoding process via the re-encoder operation control signal 8132 upon completion of the re-encoding operation and transfer operation for segmented region B (p2') (step S8300).

Furthermore, the controller 8101 sends a read end instruction to the second encoded data stream buffer 8107 via the second buffer control signal 8134, and also sends a write end instruction to the first encoded data stream buffer 8104 via the first buffer control signal 8133.

After that, the controller 8101 designates new scaling factors for the encoder 8103 via the first and second encoding parameter instruction signals 8135 and 8136 so as to immediately start an encoding process for segmented region C (steps S8100, S8110, and S8120), and then instructs the encoder 8103 to start its encoding process via the encoder operation control signal 8131 (step S8130).

An overview of the image encoding apparatus of this embodiment described above will be explained below.

Upon executing so-called information size control involved in a series of compression-encoding processes for input image data, the control means issues an update instruction of an encoding parameter and executes various kinds of operation control accordingly on the basis of the maximum allowable encoded data size, which is set in advance, the ratio of the total of rectangular regions that have already undergone the encoding process to the source image data, the accumulated data size of encoded data streams generated so far, and the like.

When the controller issues a change instruction of an encoding parameter, the image encoding apparatus starts a transfer operation and re-encoding operation in addition to an encoding operation using the changed encoding parameter.

In the transfer operation, encoded data streams, which were generated and stored in the period of the previous encoding operation, are discarded or invalidated from the first encoded data stream buffer, and new encoded data streams corresponding to the updated encoding parameter are transferred from another second encoded data stream buffer, and are stored on the first encoded data stream buffer. That is, the encoded data streams stored on the first encoded data stream buffer so far are replaced by the new encoded data streams.

In the re-encoding operation, encoded data streams, which were stored on the second encoded data stream buffer during the period of the previous encoding operation, are input to and re-encoded by the re-encoder using a different encoding parameter, and are stored on the second encoded data stream buffer again.

The image encoding apparatus of this embodiment is premised that an encoding parameter to be updated upon issuing the next encoding parameter change instruction is known. Therefore, a process for generating new encoded data streams corresponding to the updated encoding parameter can be executed simultaneously with an encoding process for each rectangular region, which is done during the period of the preceding encoding operation.

The other encoded data streams generated during the period of the preceding encoding operation are sequentially stored in the second encoded data stream buffer as encoded data stream of next substitution candidates.

As a practical method of generating encoded data stream of next substitution candidates, this embodiment adopts two methods.

In one method, the re-encoding means receives first encoded data streams that have already been encoded by the encoding means, executes a re-encoding process of symbol information obtained via a decoding process using the next encoding parameter to be updated, and consequently generates encoded data streams of next substitution candidates.

In the other method, the encoding means simultaneously executes an encoding process of first encoded data streams and that of encoded data streams corresponding to the next encoding parameter to be updated, and consequently generates encoded data streams of next substitution candidates.

The encoded data streams of next substitution candidates, which are generated by one of these two methods in the preceding encoding operation, and are stored in the second encoded data stream buffer, are transferred to the first encoded data stream buffer upon issuing an encoding parameter update instruction by adaptive determination of the controller, and replace the encoded data streams stored so far.

Furthermore, a generation process of encoded data streams of still next substitution candidates is executed parallel to the transfer operation under the assumption that the encoding parameter may be changed again.

In a so-called re-encoding operation for generating encoded data streams of still next substitution candidates, which is executed simultaneously with the transfer operation, the re-encoding means receives transferred encoded data streams, executes a re-encoding process of symbol information obtained via a decoding process using the still next encoding parameter to be updated, and consequently generates encoded data streams of still next substitution candidates.

Also, encoded data streams of substitution candidates, which are generated using the still next encoding parameter to be updated are generated by an encoding operation of the encoder at the same time by the aforementioned method.

The generated encoded data streams of still next substitution candidates are sequentially stored on the second encoded data stream buffer as those which follow the encoded data streams of still next substitution candidates that are generated and stored by the re-encoding operation.

Upon completion of the transfer operation of encoded data streams between the two buffer memories, and the re-encoding process as a generation process of encoded data streams of still next substitution candidates, which is executed parallel to the transfer operation, only encoding operations using the designated encoding parameter and updated encoding parameter remain as the operations of the image encoding apparatus.

As described above, the transfer operation process of the image encoding apparatus, which is executed upon issuing an encoding parameter update instruction, the process for generating encoded data streams of still next substitution candidates in the re-encoding operation, and the process for generating encoded data streams of still next substitution candidates, which is executed at the same time in the encoding operation, are done as a sort of insurance under the assumption that another update instruction of an encoding parameter may be issued again.

Of the processes which are executed as a sort of insurance, the process for generating encoded data streams of still next substitution candidates in the re-encoding operation is preferably completed before the accumulated data size of encoded data streams generated by the encoding means using the encoding parameter designated at that time exceeds the maximum allowable encoded data size.

However, some image data input as source image data to the image encoding apparatus of this embodiment may have characteristics that the accumulated data size of encoded data streams generated by the encoding means using the encoding parameter designated at that time exceeds the maximum allowable encoded data size before the process for generating encoded data streams of still next substitution candidates in the re-encoding operation is completed. In such case, the encoding means continues the encoding operation using the encoding parameter designated at that time, and continuously outputs encoded data streams to the first encoded data stream buffer until the process for generating encoded data streams of still next substitution candidates in the re-encoding operation is completed.

To cope with such situation, the maximum allowable encoded data size is set to be smaller than the physical capacity of the first encoded data stream buffer, and an area for storing encoded data streams which are output from the encoding means beyond the maximum allowable encoded data size must be assured. A degree that the maximum allowable encoded data size is set to be smaller than the physical capacity of the first encoded data stream buffer may be determined on the basis of actual processing results of images having various characteristics. When the maximum allowable encoded data size is determined by such method, a smaller maximum allowable encoded data size must be set under the assumption that images having characteristics that cannot be covered are input to the image encoding apparatus of this embodiment.

However, setting the maximum allowable encoded data size to be smaller than the physical capacity of the first encoded data stream buffer leads to an increase in the number of times of update of an encoding parameter in the image encoding apparatus of this embodiment. When the number of times of update of an encoding parameter increases even by one, compression-encoding distortion increases in a reconstructed image obtained by expanding and decoding encoded data streams generated by the image encoding apparatus of this embodiment.

Hence, in the compression-encoding processes of the image encoding apparatus of this embodiment, when the accumulated data size of encoded data streams generated by the encoding means using the encoding parameter designated at that time has exceeded or may exceed the maximum allowable encoded data size before the process for generating encoded data streams of "still next" substitution candidates in the re-encoding process is completed, and before the process for transferring "next" substitution candidates to the first encoded data stream buffer in the transfer operation is completed, the control means controls the encoding means to abort its encoding operation.

With this adaptive operation control, the maximum allowable encoded data size need not be set to be smaller than the physical capacity of the first encoded data stream buffer, but can be set to be equal to the physical capacity of the first encoded data stream buffer. In this manner, an unwanted update process of an encoding parameter can be avoided, and the number of times of update of an encoding parameter for one source image data can be consequently reduced.

As described above, in the image encoding apparatus of this embodiment, the controller 8101 controls start and end of the encoding, re-encoding, and transfer operations as three processing operations in a series of compression-encoding processes. All these three processing operations are executed at the same time, and the re-encoding and transfer operations normally come to an end earlier than the encoding operation, which is executed at the same time.

However, images having various characteristics may include those, the information size of which increases abruptly in the middle of processes, like the second source image. In a series of compression-encoding processes for such source image data, the re-encoding and transfer operations, which are executed simultaneously with the encoding operation, are not completed even when the accumulated value of the data sizes of encoded data streams generated by the encoding operation has reached the maximum allowable encoded data size, as shown in three processing operations in segmented region B in FIG. 30.

When such situation is impending, the image encoding apparatus of this embodiment aborts the encoding operation when the accumulated value of the data sizes of encoded data streams generated by the encoding operation has reached the maximum allowable encoded data size, and maintains the encoding operation aborted until the re-encoding and transfer operations, which are executed simultaneously with the encoding operation, are complete.

Hence, according to the image encoding apparatus and method of this embodiment, image data can be compression-encoded to a predetermined size, compression-encoding distortion of an image obtained upon expanding and decoding encoded data streams obtained by compression-encoding can be suppressed, and a high-quality reconstructed image can be obtained.

[Other Embodiments]

Furthermore, the invention is not limited only to the device and method for realizing the embodiments above, but a case also falls within the scope of the invention where a program code for software to realize the embodiments above is provided to a computer (CPU or MPU) in a system or device, and the computer of the system or device causes the various devices to operate in accordance with the program code so that the embodiments can be realized.

In this case, the program code itself for software will realize the features of the embodiments, thus the program code itself and the means for supplying the code to a computer, specifically, a storage medium with the program code stored on it, are included within the scope of the invention.

The storage medium for storing such a program code may include floppy® disk, hard disk, optical disk, magneto-optical disk, CD-ROM, magnetic tape, non-volatile memory card, ROM and so on.

In addition, such a program code is included within the scope of the invention not only in the case where a computer controls various devices only in accordance with supplied program code to realize the features of the embodiments, but also in the case where the program code realizes the embodiments in conjunction with an OS (operating system) or other application software running on a computer.

Also, a case is included within the scope of the invention where after the supplied program code has been stored in memory provided on a feature expansion board of a computer or a feature expansion unit connected to a computer, the CPU or the like on the feature expansion board or unit executes some or all of the actual processing based on the designation of the code to realize the embodiments.

To restate, according to the present invention, image data can be compression-encoded to a predetermined size, compression-encoding distortion of an image obtained upon expanding and decoding encoded data streams obtained by compression-encoding can be suppressed, and a high-quality reconstructed image can be obtained.

The present invention is not limited to the above embodiments and various changes and modifications can be made within the spirit and scope of the present invention. Therefore, to apprise the public of the scope of the present invention the following claims are made.

What is claimed is:

1. An encoding method of encoding image data, comprising:
    an encoding step, of encoding image data using a first encoding parameter;
    a re-encoding step, of re-encoding the encoded image data, which is encoded in said encoding step, using a second encoding parameter which can compress data at a higher compression ratio than the first encoding parameter;
    a determination step, of counting a data size of encoded data, which is encoded in said encoding step, estimating a data size of encoded data of the image data which is not yet encoded, and determining if a total of the data sizes is not less than a target size;
    when it is determined in said determination step that the total is not less than the target size, each following step is performed:
    a control step, of controlling said encoding step to abort an encoding process;
    a change step, of replacing the first encoding parameter with the second encoding parameter, and changing the second encoding parameter to a parameter used to obtain a higher compression ratio;
    a storing step, of storing encoded data which was previously encoded in said re-encoding step, as encoded data encoded in said encoding step after the parameter is changed; and
    a second re-encoding step, of re-encoding the encoded data, which was previously encoded in said re-encoding step, using the second encoding parameter, which is changed in said change step.

2. The method according to claim 1, wherein the first and second encoding parameters are scaling factors for quantized transform coefficients.

3. The method according to claim 1, wherein encoded data that follows the encoded data to be stored in said storing step is generated in said encoding step using the changed first encoding parameter.

4. The method according to claim 1, wherein encoded data that follows the encoded data re-encoded in said second re-encoding step is generated in said re-encoding step using the changed second encoding parameter.

5. A computer readable storage medium storing a program for making a computer implement the encoding method of claim 1.

6. An encoding apparatus for encoding image data, comprising:
    encoding means for encoding image data using a first encoding parameter;
    re-encoding means for re-encoding the encoded image data which is encoded by said encoding means, using a second encoding parameter which can compress data at a higher compression ratio than the first encoding parameter;
    determination means for counting a data size of encoded data, which is encoded by said encoding means, estimating a data size of encoded data of the image data which is not yet encoded, and determining if a total of the data sizes is not less than a target size;

control means for, when it is determined by said determination means that the total is not less than the target size, controlling said encoding means to abort an encoding process;

change means for, when it is determined by said determination means that the total is not less than the target size, replacing the first encoding parameter with the second encoding parameter, and changing the second encoding parameter to a parameter used to obtain a higher compression ratio;

storage means for, when it is determined by said determination means that the total is not less than the target size, storing encoded data which was previously encoded by said re-encoding means, as encoded data encoded by said encoding means after the parameter is changed; and second re-encoding means for, when it is determined by said determination means that the total is not less than the target size, re-encoding the encoded data, which was previously encoded by said by said re-encoding means, using the second encoding parameter, which is changed by said change means.

* * * * *

UNITED STATES PATENT AND TRADEMARK OFFICE
CERTIFICATE OF CORRECTION

PATENT NO. : 7,106,909 B2  
APPLICATION NO. : 10/298657  
DATED : September 12, 2006  
INVENTOR(S) : Makoto Satoh et al.

Page 1 of 1

It is certified that error appears in the above-identified patent and that said Letters Patent is hereby corrected as shown below:

COLUMN 12:

Line 6, "and" should be deleted; and  
      Line 9, "FIG. 24." should read --FIG. 24; and--.

COLUMN 17:

Line 25, "term" should read --terms--.

COLUMN 18:

Line 29, "(step S8) The" should read --(step S8). ¶ The--.

COLUMN 37:

Line 49, "form" should read --from--.

COLUMN 47:

Line 29, "S8130)" should read --S8130).--.

COLUMN 64:

Line 8, "by said" (second occurrence) should be deleted.

Signed and Sealed this

Twenty-sixth Day of June, 2007

JON W. DUDAS  
*Director of the United States Patent and Trademark Office*